US012730442B2

(12) United States Patent
Donahoe et al.

(10) Patent No.: US 12,730,442 B2
(45) Date of Patent: Sep. 8, 2026

(54) AIRCRAFT FLIGHT USER INTERFACE

(71) Applicant: Skydio, Inc., Redwood City, CA (US)

(72) Inventors: Matthew Joseph Donahoe, Redwood City, CA (US); Hayk Martirosyan, San Francisco, CA (US); Kenneth Paul Stoltz, San Mateo, CA (US); Jeffrey Robert DeCew, San Francisco, CA (US); Mark Edward Rubin, San Jose, CA (US); Charles VanSchoonhoven Wood, Redwood City, CA (US); Jack Louis Zhu, Redwood City, CA (US); Kristen Marie Holtz, Redwood City, CA (US); Abraham Galton Bachrach, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 16/274,030

(22) Filed: Feb. 12, 2019

(65) Prior Publication Data

US 2019/0250601 A1 Aug. 15, 2019

Related U.S. Application Data

(60) Provisional application No. 62/629,909, filed on Feb. 13, 2018.

(51) Int. Cl.

| | |
|---|---|
| ***G06F 3/0482*** | (2013.01) |
| ***B64U 101/30*** | (2023.01) |
| ***G05D 1/00*** | (2006.01) |
| ***G06F 3/0488*** | (2022.01) |

(52) U.S. Cl.

CPC ......... *G05D 1/0016* (2013.01); *G05D 1/0033* (2013.01); *G05D 1/0038* (2013.01); *G05D 1/101* (2013.01); *G06F 3/0482* (2013.01); *G06F 3/0488* (2013.01); *B64U 2101/30* (2023.01); *B64U 2201/10* (2023.01); *B64U 2201/20* (2023.01)

(58) Field of Classification Search

CPC ..... G06F 3/0488; G06F 3/0482; G05D 1/101; G05D 1/0016; G05D 1/0038; G05D 1/0033; B64U 2101/30; B64U 2201/10; B64U 2201/20

See application file for complete search history.

(56) References Cited

U.S. PATENT DOCUMENTS

| | | | |
|---|---|---|---|
| 5,155,683 | A | 10/1992 | Rahim |
| 5,701,408 | A | 12/1997 | Cornell et al. |
| 6,748,325 | B1 | 6/2004 | Fujisaki |
| 6,975,246 | B1 | 12/2005 | Trudeau |

(Continued)

*Primary Examiner* — Toya Pettiegrew

(57) ABSTRACT

A graphical user interface (GUI) for controlling the flight of an aircraft such as an unmanned aerial vehicle (UAV) is described. In example embodiments, the GUI includes a view of a physical environment from the perspective of the aircraft as well as various interactive elements through which a user can interact. The interactive elements presented in the GUI and the way in which user interaction with such elements is interpreted can depend on user selection from multiple available control modes. In some embodiments, user interaction with the GUI is interpreted based on a selected control mode and translated into behavioral objectives that are processed, along with other behavioral objectives, by a motion planner to maneuver the aircraft.

38 Claims, 49 Drawing Sheets

(56) References Cited

U.S. PATENT DOCUMENTS 8,591,161 B1 11/2013 Bernhardt
8,948,932 B2 2/2015 Yeager et al.
9,766,622 B1* 9/2017 Yang .................... G05D 1/0038
10,168,674 B1 1/2019 Buerger et al.
10,361,802 B1 7/2019 Hoffberg-Borghesani et al.
10,996,683 B2 5/2021 O'Flaherty et al.
11,307,584 B2 4/2022 Jobanputra et al.
11,829,139 B2 11/2023 Jobanputra et al.
2004/0068415 A1 4/2004 Solomon
2005/0004723 A1 1/2005 Duggan et al.
2006/0184292 A1 8/2006 Appleby et al.
2011/0044541 A1 2/2011 Kress et al.
2012/0166411 A1 6/2012 Maclaurin et al.
2012/0235885 A1* 9/2012 Miller .................... G06Q 30/02 345/8
2012/0280087 A1* 11/2012 Coffman .............. G05D 1/0016 244/175
2012/0303179 A1 11/2012 Schempf
2014/0316616 A1 10/2014 Kugelmass
2014/0324253 A1 10/2014 Duggan et al.
2016/0125739 A1* 5/2016 Stewart ................... B63B 43/18 701/301
2016/0241767 A1* 8/2016 Cho .................... G06F 3/04842
2016/0373655 A1 12/2016 Kobayashi et al.
2017/0076194 A1 3/2017 Versace et al.
2017/0097640 A1 4/2017 Wang et al.
2017/0127652 A1* 5/2017 Shen ..................... B64C 39/024
2017/0329324 A1 11/2017 Bachrach et al.
2018/0129211 A1 5/2018 Vidyadharan et al.
2018/0157252 A1 6/2018 Lee et al.
2018/0196435 A1* 7/2018 Kunzi .................. G08G 5/0013
2018/0241936 A1* 8/2018 Li ........................ G05D 1/0011
2018/0246529 A1* 8/2018 Hu ........................ B64C 39/024
2018/0290748 A1 10/2018 Corban et al.
2018/0356823 A1 12/2018 Cooper
2018/0362190 A1 12/2018 Chambers et al.
2019/0003862 A1 1/2019 Reed et al.
2019/0011908 A1* 1/2019 Liu ......................... G06F 3/011
2019/0049968 A1 2/2019 Dean et al.
2019/0064794 A1* 2/2019 Chen .................... G05D 1/2246
2019/0068829 A1 2/2019 Van Schoyck et al.
2019/0068962 A1 2/2019 Van Schoyck et al.
2019/0158755 A1 5/2019 Chou et al.
2019/0250640 A1 8/2019 O'Flaherty et al.
2019/0259108 A1 8/2019 Bongartz et al.
2019/0377345 A1 12/2019 Bachrach et al.
2019/0378423 A1 12/2019 Bachrach et al.
2020/0019189 A1* 1/2020 Chen .................... G08G 5/0034
2021/0089040 A1 3/2021 Ebrahimi et al.

* cited by examiner

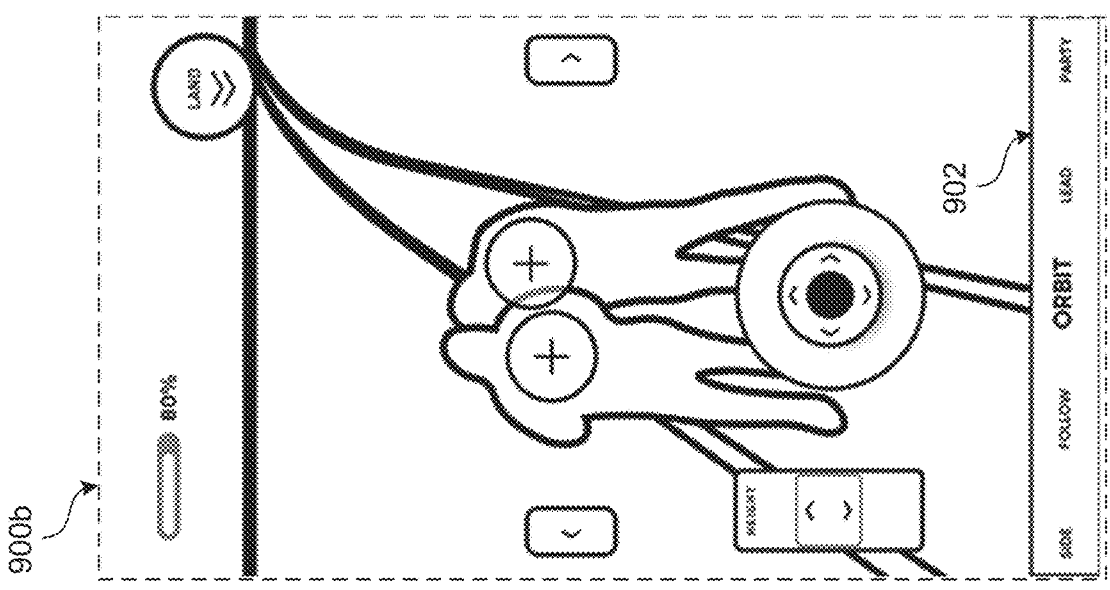
900b
902
80%
ORBIT
FIG. 9
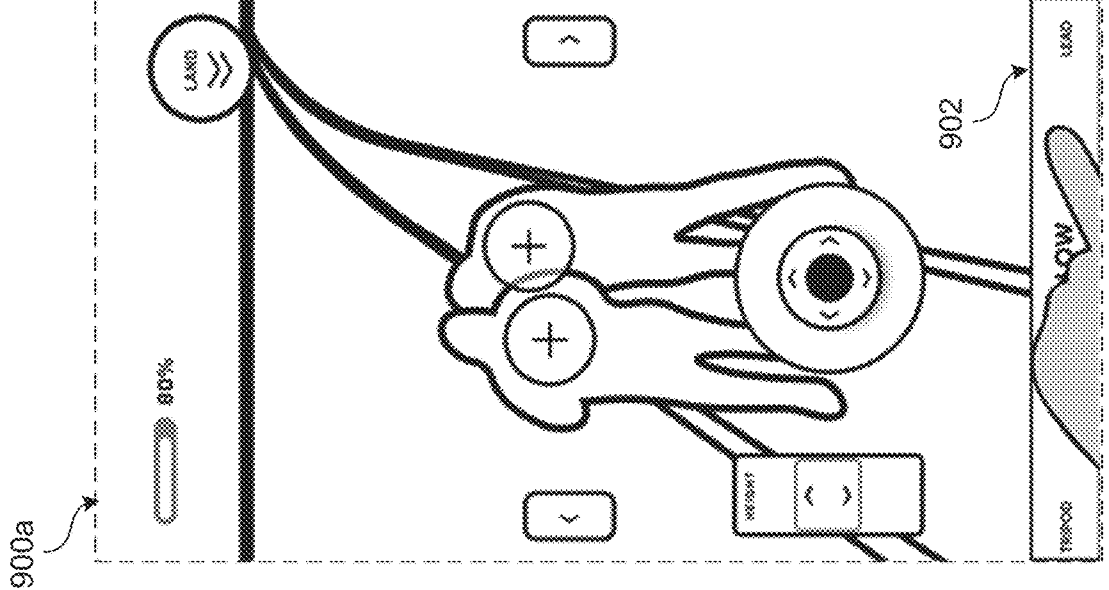
900a
902
80%

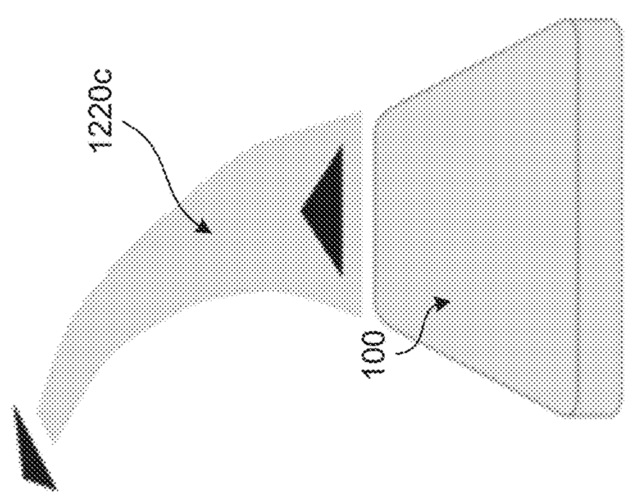
FIG. 12C
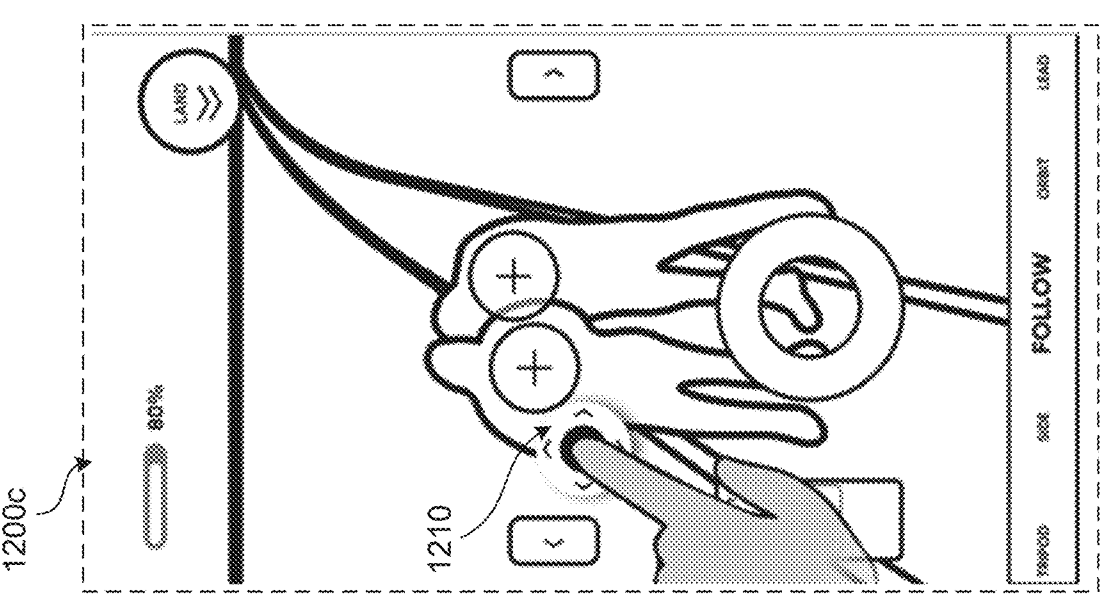

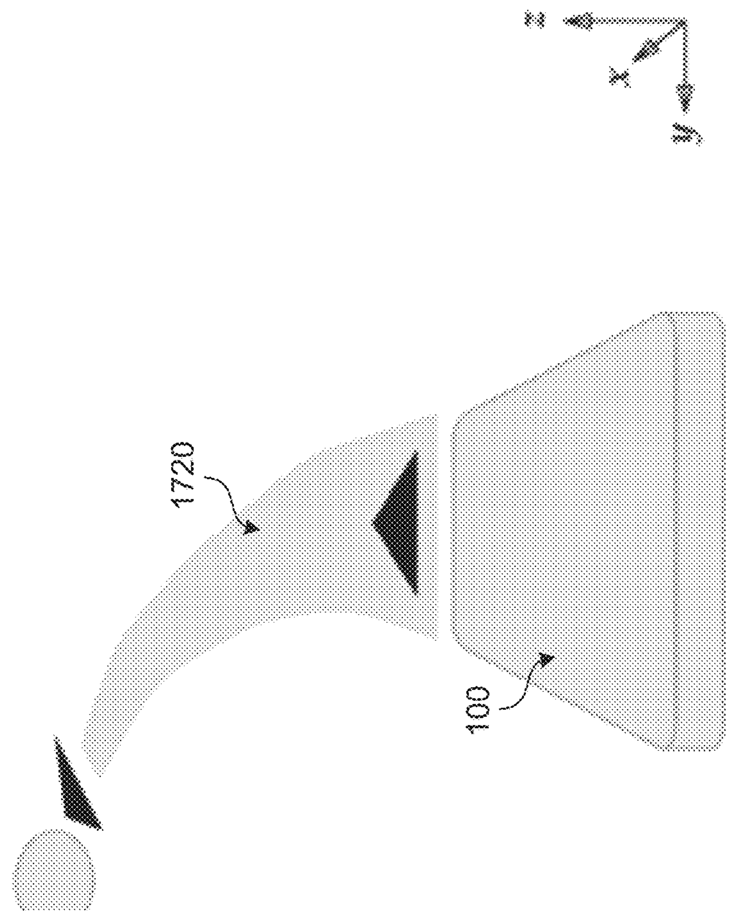
FIG. 17
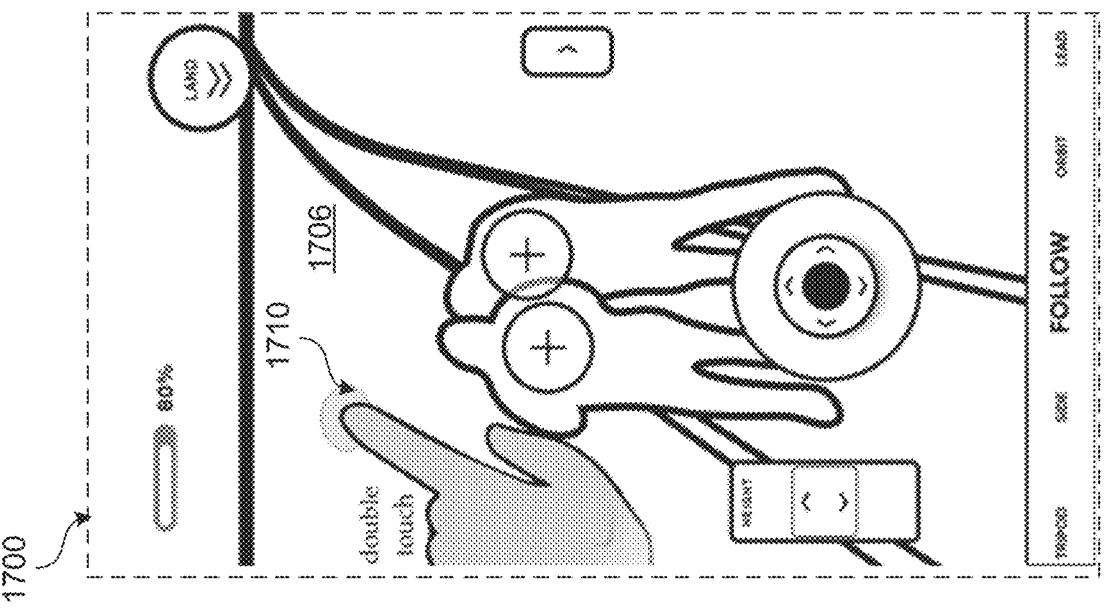

3530

3540

3520

*FIG. 36*
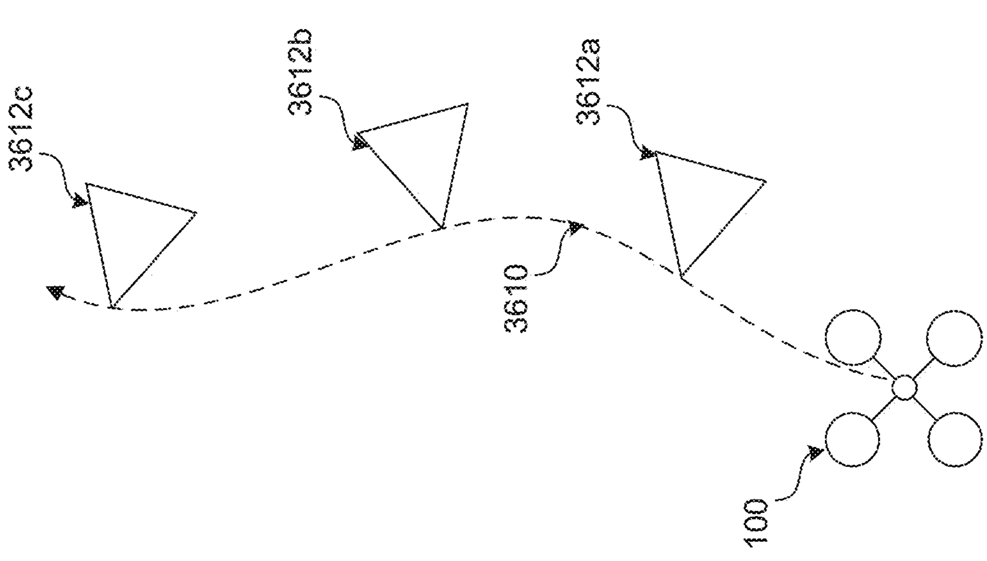

AIRCRAFT FLIGHT USER INTERFACE

CROSS-REFERENCE TO RELATED APPLICATION(S)

This application is entitled to the benefit and/or right of priority of U.S. Provisional Application No. 62/629,909, titled, "AIRCRAFT FLIGHT USER INTERFACE," filed Feb. 13, 2018, the contents of which are hereby incorporated by reference in their entirety for all purposes. This application is therefore entitled to a priority date of Feb. 13, 2018.

TECHNICAL FIELD

The present disclosure generally relates to graphical user interfaces, specifically graphical user interfaces for controlling aircraft including unmanned aerial vehicles.

BACKGROUND

Aircraft can be controlled using a variety of different techniques. Manned aircraft are controlled by an onboard pilot through direct or indirect control of onboard propulsion systems and/or control surfaces. Unmanned aircraft are typically controlled in a similar manner except that the pilot input is received from a remote location on the ground. Pilot inputs can be communicated from the pilot's location to the unmanned aircraft over a wireless communication medium such a radio signals.

BRIEF DESCRIPTION OF THE DRAWINGS

FIG. 4A shows a block diagram of another example system for implementing a GUI, according to the introduced technique;

FIGS. 6-31 show screens of an example GUI for controlling an aircraft, according to the introduced technique;

FIG. 36 is a diagram illustrating an example process for estimating a trajectory of an object based on multiple images captured by a UAV;

DETAILED DESCRIPTION

Overview

Figure 1:
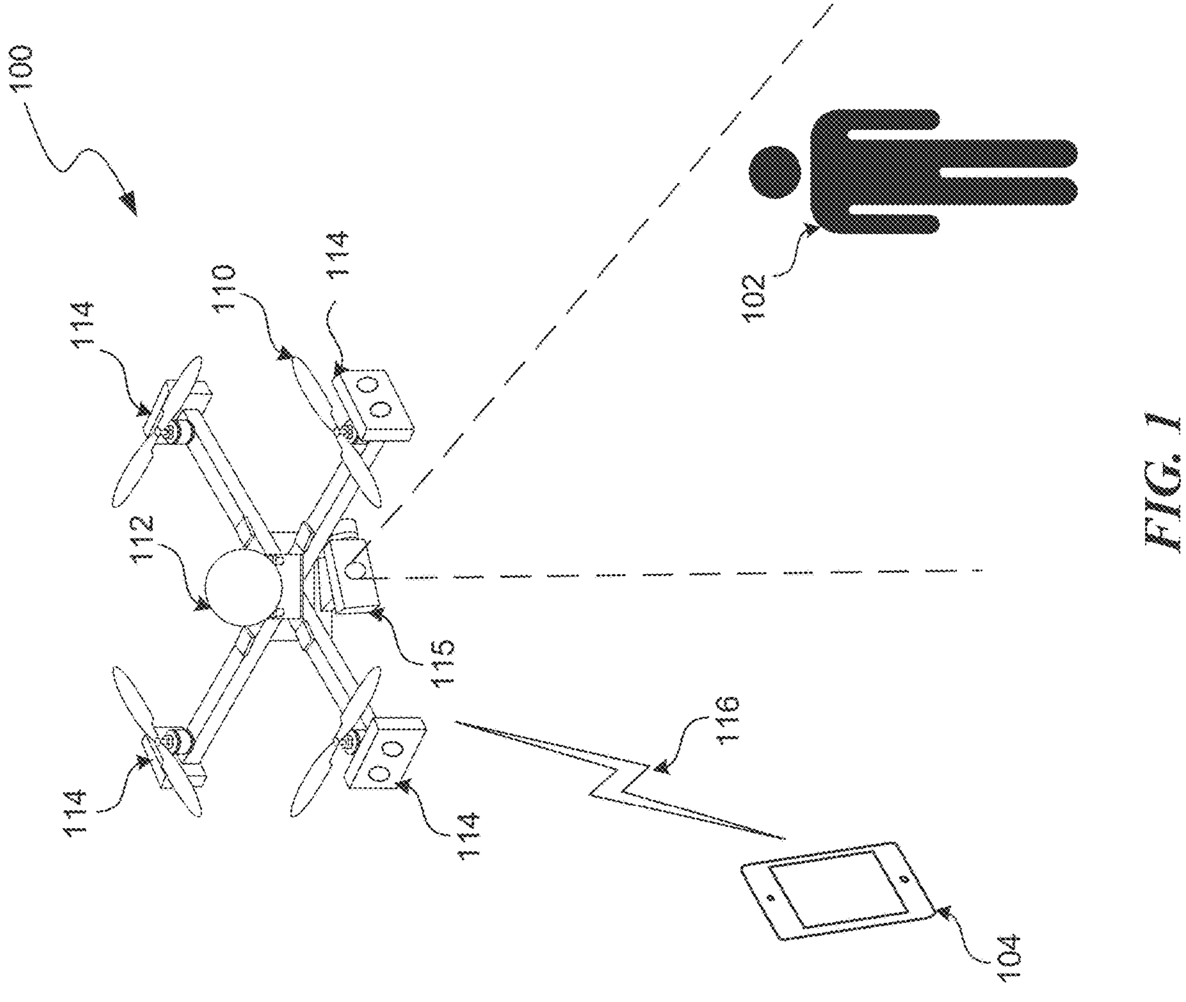
FIG. 1 shows an example configuration of an autonomous vehicle in the form of an unmanned aerial vehicle (UAV) within which certain techniques described herein may be applied.

A typical aircraft can move in three-dimensional space above the ground along multiple axes of movement. Further, additional degrees of movement may be enabled where a gimbaled camera is coupled to the aircraft. Such complex motion typically requires an expert pilot to control competently, even with some level of automation. The challenges presented to pilots are further magnified in remotely controlled unmanned aircraft since the pilot must typically rely on limited sensory feedback such as a two-dimensional display of video feed from an onboard camera when controlling the aircraft. Pilot error in both situations can result in damage to the aircraft as well as people or property in the vicinity. Even less serious pilot error can still affect mission performance, such as effectively capturing video or other data during a flight.

Introduced herein is a graphical user interface (GUI) for controlling an aircraft that addresses these challenges. The introduced GUI presents controls to a user that are intuitive and approachable and that avoid the problems of pilot error found through existing modes of controlling aircraft. For illustrative simplicity, the introduced technique is described in the context of controlling an unmanned aerial vehicle (UAV) although a person having ordinary skill in the art will recognize that the introduced technique can be similarly applied whether the user is at a remote location on the ground or onboard the aircraft. Accordingly, the scope of the introduced technique shall not be limited to UAV applications. As will be described in more detail, an example UAV in which the described GUI can be implemented includes environment sensors allowing it to sense obstacles around it. This sensing system is connected to a motion planning system and a control system. The combination of the three systems allows the user to input high-level commands that are interpreted and translated into complex control commands that guide the UAV's flight. The environment sensing system provides information on the surrounding environment, particularly where safe areas of surrounding space to fly to are and where areas are that are dangerous, for example, by being occupied by an object or by lacking information on the area. The information from the sensing system is combined with the user's commands by the motion planning system. In certain embodiments, the user's commands can be very general, such as a command to follow a particular person or object as it moves, or very specific, such as to go up or down. The motion planning system generates a path or planned trajectory based on the environment sensing system's data combined with the user's commands. The user can provide input via a GUI that is presented at a digital device such as a smartphone or tablet, on a controller, or on any other type of device onboard the aircraft or remotely located from the aircraft.

In certain embodiments, the described GUI may use a driving metaphor, allowing a user to input basic commands such as forward/backward and turn (yaw) left/right to effect complex aircraft behavior. Inputs by the user, received via the GUI, are interpreted by a motion planning system which translates the user's inputs into semi-autonomous aircraft behavior, using a control system. As an illustrative example, a default motion of the UAV can take place in a plane parallel with, but above the ground (i.e., an XY plane), mimicking the behavior of ground vehicles, but in the air. A separate slider element presented in the GUI may allow a user to provide basic inputs to control the altitude. In such an embodiment, the user can use simple touch gestures, for example, input using a single finger to fly the aircraft around in the XY plane at a particular altitude off the ground. The user can then use other touch gestures to control altitude, when necessary. The GUI and associated motion planning systems may utilize data from onboard sensors to prevent the user from steering the aircraft into detected obstacles.

In some embodiments, the GUI may also offer a selection of various different modes which can impact how user inputs are interpreted and translated into aircraft behavior. Such modes can offer additional interactive GUI elements that are specific to the mode. For example, the aircraft can be focused to follow subjects such as people, balls, cars, or any other objects, using a tracking system. When a user provides an input to follow a subject, the GUI may display a set of controls specific to a tracking mode. In such a tracking mode, the GUI may display interactive controls for maintaining a certain position and/or orientation relative to a tracked subject. For example, in such a tracking mode, the GUI may display controls for setting an azimuth, elevation, range, etc. relative to a tracked subject.

Example Implementation of an Unmanned Aerial Vehicle

FIG. 1 shows an example configuration of a UAV 100 within which certain techniques described herein may be applied. As shown in FIG. 1, UAV 100 may be configured as a rotor-based aircraft (e.g., a "quadcopter"), although the other introduced technique can similarly be applied in other types of UAV such as fixed-wing aircraft. The example UAV 100 includes control actuators 110 for maintaining controlled flight. The control actuators 110 may comprise or be associated with a propulsion system (e.g., rotors) and/or one or more control surfaces (e.g., flaps, ailerons, rudders, etc.) depending on the configuration of the UAV. The example UAV 100 depicted in FIG. 1 include control actuators 110 in the form of electronic rotors that comprise a propulsion system of the UAV 100. The UAV 100 also includes various sensors for automated navigation and flight control 112, and one or more image capture devices 114 and 115 for capturing images of the surrounding physical environment while in flight. "Images," in this context, include both still images and captured video. Although not shown in FIG. 1, UAV 100 may also include other sensors (e.g., for capturing audio) and systems for communicating with other devices, such as a mobile device 104, via a wireless communication channel 116.

In the example depicted in FIG. 1, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in flight, UAV 100 can also capture images using any one or more image capture devices that can be displayed in real time and or recorded for later display at other devices (e.g., mobile device 104).

FIG. 1 shows an example configuration of a UAV 100 with multiple image capture devices configured for different purposes. In the example configuration shown in FIG. 1, the UAV 100 includes multiple image capture devices 114 arranged about a perimeter of the UAV 100. The image capture device 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1 includes an array of multiple stereoscopic image capture devices 114 placed around a perimeter of the UAV 100 so as to provide stereoscopic image capture up to a full 360 degrees around the UAV 100.

In addition to the array of image capture devices 114, the UAV 100 depicted in FIG. 1 also includes another image capture device 115 configured to capture images that are to be displayed, but not necessarily used by the navigation system of the UAV. For example, images captured by image capture device 115 may be part of a recorded video from the UAV's flight or may be utilized for a live video feed presented via a GUI according to the introduced technique. In some embodiments, the image capture device 115 may be similar to the image capture devices 114, except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160 or higher) color images, while the image capture devices 114 may be configured to capture relatively low resolution (e.g., 320×240 or lower) grayscale images.

The UAV 100 can be configured to track one or more objects such as a human subject 102 through the physical environment based on images received via the image capture devices 114 and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

Mobile device 104 may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated GUI for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

The mobile device 104 is depicted in FIG. 1 as a smart phone device that includes, for example, a touch screen display. However, in some embodiments, certain GUI features associated with the introduced technique can similarly be applied using other types of user interaction paradigms such as augmented reality (AR) or virtual reality (VR). Examples of AR devices that may be utilized to implement such functionality include smartphones, tablet computers, laptops, head-mounted display devices (e.g., Microsoft HoloLens™, Google Glass™), virtual retinal display devices, heads up display (HUD) devices in vehicles, etc. For example, mobile device 104 may be configured as an AR device. Note that for illustrative simplicity, the term AR device is used herein to describe any type of device capable of presenting augmentations (visible, audible, tactile, etc.) to a user. The term "AR device" shall be understood to also include devices not commonly referred to as AR devices such as virtual reality (VR) headset devices (e.g., Oculus Rift™).

Figure 2:
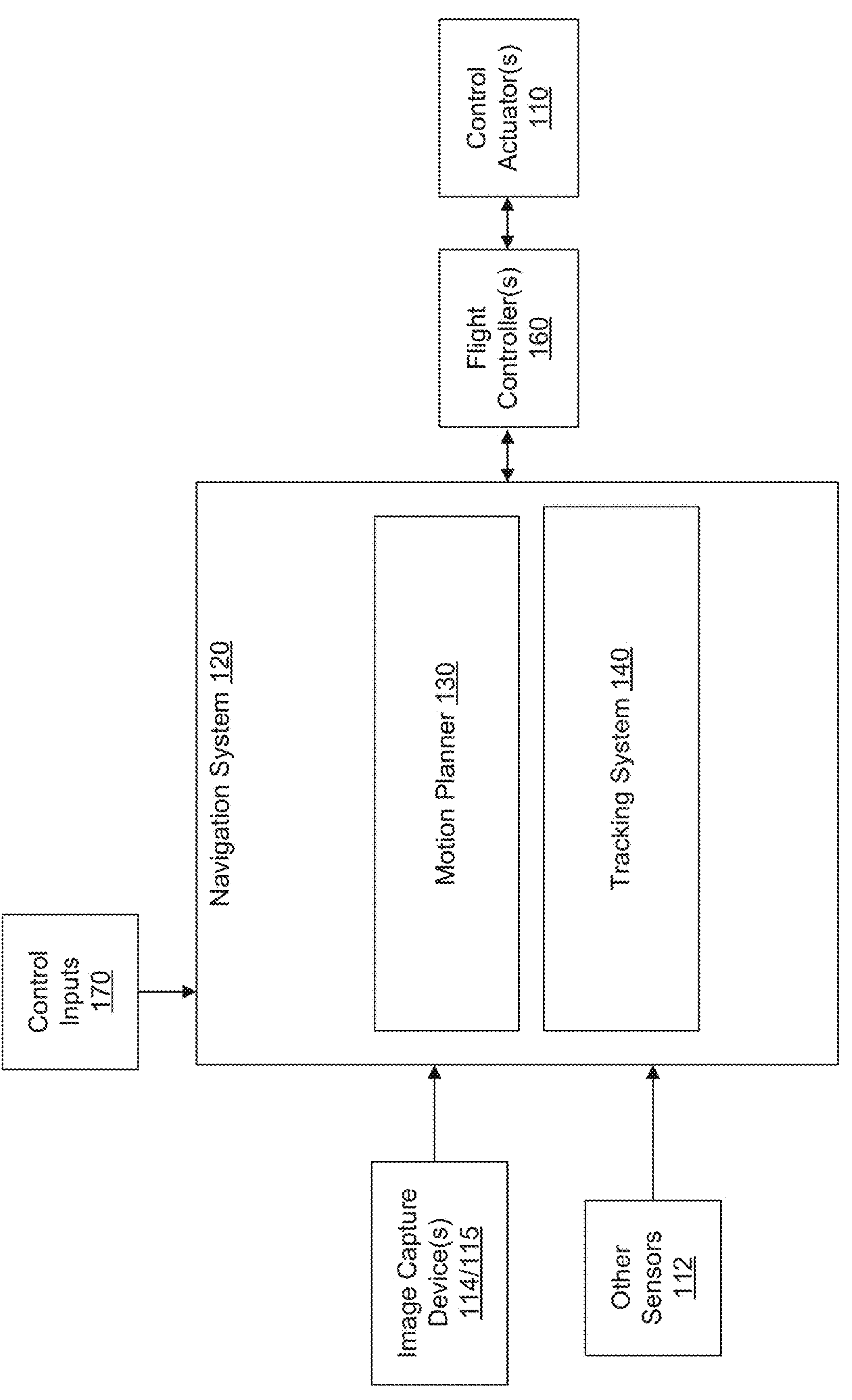
FIG. 2 shows a block diagram of an example navigation system that may be implemented with the UAV of FIG. 1.

FIG. 2 is a block diagram that illustrates an example navigation system 120 that may be implemented as part of the example UAV 100 described with respect to FIG. 1. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment and a tracking system 140 for tracking one or more objects in the physical environment. Note that the arrangement of systems shown in FIG. 2 is an example provided for illustrative purposes and is not to be construed as limiting. For example, in some embodiments, the tracking system 140 may be separate from the navigation system 120. Further, the subsystems making up the navigation system 120 may not be logically separated as shown in FIG. 2 and instead may effectively operate as single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., IMU, GPS, proximity sensors, etc.), and/or one or more control inputs 170. Control inputs 170 may be from external sources such as a mobile device 104 operated by a user or may be from other systems onboard the UAV. Specifically, in some embodiments, control inputs 170 may comprise or be based on user inputs received via a GUI according to the introduced technique. The GUI may be presented at any type of display device such as mobile device 104.

In some embodiments, the navigation system 120 may generate control commands configured to cause the UAV 100 to maneuver along the planned trajectory generated by the motion planner 130. For example, the control commands may be configured to control one or more control actuators 110 to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause a mechanism to adjust an orientation of any image capture devices 114/115 relative to the body of the UAV 100 based on the tracking of one or more objects. Such a mechanism may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion.

In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain built-in objectives, such as obstacle avoidance and vehicle dynamic limits, can be combined with other input objectives (e.g., a tracking objective) as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

Figure 3A:
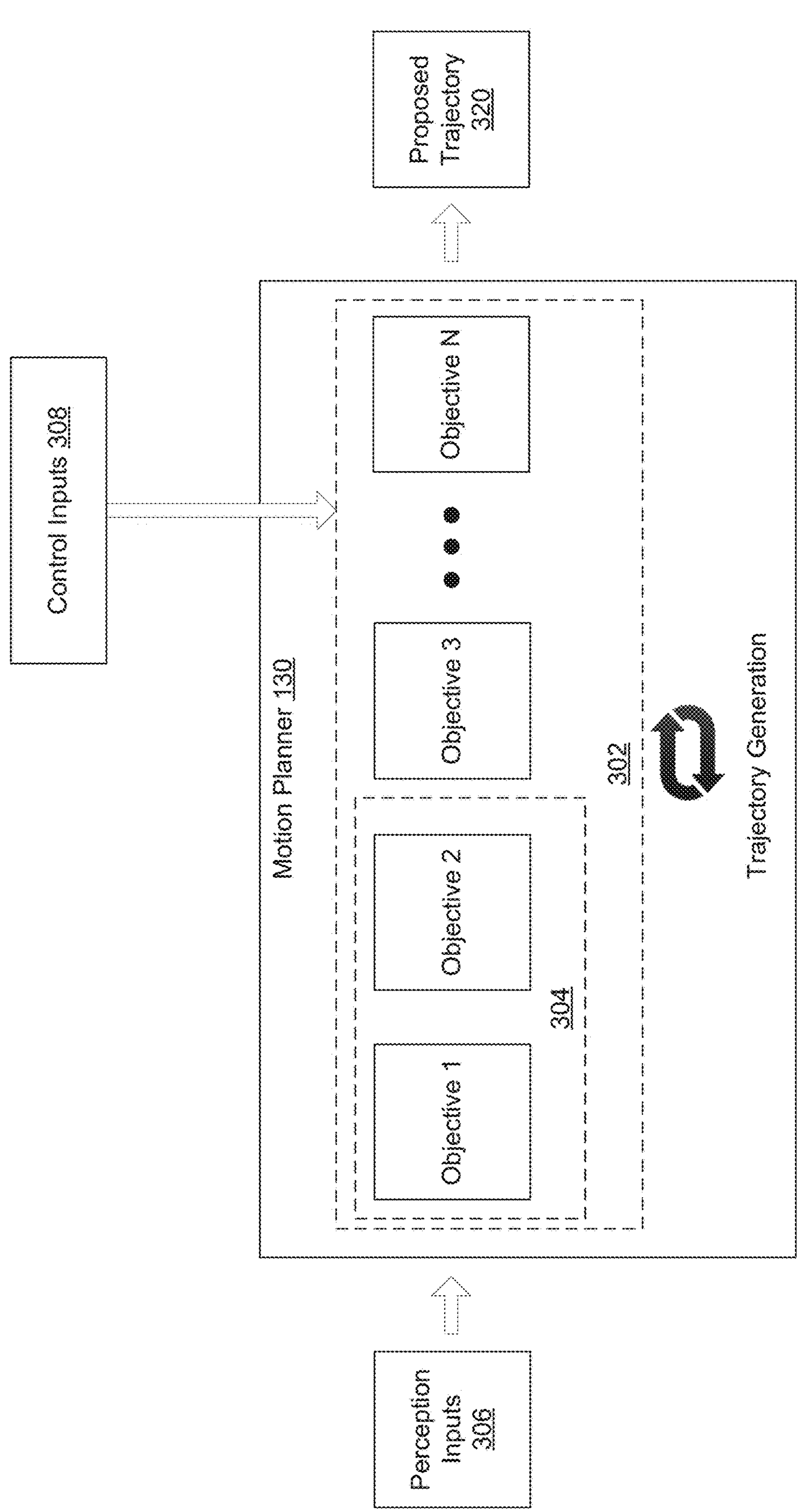
FIG. 3A shows a block diagram of an example motion planning system that may be part of the navigation system of FIG. 2.

FIG. 3 shows a block diagram that illustrates an example system for objective-based motion planning. As shown in FIG. 3, a motion planner 130 (e.g., as discussed with respect to FIG. 2) may generate and continually update a planned trajectory 320 based on a trajectory generation process involving one or more objectives and/or more perception inputs 306. The perception inputs 306 may include images received from one or more image capture devices 114/115, results of processing such images (e.g., disparity images, depth values, semantic data, etc.), sensor data from one or more other sensors 112 onboard the UAV 100 or associated with other computing devices (e.g., mobile device 104) in communication with the UAV 100, and/or data generated by, or otherwise transmitted from, other systems onboard the UAV 100. The one or more objectives 302 utilized in the motion planning process may include built-in objectives governing high-level behavior (e.g., avoiding collision with other objects, the smart landing technique described herein, etc.) as well as objectives based on control inputs 308 (e.g., from users). Each of the objectives 302 may be encoded as one or more equations for incorporation in one or more motion planning equations utilized by the motion planner 130 when generating a planned trajectory to satisfy the one or more objectives. The control inputs 308 may be in the form of control commands from a user or from other components of the navigation system 120 such as a tracking system 140. In some embodiments, such inputs are received in the form of calls to an application programming interface (API) associated with the navigation system 120. In some embodiments, the control inputs 308 may include predefined objectives that are generated by other components of the navigation system 120 such as tracking system 140.

Figure 3B:
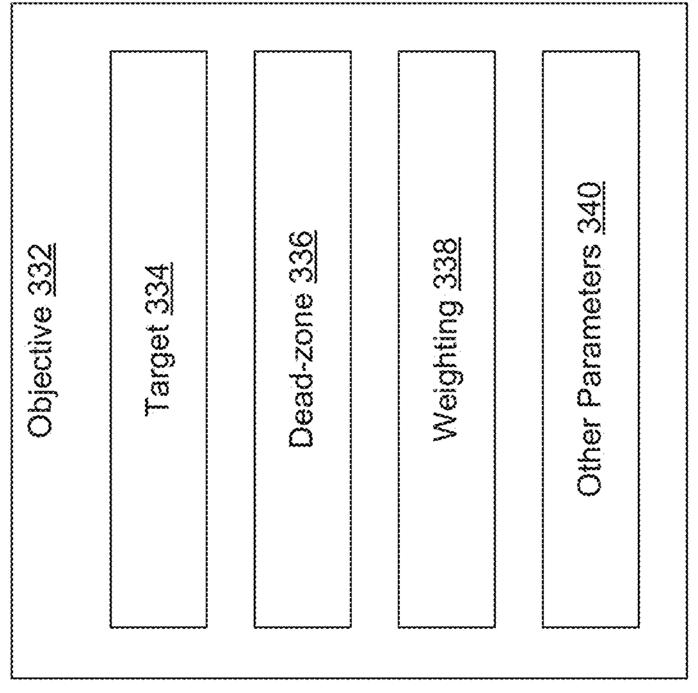
FIG. 3B shows a block diagram representing an example objective that can be incorporated into the motion planning system depicted in FIG. 3A.

Each given objective of the set of one or more objectives 302 utilized in the motion planning process may include one or more defined parameterizations that are exposed through the API. For example, FIG. 3B shows an example objective 332 that includes a target 334, a dead-zone 336, a weighting factor 338, and other parameters 340.

The target 334 defines the goal of the particular objective that the motion planner 130 will attempt to satisfy when generating a planned trajectory 320. For example, the target 334 of a given objective may be to maintain line of sight with one or more detected objects or to fly to a particular position in the physical environment.

The dead-zone defines a region around the target 334 in which the motion planner 130 may not take action to correct. This dead-zone 336 may be thought of as a tolerance level for satisfying a given target 334. For example, a target of an example image-relative objective may be to maintain image capture of a tracked object such that the tracked object appears at a particular position in the image space of a captured image (e.g., at the center). To avoid continuous adjustments based on slight deviations from this target, a dead-zone is defined to allow for some tolerance. For example, a dead-zone can be defined in a y-direction and x-direction surrounding a target location in the image space. In other words, as long as the tracked object appears within an area of the image bounded by the target and respective dead-zones, the objective is considered satisfied.

The weighting factor 336 (also referred to as an "aggressiveness" factor) defines a relative level of impact the particular objective 332 will have on the overall trajectory generation process performed by the motion planner 130. Recall that a particular objective 332 may be one of several objectives 302 that may include competing targets. In an ideal scenario, the motion planner 130 will generate a planner trajectory 320 that perfectly satisfies all of the relevant objectives at any given moment. For example, the motion planner 130 may generate a planned trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planner system 130 may need to favor one objective over another when the satisfaction of both is impossible or impractical (for any number of reasons). The weighting factors for each of the objectives 302 define how they will be considered by the motion planner 130.

In an example embodiment, a weighting factor is a numerical value on a scale of 0.0 to 1.0. A value of 0.0 for a particular objective may indicate that the motion planner 130 can completely ignore the objective (if necessary), while a value of 1.0 may indicate that the motion planner 130 will make a maximum effort to satisfy the objective while maintaining safe flight. A value of 0.0 may similarly be associated with an inactive objective and may be set to zero, for example, in response to toggling by an application 1210 of the objective from an active state to an inactive state. Low weighting factor values (e.g., 0.0-0.4) may be set for certain objectives that are based around subjective or aesthetic targets such as maintaining visual saliency in the captured images. Conversely, higher weighting factor values (e.g., 0.5-1.0) may be set for more critical objectives such as avoiding a collision with another object.

In some embodiments, the weighting factor values 338 may remain static as a planned trajectory is continually updated while the UAV 100 is in flight. Alternatively, or in addition, weighting factors for certain objectives may dynamically change based on changing conditions, while the UAV 100 is in flight. For example, an objective to avoid an area associated with uncertain depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

The UAV 100 shown in FIG. 1 and the associated navigation system 120 shown in FIG. 2 are examples provided for illustrative purposes. A UAV 100, in accordance with the present teachings, may include more or fewer components than are shown. Further, the example UAV 100 depicted in FIG. 1 and associated navigation system 120 depicted in FIG. 2 may include or be part of one or more of the components of the example UAV system 4100 described with respect to FIG. 41 and/or the example computer processing system 4200 described with respect to FIG. 42. For example, the aforementioned navigation system 120 and associated motion planner 130 and tracking system 140 may include or be part of the UAV system 4100 and/or computer processing system 4200.

The introduced technique for controlling an aircraft is described in the context of an unmanned aerial vehicle such as the UAV 100 depicted in FIG. 1 for illustrative simplicity; however, the introduced technique is not limited to this context. The introduced technique may similarly be applied to guide the landing of other types of aerial vehicles, such as manned rotor craft such as helicopters or a manned or unmanned fixed-wing aircraft. For example, a manned aircraft may include an autonomous navigation component (e.g., navigation system 120) in addition to a manual control (direct or indirect) component. An onboard pilot may be presented with an option to switch from direct (or semi-direct) control of the aircraft into a control mode according to the introduced technique. For example, using a GUI according to the introduced technique, an onboard pilot may utilize simple touch gestures on a touch screen display to perform complex maneuvers by the aircraft.

Aircraft Flight User Interface

Figure 4A:
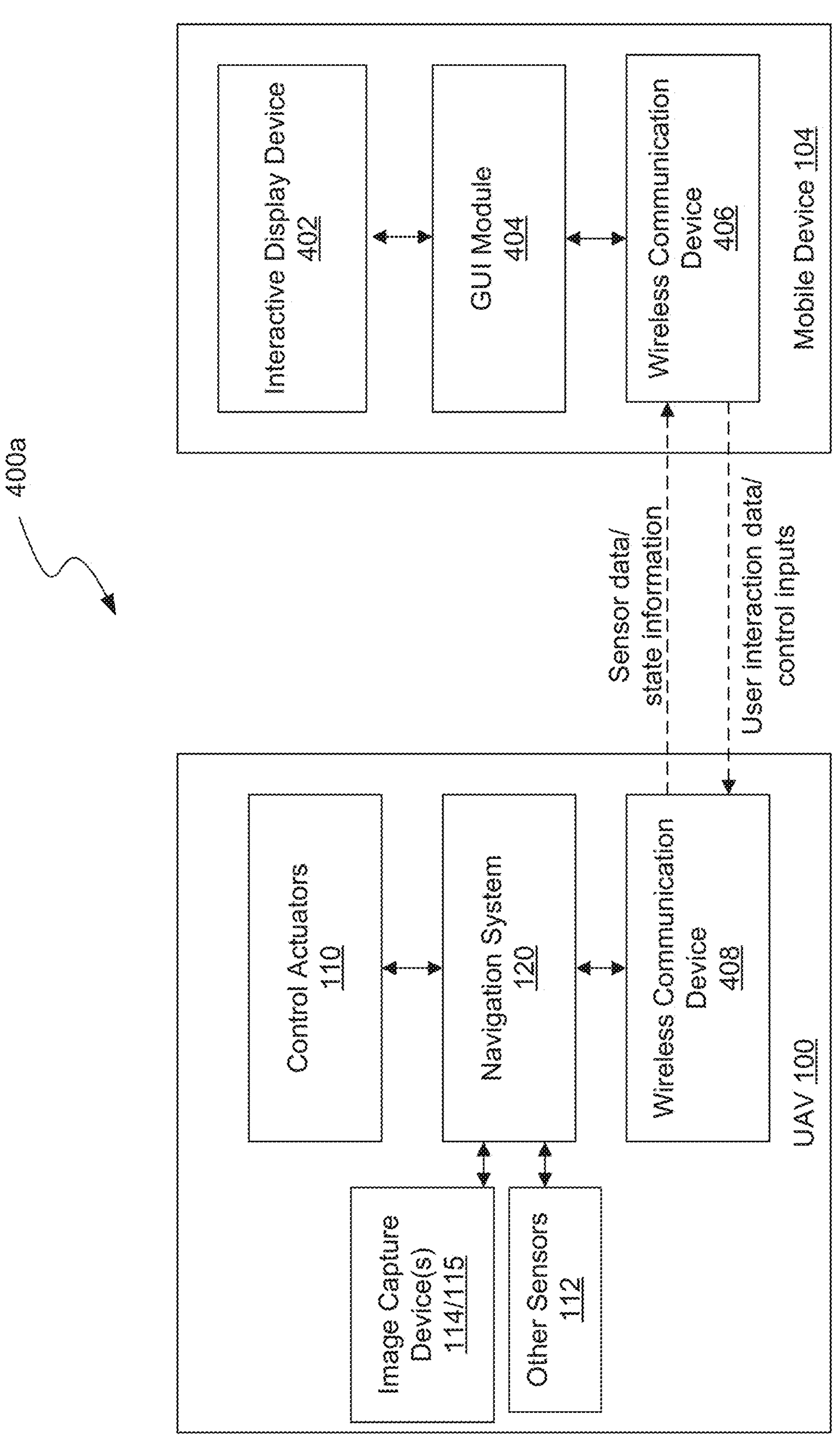
FIG. 4A shows a block diagram of an example system for implementing a graphical user interface (GUI), according to the introduced technique.

FIG. 4A shows a block diagram of an example system 400*a* in which the introduced technique can be implemented. As shown in FIG. 4A, example system 400*a* includes a mobile device 104 in wireless communication with a UAV 100, similar to as depicted in FIG. 1. The various components of system 400*a* may include any combination of hardware and/or software. For example, in some embodiments, the various components of example system 400*a* and associated subsystems may be implemented as instructions stored in memory and executable by one or more processors.

As shown in FIG. 4A, in some embodiments, the mobile device 104 may include an interactive display device 402, a GUI module 404, and a wireless communication device 406 for wireless communication with UAV 100 via a counterpart wireless communication device 408 at the UAV 100.

The interactive display device 402 may include any type of device for displaying a visual output including the GUI to a user and for detecting user interaction with the GUI or otherwise receiving user input. For example, the interactive display device 402 may comprise a touch-sensitive display system. A touch sensitive display system may have a touch-sensitive surface, sensor or set of sensors that accepts input from the user based on haptic and/or tactile contact. A touch sensitive display system (along with any associated modules and/or sets of instructions in memory) may detect contact (and any movement or breaking of the contact) on the touch screen and convert the detected contact into interaction with user interface elements (e.g., one or more virtual buttons, virtual sliders, virtual joysticks, augmented reality elements, etc.) that are displayed on the touch screen. In an exemplary embodiment, a point of contact between a touch screen and the user corresponds to a finger of the user.

The touch sensitive display system may use liquid crystal display (LCD) technology, or light emitting polymer display (LPD) technology, although other display technologies may be used in other embodiments. A touch screen and associated display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

Alternatively, or in addition, the interactive display device 402 may be configured for augmented reality or virtual reality. For example, certain described GUI features may be implemented as "augmentations" in an AR context. Display devices configured for augmented reality can deliver to a user a direct or indirect view of a physical environment which includes objects that are augmented (or supplemented) by computer-generated sensory outputs such as sound, video, graphics, or any other data that may augment (or supplement) a user's perception of the physical environment. For example, data gathered or generated by a UAV 100 regarding a tracked object in the physical environment can be displayed to a user in the form of graphical overlays via an AR display device while the UAV 100 is in flight through the physical environment. In such a context, the interactive display device 402 may include a transparent substrate (e.g., made of glass) on which the graphical overlays are displayed. User interaction with the augmentations may be detected, for example, using motion sensors to detect hand gestures by the use or through the use of associated input devices such as a motion sensing wand or similar input device.

In any case, the interactive display device 402 can be used to implement a GUI generated by a GUI module 404. The GUI module 404 may include a combination of hardware and or software for generating and rendering the graphical aspects of the GUI and processing inputs based on user interaction with the interactive display device 402. In some embodiments, the GUI module 404 may comprise or be part of an application installed at the mobile device 104 for controlling the UAV 100.

The GUI generated by GUI module 404 may include a variety of interactive elements through which the user can interact with the GUI to control the behavior of the UAV 100. As will be described in more detail, the GUI presented via the interactive display device 402 may include a view of a surrounding physical environment (e.g., from a perspective of the UAV 100 in flight) as well as the various interactive elements. The interactive elements may include virtual buttons, virtual sliders, virtual joysticks, interactive overlays, or any other types of interactive GUI elements.

Certain information presented, by the GUI module 404, may be based on sensor data and/or state information received from the UAV 100, for example, via a wireless communication link. For example, the view of the physical environment may include a live video feed from an image capture device 114/115 onboard the UAV 100. As shown in FIG. 4A, such sensor data or other state information (e.g., current position, velocity, etc.) associated with the UAV 100 can be wireless transmitted and received by a wireless communication device 406 at the mobile device. Similarly, user interaction detected by the interactive display device 402 and/or GUI module 404 may be converted into user interaction data or control inputs that can be wirelessly transmitted and received by a wireless communication device 408 at the UAV 100. The wireless communication devices 406 and 408 may include, for example, transceivers and associated modules for receiving and transmitting wireless signals such as RF signals.

Figure 4B:
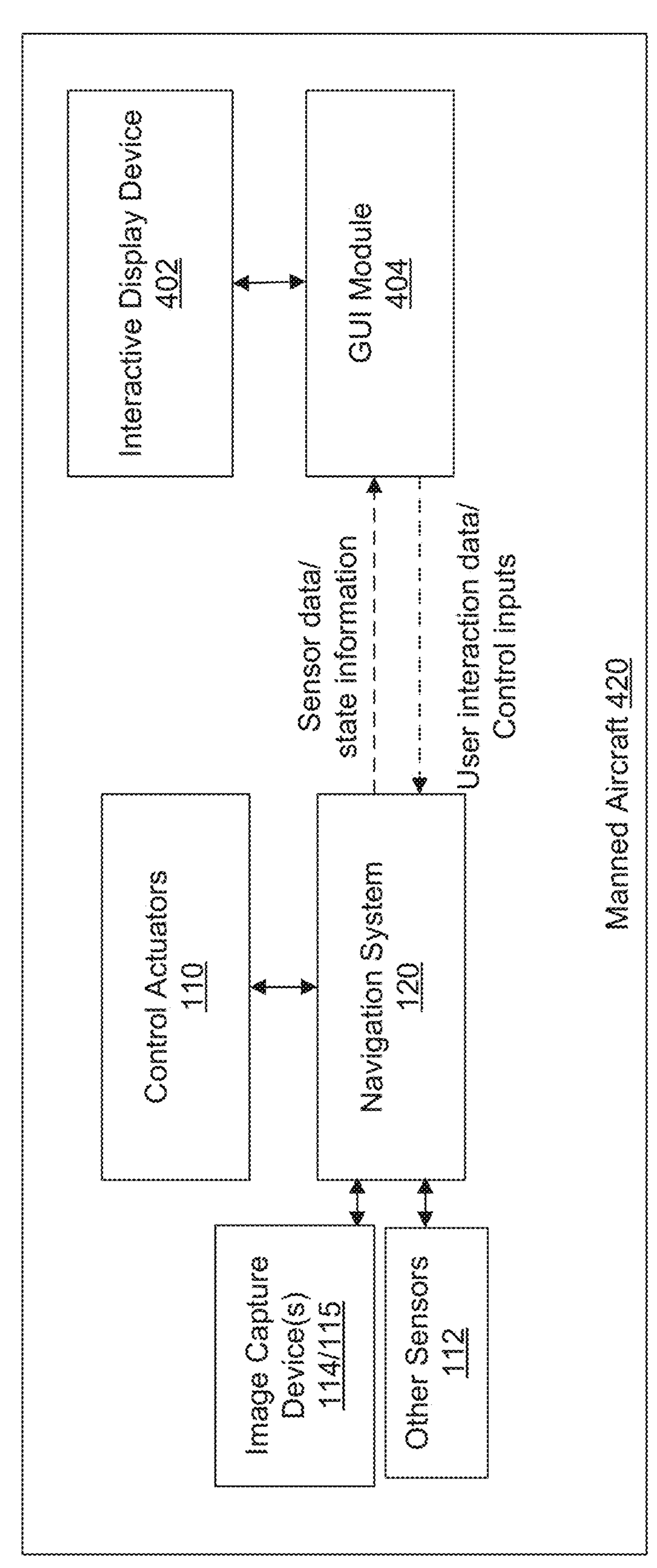

As previously discussed, the introduced technique can similarly be applied to control a manned aircraft. FIG. 4B shows an example system 400*b* similar to system 400*a* except that various components (e.g., navigation system 120, interactive display device 402, and GUI module 404) are all onboard a manned aircraft 420.

Figure 5:
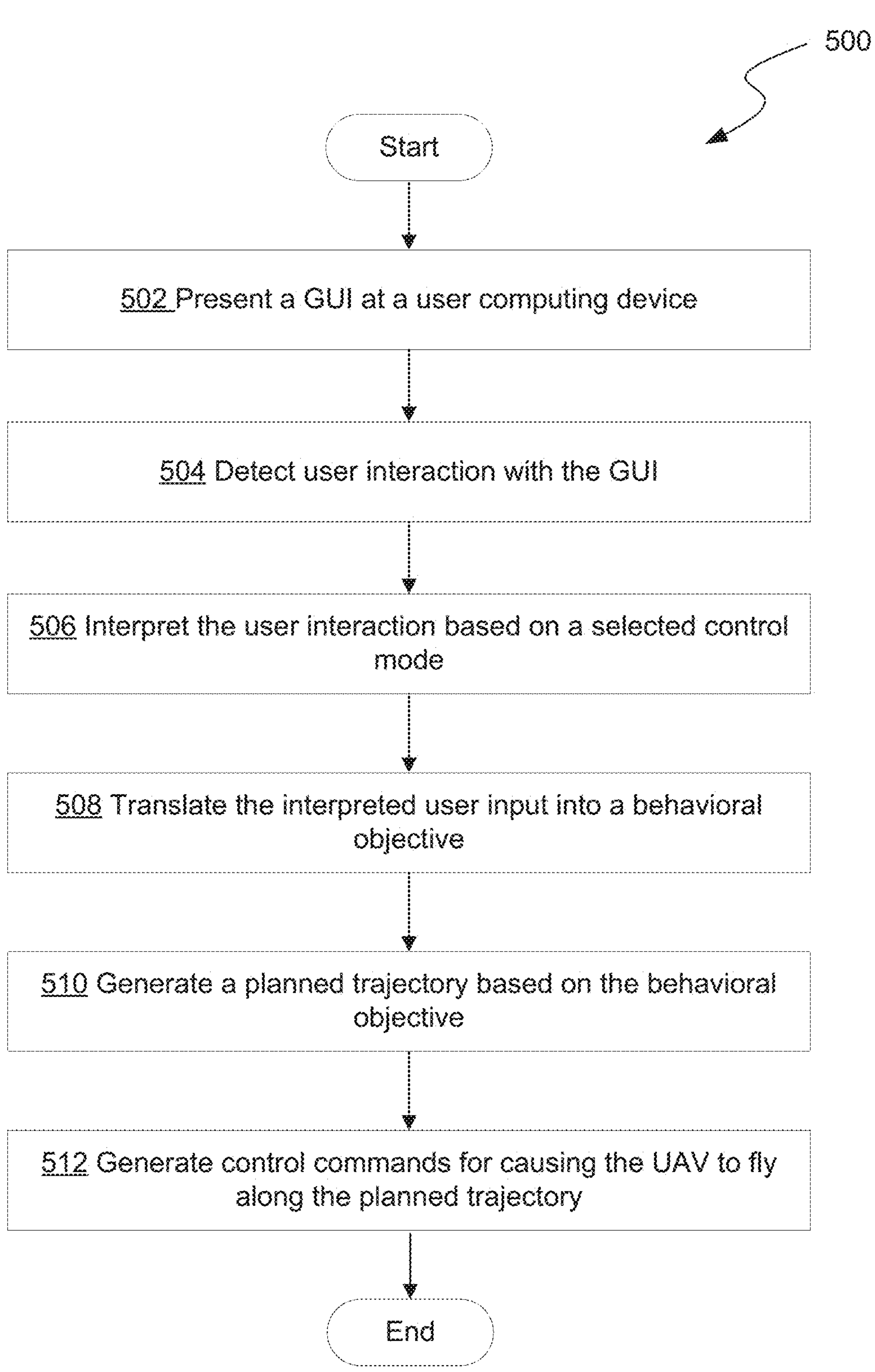
FIG. 5 shows a flow chart of an example process for implementing a GUI, according to the introduced technique.

FIG. 5 shows a flow chart of an example process 500 controlling an aircraft such as UAV 100 using a GUI according to the introduced technique. One or more steps of the example process may be performed by any one or more of the components of the example systems 400*a*-*b* depicted in FIG. 4A-4B. For example, in some embodiments, the steps of process 500 may be performed by the GUI module 404 and/or navigation system 120. Further, performance of example process 500 may involve any of the computing components of the example computer systems of FIG. 41 or 42. For example, the process 500 may be represented in instructions stored in memory that are then executed by a processing unit. Process 500 described with respect to FIG. 5 is an example provided for illustrative purposes and is not to be construed as limiting. Other processes may include more or fewer steps than depicted while remaining within the scope of the present disclosure. Further, the steps depicted in example processes may be performed in a different order than is shown.

Example process 500 begins at step 502 with presenting a GUI using an interactive display device 402. As previously discussed, the GUI may include a display of a view of the physical environment from a perspective of the UAV 100 that is in flight in the physical environment. The view may be generated based on sensor data from sensors onboard the UAV 100 such as image capture devices 114/115 and/or other sensors 112. In some embodiments, the view is presented as live video feed from an image capture device 114/115 onboard the UAV 100. Alternatively, or in addition, the view may include a rendering of a three-dimensional (3D) model of the physical environment that is generated, at least in part, based on sensor data from sensors onboard the UAV 100.

The GUI may also include various interactive elements (e.g., virtual buttons, virtual sliders, etc.) through which the user can interact with the GUI. Notably, the arrangement of interactive elements displayed in the GUI may depend on a currently selected control mode. For example, as will be described in more detail, a combination of a selected type of operation and selected cinematic mode (collectively referred to as control mode) may determine which interactive elements are presented to a user via the GUI and how such elements are presented. The GUI may include a particular interactive element (e.g., a graphical menu) for selecting from multiple available control modes.

Process 500 continues at step 504 with detecting a user interaction with the GUI. In embodiments that include a touch sensitive display system, step 504 may include detecting contact between a user's finger and the touch sensitive sensors of the display screen and converting that detected contact into interaction data indicative of the user interaction. This interaction data may include, for example, the location on the screen where contact occurred, recognized gestures (e.g., the user's finger swiping or drawing a pattern), recognized multi-gestures (e.g., the user's finger making a pinching or rotating multi-gesture), etc. In some embodiments, the touch sensitive display system may be further configured to sense a level of force applied by the user's finger and incorporate that into the interaction data.

Other embodiments that do not include a touch sensitive display system may perform step 504 differently. In some embodiments, the user may interact with the GUI by making gestures (e.g., with fingers, hands, arms, etc.) in the air that are picked up by one or more motion sensors and detected as user interaction. For example, a sensor device located in proximity to the user may detect and track the motion of the user's finger, interpret the motion, and recognize the motion as indicative of a user interaction with the GUI. The sensor device may include image capture devices to capture images of the user that are then analyzed using computer vision techniques to detect and track the motion of an object such as the user's finger. The sensor device may be separate from the mobile device 104 or may be integrated as part of the mobile device. In some embodiments, the sensor device used to detect the user interaction may be onboard the UAV 100 provided the UAV 100 is located near enough to the user for the sensor device to detect the user's motions. In some embodiments, the user may hold a passive hand-held wand or light source that is specifically recognizable to the sensor device.

In some embodiments, the user may move to the mobile device 104 to interact with the GUI. For example, the mobile device 104 may be equipped with onboard motion sensors (e.g., accelerometer, gyroscope, IMU, etc.) that can sense the motion of the mobile device. The user may interact with the GUI by moving the mobile device around in a manner that is recognizable to the system as a user interaction input.

Process 500 continues at step 506 with interpreting the detected user interaction based on a currently selected control mode. The manner in which the UAV 100 responds to user interaction with the GUI will depend on which control mode it is in. The selected control mode may represent a combination of a mode of operation (e.g., normal vs. tracking) as well as a selected cinematic mode (e.g., orbit, tripod, follow, etc.). Accordingly, step 406 may include identifying a current control mode and recognizing the detected user interaction as indicative of a particular user input, command, intention, etc. associated with that control mode. For example, each of the plurality of control modes may be associated with a set of user input commands where each of the user input commands is associated with a particular type of interaction with the GUI whether that interaction is simply "pressing" a displayed virtual button or performing a more complex gesture input over the displayed view of the physical environment. The manner in which the UAV 100 responds to user interaction in the various control modes is described in more detail later.

Process 500 continues at step 508 with translating the interpreted user interaction with the GUI into a behavioral objective that is useable by the navigation system 120 for controlling the behavior of the UAV 100. For example, if the user interaction is interpreted as a command to land, that user interaction can be translated into a behavioral objective that causes the UAV 100 to autonomously maneuver to land. Translating the interpreted user interaction into a behavioral objective (i.e., generating the behavioral objective) may include setting parameters such as a target, dead-zone, weighting, etc. for the objective and encoding those parameters into one or more equations for incorporation into one or more motion planning equations that are utilized by the motion planner 130 of the navigation system 120.

In some situations, step 508 may include generating a new behavioral objective for processing by the motion planner 130 of the navigations system 120. In other situations, step 508 may include updating or otherwise adjusting a previously generated behavioral objective. In other words, in response to a user interaction with the GUI, step 508 may include adjusting various parameter values (e.g., target, dead-zone, weighting, etc.) of a previously generated behavioral objective. As an illustrative example, an initial user selection via the GUI may generate a tracking objective with a first set of parameters that cause the UAV 100 to track a first detected object in the physical environment. In response to a user selecting, via the GUI, a second object to track, that initial tracking objective may be updated, for example, by changing the target parameter of the tracking objective.

In some embodiments, the behavioral objective is generated by a processor at the mobile device 104 (e.g., based on instructions associated with the GUI module 404) and transmitted via a wireless communication link to the navigation system 120 onboard the UAV 100. Alternatively, or in addition, the behavioral objective may be generated by the navigation system 120 onboard the UAV 100 based on user interaction data received from the mobile device based on the detected user interaction with the GUI.

Process 500 concludes at step 510 with generating a planned trajectory based on the behavioral objective and at step 512 with generating control commands for causing the UAV 100 to fly along the planned trajectory. As previously discussed with respect to FIGS. 2 and 3A, these steps may include the motion planner processing the objective generated at step 508 with one or more other objectives to generate a planned trajectory that satisfies (or nearly satisfies) all the objectives. That planned trajectory can then be utilized (e.g., by a flight controller 160) to control one or more control actuators 110 (e.g., rotors, control surfaces, etc.) to cause the UAV 100 to maneuver along the planned trajectory through the physical environment. Notably, in situations, a behavioral objective generated at step 508 based on user interaction with the GUI may not be satisfied by the planned trajectory if, for example, another more important behavioral objective (e.g., collision avoidance) supersedes.

Example User Interface

FIGS. 6-31 show a series of screen captures illustrating various features of an example GUI that can be implemented to facilitate user control of the previously described UAV 100. The GUI can be displayed as a graphical output via an interactive display device 402 (e.g., a touch-sensitive display) of a computing device such as mobile device 104 (e.g., a user's tablet or smartphone). In each of the screen captures, the GUI includes a view of the surrounding physical environment based, at least in part, on sensor data captured by sensors onboard the UAV 100. For example, the view may be a live video feed from an image capture device (e.g., image capture device 115) onboard the UAV 100. Alternatively, or in addition, the view of the physical environment may include a rendering of a 3D model of the surrounding physical environment that is generated based on data gathered by sensors onboard the UAV 100. In any case, the view presented via the GUI may correspond with a view from the perspective of the UAV 100 in flight through the physical environment. In some cases, the view displayed in the GUI will directly correspond with a view from an image capture device 115 capturing images (including video) for recording and later display. The GUI further includes various interactive elements that are displayed along with the view. In some cases, the interactive elements are overlaid on the displayed view. By interacting with the interactive elements (e.g., through touching the screen of the mobile device 104), a user can input commands that are interpreted and utilized by the previously described systems to control the UAV 100. As will be described, the interactive elements available to the user via the GUI may dynamically change in various contexts. For example, the interactive elements may dynamically change based on user selection of various available control modes. The GUI may further include other graphical elements that may or may not be interactive, but that may provide certain information to the user. For example, graphical elements may be overlaid on a portion of the displayed view corresponding to an object being tracked by the UAV 100.

For illustrative simplicity, the GUI is described with respect to FIGS. 6-31 in the context of a mobile device 104 with a touch sensitive display. However, a person having ordinary skill in the art will recognize that the features of the described GUI may similarly be applied using other types of user interaction paradigms. For example, certain described GUI features may be implemented as "augmentations" in an augmented reality (AR) context or may utilize other types of user interaction mechanisms such as motion sensors.

Panning and Tilting

Figure 6:
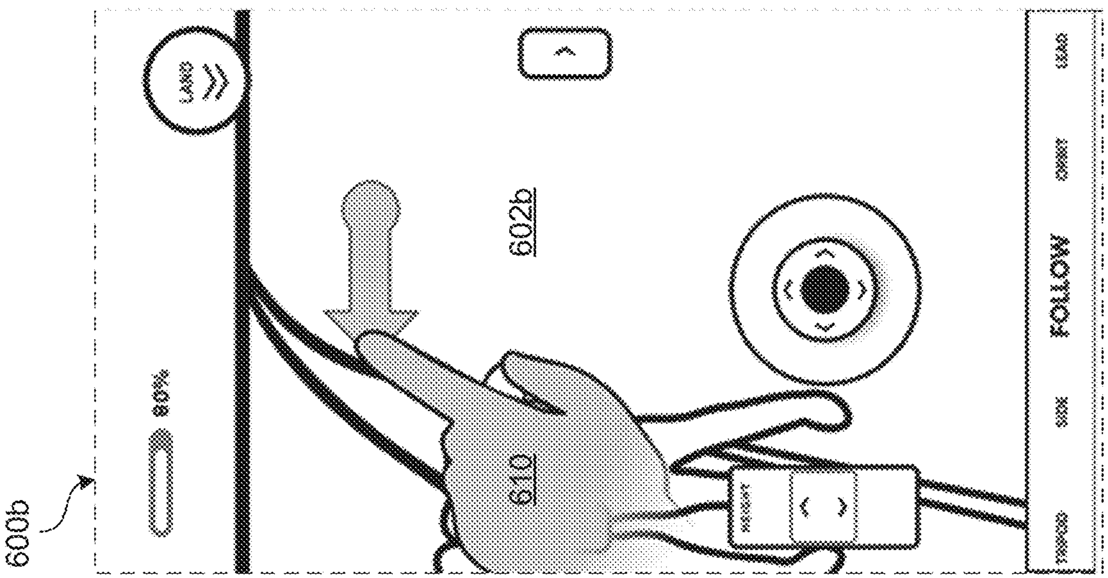
Figure 6:
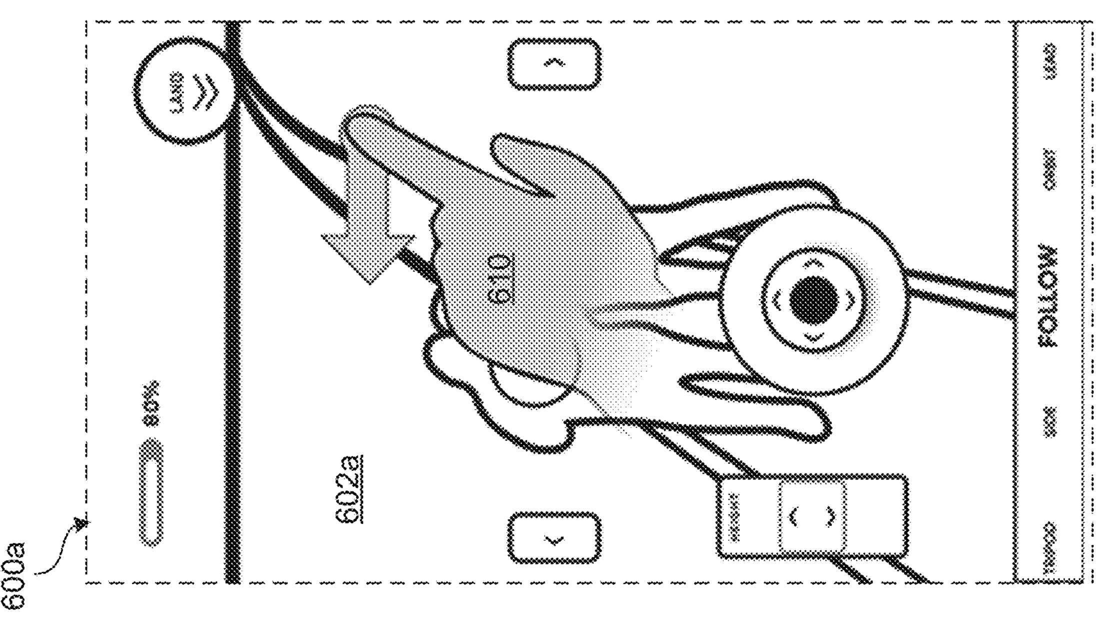

FIG. 6 shows a sequence of screens 600*a* and 600*b* that illustrate a panning/tilting feature that can be implemented using the described GUI. As shown in FIG. 6, a user can input a pan/tilt command by dragging a finger 610 across a displayed view 402*a*-*b* of the physical environment. In some embodiments, an interactive display device 402 may detect the user interaction and, depending on a selected control mode, a GUI module 404 may interpret the detected user interaction as a dragging gesture that is indicative of a pan and/or tilt command. This interpreted interaction may then be translated into a behavioral objective that is fed into a motion planner 130 such that as the user drags the finger 610 across the screen, the displayed view pans and/or tilts based on the detected dragging motion. Note that the manner in which the UAV 100 responds to produce this pan and/or tilt effect will depend on the implementation and the capabilities of the UAV 100. For example, in some embodiments, this input by the user may cause the UAV 100 to rotate in place about a current position such that the view presented in the GUI pans and/or tilts. In some embodiments, this input by the user may cause a gimbaled camera such as image capture device 115 to rotate while the UAV 100 remains stationary such that the view presented in the GUI pans and/or tilts. In some embodiments, this input by the user may cause some combination of motion by the UAV 100 and rotation of a gimbaled image capture device 115.

In some embodiments, regardless of any vertical motion in the user's finger 610, the UAV 100 may remain at a particular altitude (i.e., within a particular XY plane parallel to the ground plane) when responding to the pan/tilt input. For example, depending on a currently selected control mode, the GUI module 404 may interpret a substantially lateral dragging motion or gesture as a pan/tilt command regardless of whether the user's dragging motion is perfectly level. Based on this interpretation, a pan and/or tilt objective may be generated that causes the UAV 100 to either rotate or move in the XY plane while maintaining a constant altitude. In some embodiments, vertical motion in the user's finger 610 may result in a gimbaled image capture device

115 panning or tilting up or down while the UAV 100 remains at a constant altitude.

Modes of Operation and Subject Selection

The disclosed UAV 100 and associated GUI may include multiple different modes of operation. As previously discussed, the different types of operation may be user selectable and may impact how interactive elements are presented in the GUI and how user interaction with the GUI is interpreted to control the flight by the UAV 100. In the described embodiment, the GUI has two types of operation: normal flight and subject-following.

A followed subject may be any detected and tracked object in the surrounding physical environment such as people, animals, vehicles, buildings, plants, landscape features, or any other physical objects detected by the sensing systems of the UAV 100.

Figure 7:
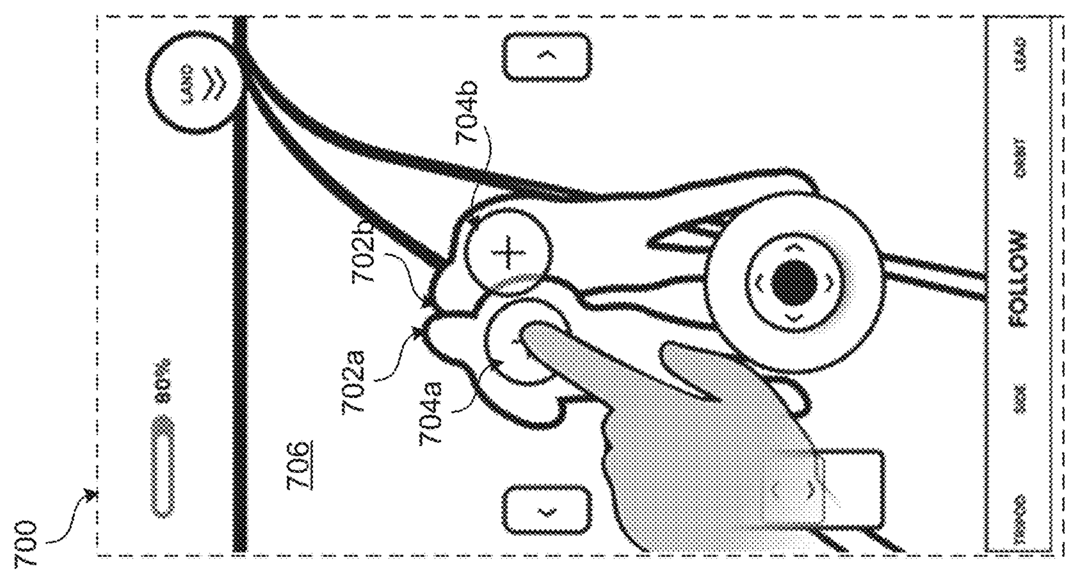

An object detected and tracked by the UAV 100 can be identified via the GUI by displaying an indicator of some type. For example, FIG. 7 shows a screen 700 of the example GUI in which two people 702*a-b* are depicted in the view 706 of the physical environment. These two people 702*a-b* are identified as such and tracked by a tracking system 140 associated with the UAV 100. Graphical icons 704*a-b* are overlaid in the view 706 at locations corresponding to the locations of the people 702*a-b*. As the people 702*a-b* and/or the UAV 100 move (thereby causing the view 706 to change) the icons 704*a-b* will track to follow the detected people 702*a-b*.

In some embodiments, the icons 704*a-b* are interactive graphical elements through which a user can select a particular subject for following. In response to selection by a user (e.g., by tapping an icon corresponding with a potential subject as shown in FIG. 5), the UAV 100 and GUI may change from normal flight operation to subject-following operation. This may cause different control options to be displayed via the GUI as will be described later.

Figure 8:
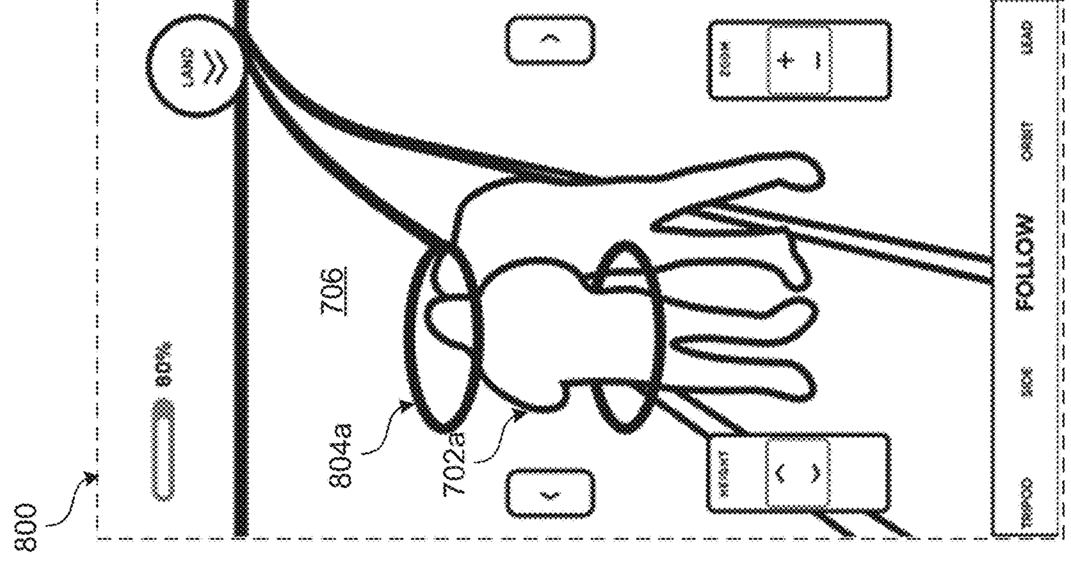

In certain embodiments, the GUI may display an indication of a followed subject, for example, as shown in FIG. 8, which conveys to the user that the UAV 100 and GUI are operating in a subject-following mode as opposed to a normal mode of operation. FIG. 8 shows a screen 800 of the example GUI in which a user has selected person 702*a* as a subject for following. As shown in FIG. 8, the GUI provides an indication of the selected subject by displaying an updated graphical element 804*a* at a location corresponding to the selected subject 702*a*. Specifically, the interactive graphical element 804*a* is depicted in FIG. 8 as circular slider element that is displayed in the GUI at a location corresponding to the depicted selected subject 702*a*; however, any other type of indication, graphical or otherwise, may similarly be implemented.

Similarly, the GUI may include mechanisms for switching back to a normal mode of operation from a subject-following mode. For example, a user may simply select an option presented in the GUI to cancel a selection of a particular subject to follow. In response, the UAV 100 and GUI may automatically revert to a normal mode of operation until a new subject is selected by the user using the GUI. In some embodiments, the UAV 100 and GUI may automatically revert to a normal mode of operation event if not requested by the user, for example, in response to losing tracking of the selected subject. A person having ordinary skill in the art will recognize that the UAV 100 and GUI may switch between modes of operation based on various commands input by the user or otherwise.

Cinematic Modes

The UAV 100 and GUI may also include multiple different cinematic modes that, when selected, affect aircraft behavior and flight planning. FIG. 9, for example, shows a series of screens 900*a-b* that illustrate how a user can select between different cinematic modes by utilizing an interactive menu 902 located at the bottom of the GUI. The cinematic mode selection menu 902 depicted in FIG. 9 is just an example provided for illustrative purposes. Such a menu or indication may be presented differently in other embodiments. The manner in which the motion planner 130 generates a proposed trajectory based on received perception inputs and control inputs may depend on the selected cinematic mode at any given time.

As with the mode of operation, a selected cinematic mode may change the way in which interactive elements are presented via the GUI as well as how certain user interaction is interpreted to control the UAV 100. The combination of selected mode of operation and selected cinematic mode may be collectively referred to as control mode.

Figure 10:
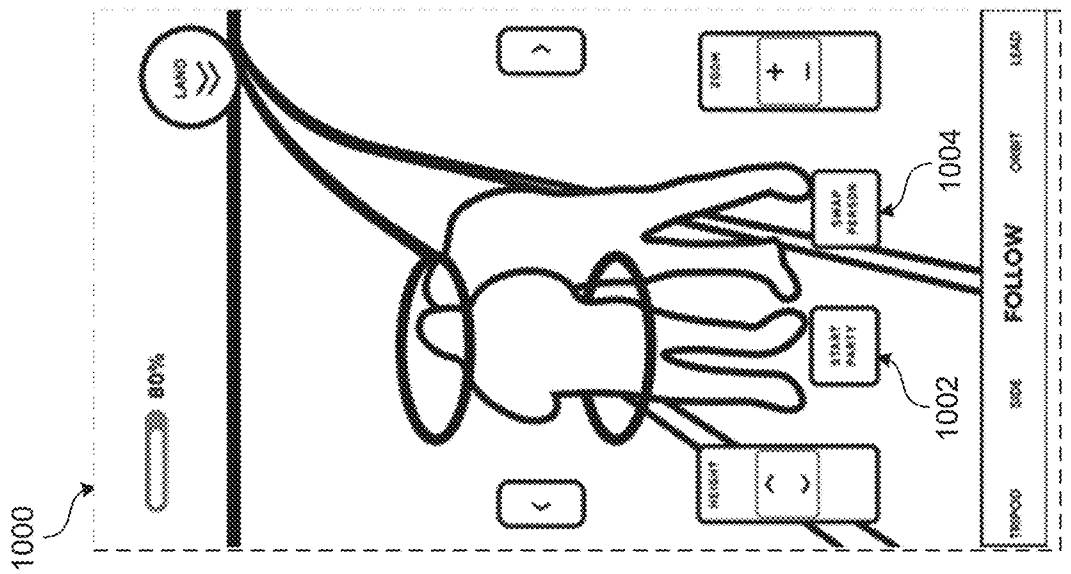

As an illustrative example, FIG. 10 shows a screen 1000 of the example GUI that illustrates how a "Party" flight cinematic mode may show different interactive elements such as element 1002 to start a party and element 1004 to swap a selected subject in the party while in follow mode. For example, a user may select multiple subjects and designate those subjects as a party by selecting interactive element 1002. In response, the UAV 100 may maneuver to keep a particular subject of a designated party centered in the view. By selecting interactive element 1004, the user can swap which subject in the party is followed by the UAV 100 to remain centered in the view.

Figure 11A:
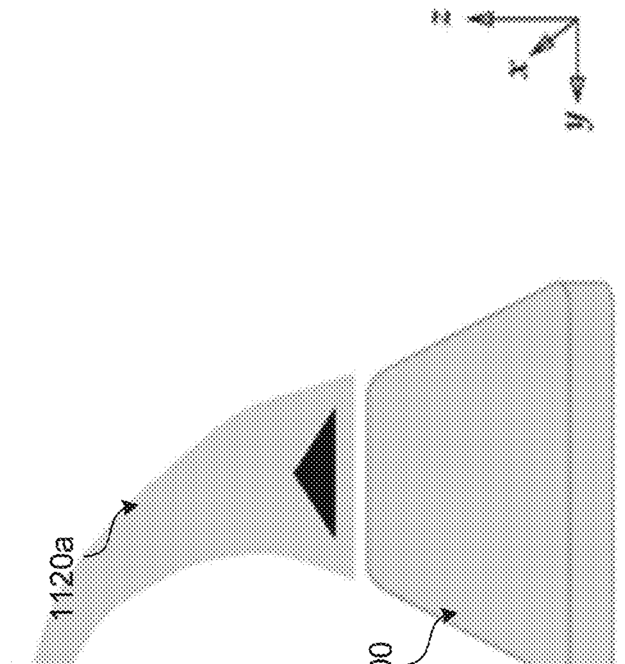
Figure 11A:
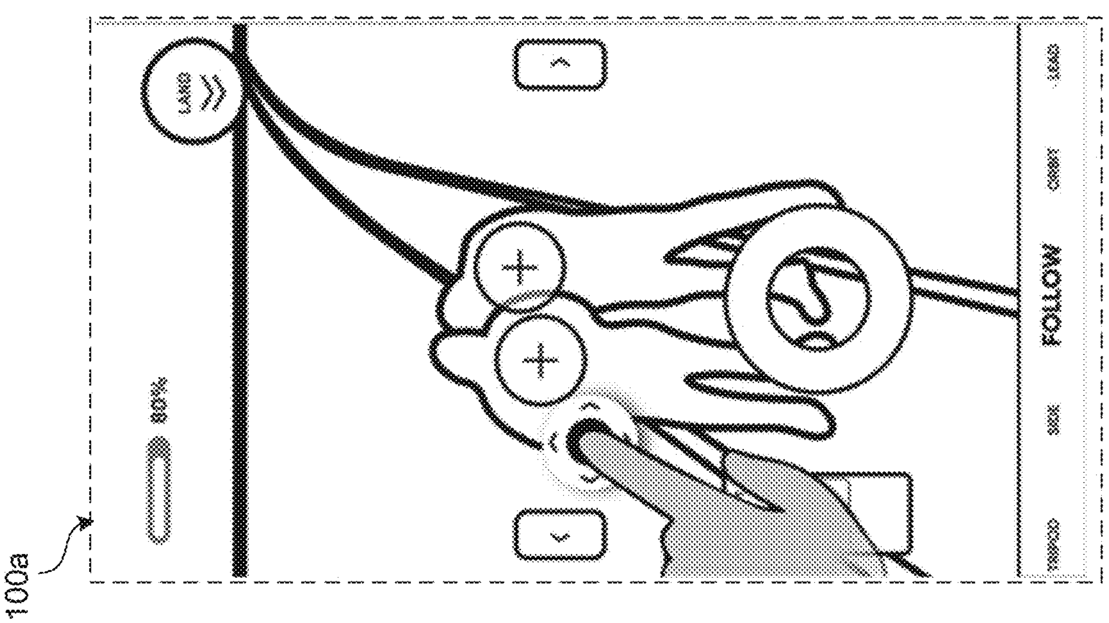
Figure 11B:
Figure 11B:
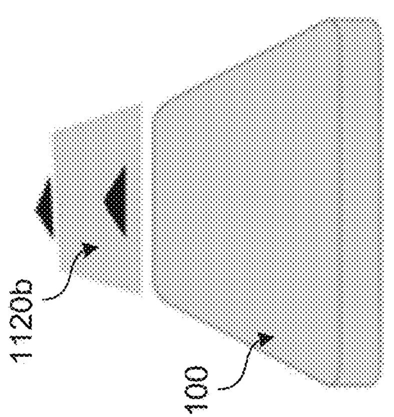
Figure 11B:
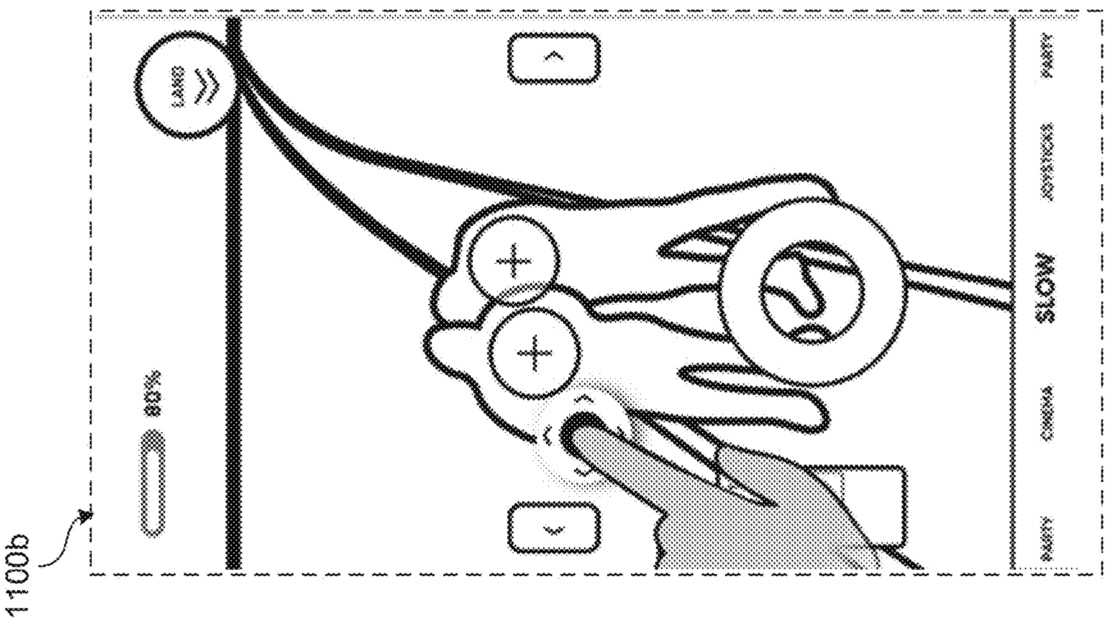

As another illustrative example, FIG. 11A shows how the UAV 100 may respond differently in response to similar user inputs based on the selected cinematic mode. In FIG. 11A, a user input via screen 1100*a* (in "follow" mode) may cause a particular maneuver by UAV 100 as indicated by trajectory 1120*a*. In contrast, a similar user input via screen 1100*b* (shown in FIG. 11B) (in "slow" mode) may cause a different (e.g., less drastic) maneuver by the UAV 100 as indicated by trajectory 1120*b*.

GUI Controls in Normal Operation

Figure 12A:
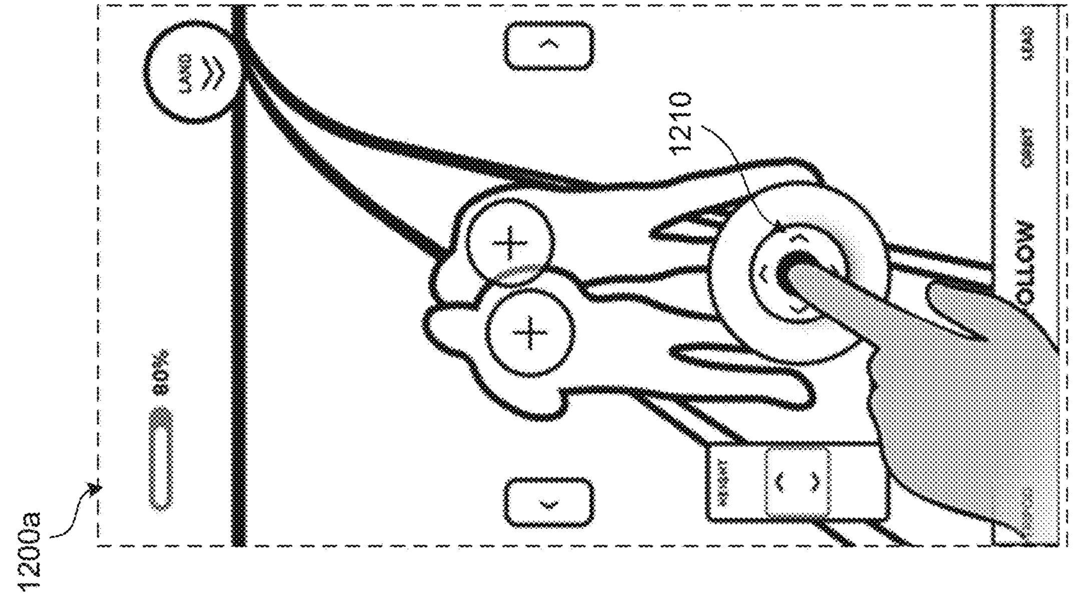
Figure 12B:
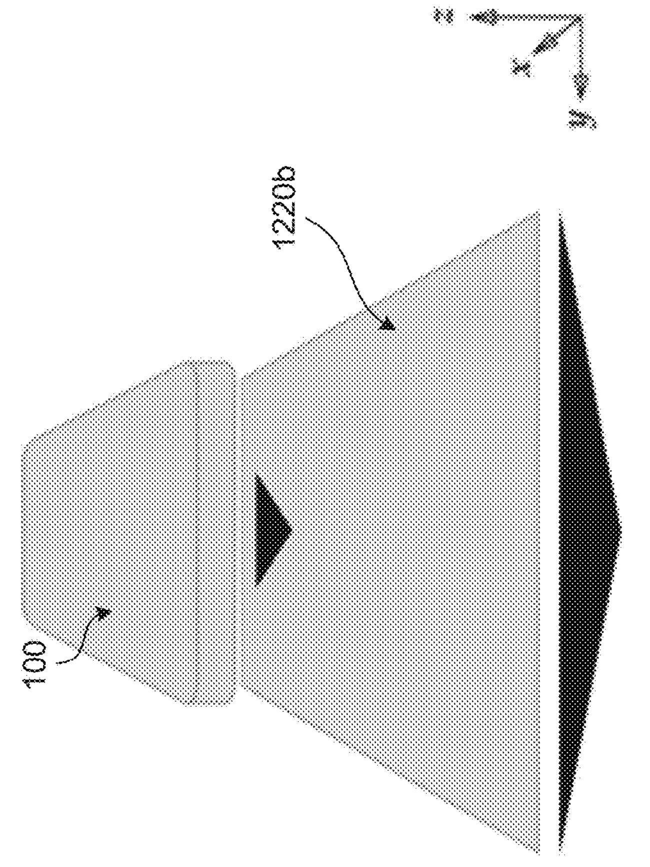
Figure 12B:
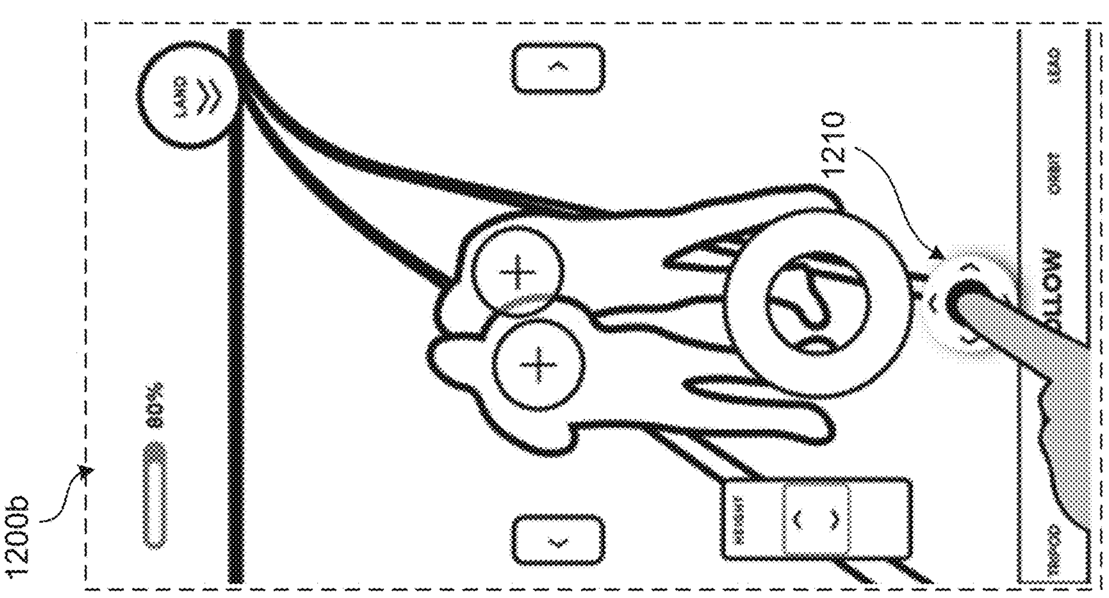

Again, the combination of the selected mode of operation and selected flight cinematic mode (collectively, the control model) will determine which controls are presented to the user via the GUI and how user interaction with the GUI is interpreted. In an example normal flight operation mode, a virtual steering stick or joystick is provided to allow the user to control the motion of the UAV 100 in two dimensions (e.g., along an XY plane parallel to the ground). FIG. 12A shows a screen 1200*a* of the example GUI including an interactive graphical element in the form of a virtual joystick 1210. The virtual joystick 1210 allows for forward/backward movement (e.g., as shown in FIG. 12B) and left/right yaw control (see e.g., FIGS. 12C and 12D). As with other controls in the example GUI, the virtual joystick 1210 may be based on velocity sliders. In other words, the further the user presses the virtual joystick 1210 and drags in a particular direction, the greater the resulting velocity of the UAV 100 in a corresponding direction in the physical environment. The velocity slider associated with the virtual joystick 1210 may be scaled linearly or non-linearly.

FIG. 12B shows how the UAV 100 may maneuver in response to a user pressing down on a virtual joystick in a normal flight mode. For example, FIG. 12B shows a screen 1200*b* in which the user has pressed down on the virtual joystick 1210. In response, the UAV 100 may move in a backward direction in the XY plane as indicated by trajectory 1220*b*.

FIG. 12C shows how the UAV 100 may maneuver in response to a user pressing the virtual joystick up and to the right while in a normal flight mode. For example, FIG. 12C shows a screen 1200*c* in which the user has pressed the virtual joystick 1210 up and to the right. In response, the UAV 100 may move forward and to the right in the XY plane as indicated by trajectory 1220*c*.

Figure 12D:
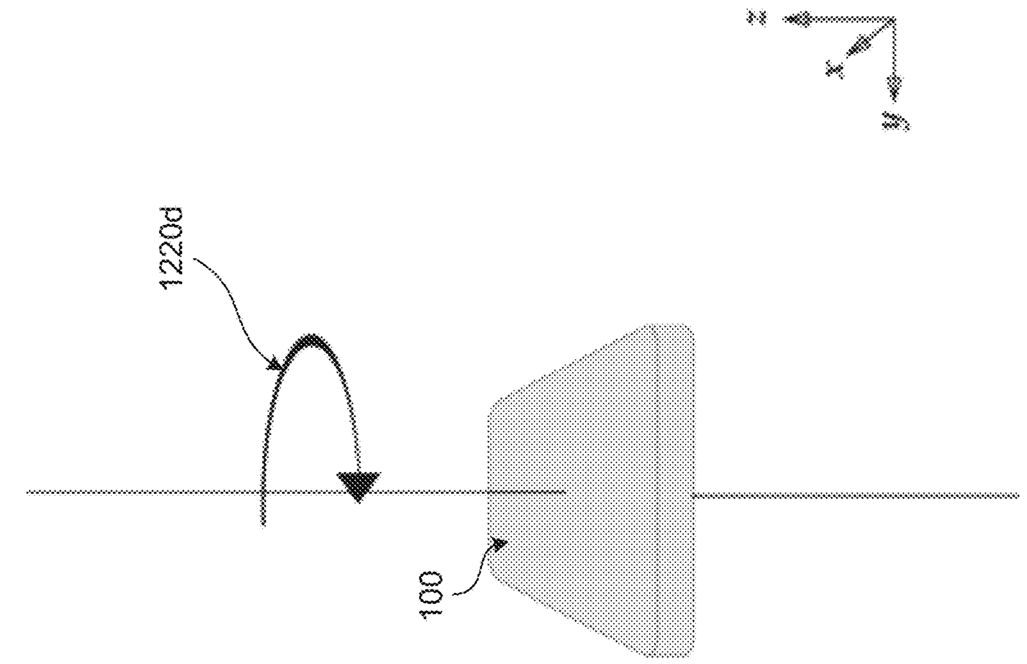
Figure 12D:
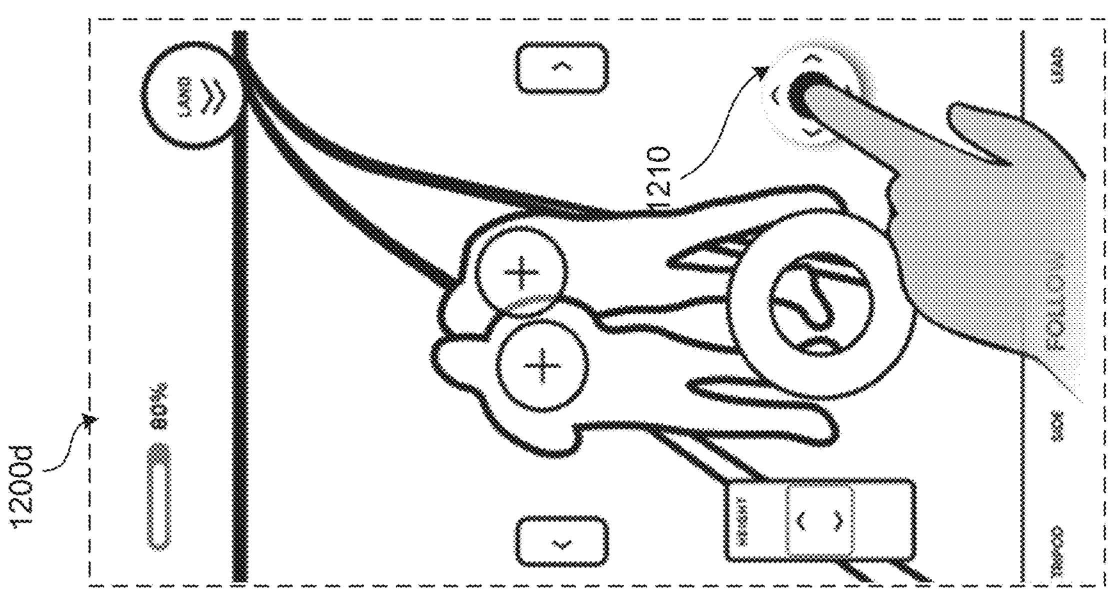

FIG. 12D shows how the UAV 100 may maneuver in response to a user pressing the virtual joystick to the right while in a normal flight mode. For example, FIG. 12D shows a screen 1200*d* in which the user has pressed the virtual joystick 1210 to the right. In response, the UAV 100 may rotate about a Z axis in the XY plane as indicated by rotation indicator 1220*d*.

The user interactions and resulting responses described with respect to FIGS. 12A-12D are examples provided for illustrative purposes and are not to be construed as limiting. A person having ordinary skill in the art will recognize that interaction with a virtual joystick or similar interactive element may result in other types of behavior by the UAV 100 in other embodiments.

As mentioned, inputs entered using such a virtual joystick may be interpreted and translated into a behavioral objective that can be utilized by a motion planner 130 to maneuver the UAV 100 in an XY plane parallel to the ground. However, the motion planner 130 may also consider other objectives such as avoiding obstacles when generating a proposed trajectory in response to the user's input. In other words, the motion planner 130 will consider the user's input, but may deviate from following a path dictated by such inputs, if necessary, to satisfy other objectives such as avoiding obstacles. If the user enters an input using the virtual joystick that will cause the UAV 100 to fly into an obstacle, the motion planner 130 may adjust a planned trajectory of the UAV 100 to avoid the obstacle.

Figure 13A:
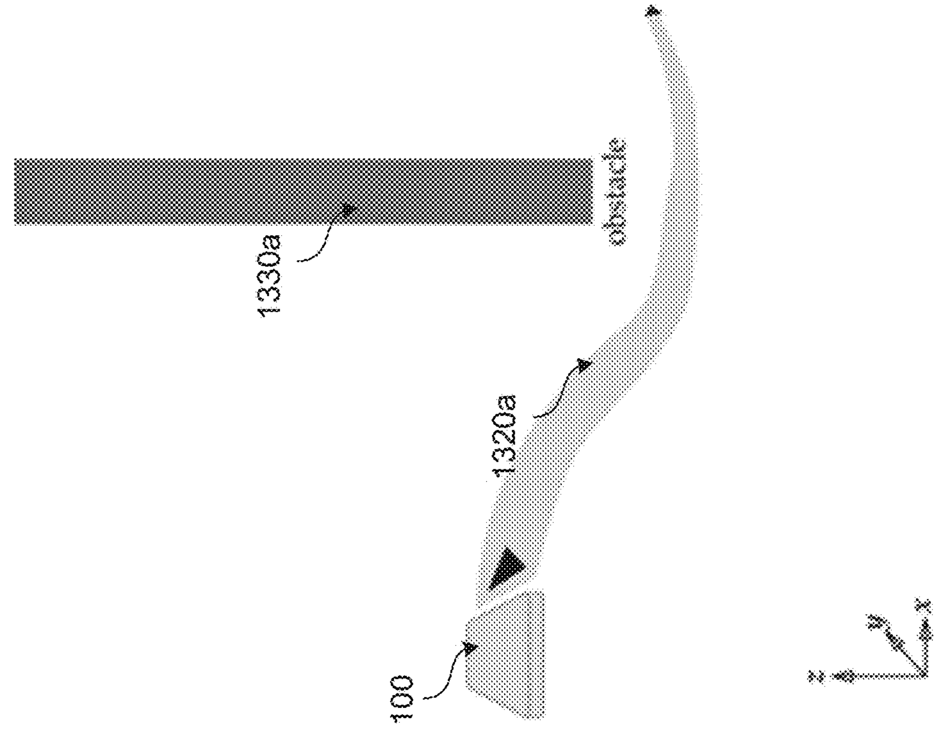
Figure 13A:
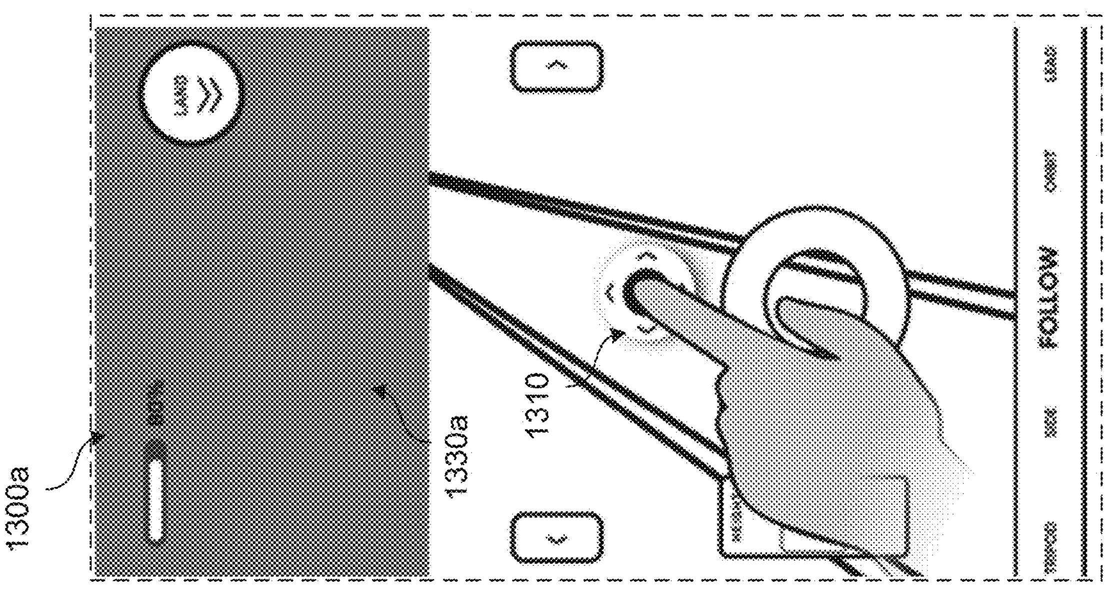

FIG. 13A shows the UAV 100 descending in the Z direction to avoid an obstacle 1330 by going under the obstacle 1330*a* (as indicated by trajectory 1320*a*) regardless of the user input. For example, as shown at screen 1300*a*, the user may press up on the virtual joystick 1310. Under a normal mode of operation, this normally would cause the UAV 100 to maneuver forward in an XY plane (i.e., maintain a constant altitude). However, the motion planner 130, sensing the obstacle, will generate a planned trajectory 1320*a* that causes the UAV 100 to fly under the obstacle in order to satisfy a collision avoidance objective. As previously discussed, the various behavioral objectives processed by the motion planner 130 at any given time may have varying weights based on their relative importance. Here, the collision avoidance objective is weighted more heavily than the behavioral objective based on the user input.

Figure 13B:
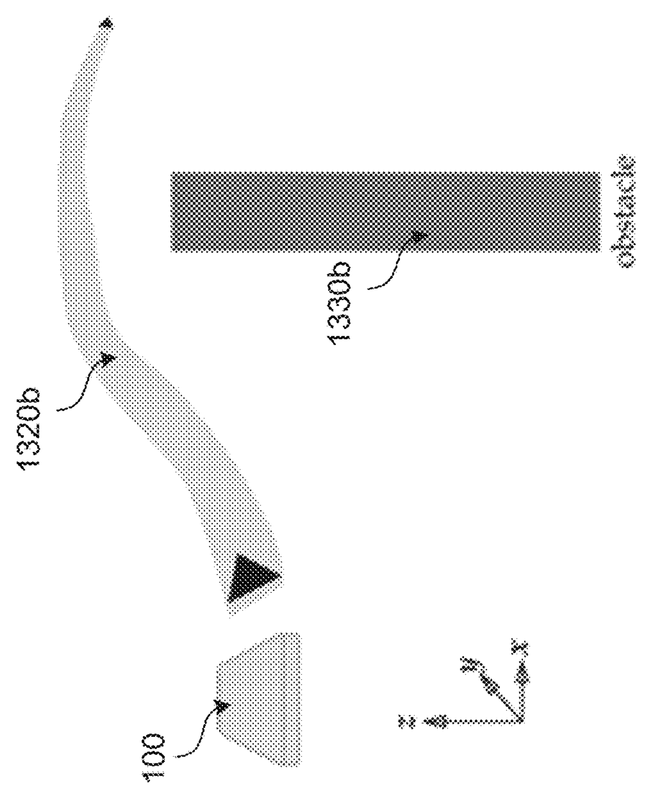
Figure 13B:
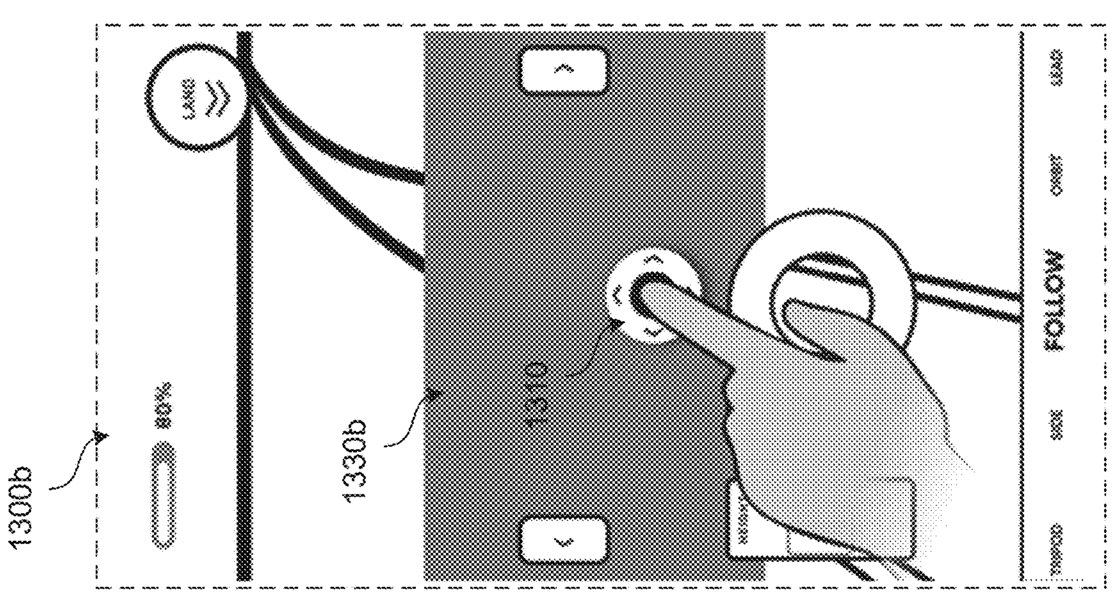

FIG. 13B shows the UAV 100 ascending in the Z direction to avoid an obstacle 1330*b* by flying over the obstacle (as indicated by trajectory 1320*b*) despite a similar user input to the virtual joystick 1310 as indicated in screen 1300*b*. This difference in response as compared to the scenario depicted in FIG. 13A may be based on the difference in relative position between the UAV 100 and obstacles 1330*a-b*.

Similarly, the motion planner 130 may generate a proposed trajectory to avoid the obstacles by moving to the right or left of the obstacle or by halting any motion towards the obstacle if a suitable route is not available or possible. In any case, the manner in which the UAV 100 avoids the obstacle will depend on a number of factors such as the relative position and/or motions between the UAV 100 and obstacle, characteristics of obstacle, characteristics of the physical environment, the capabilities of the UAV 100, the type of user control input, and other navigation objectives being considered. This interpretation of the user's inputs greatly reduces the complexity of flight (from the user's perspective) while simplifying the aircraft dynamics. The user is free to enter any type of input controls without fear of committing a piloting error that leads to any damage or injury.

Figure 14:
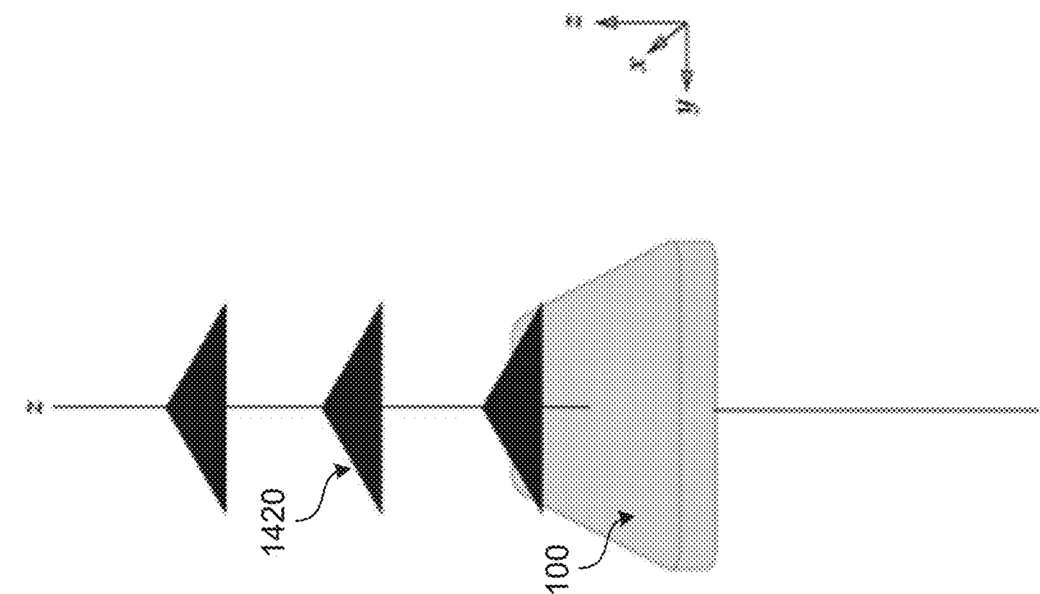
Figure 14:
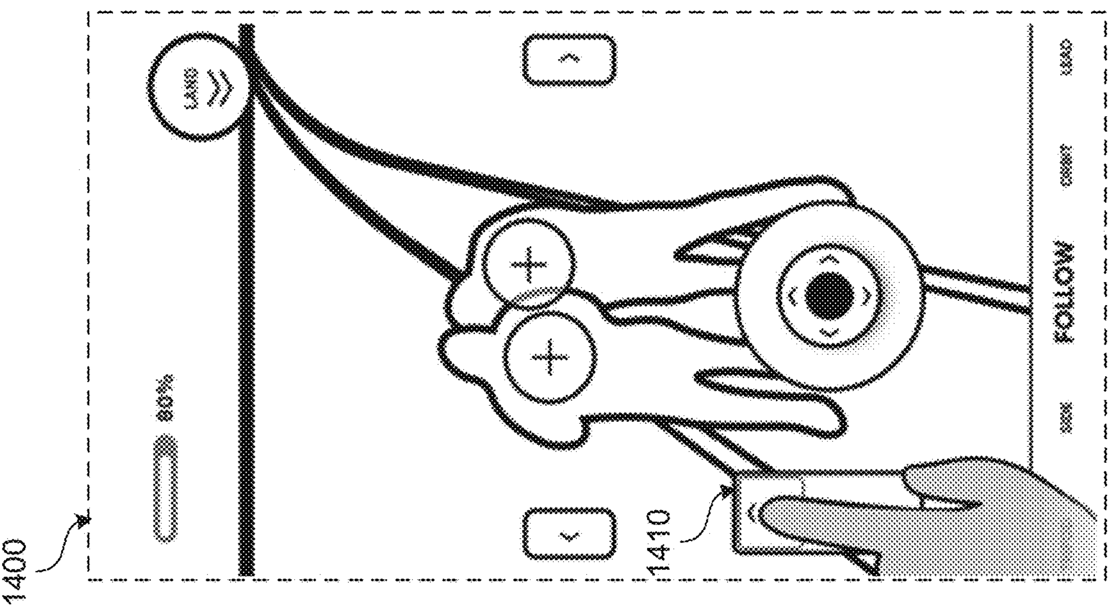

When in a normal mode of operation, use of a virtual joystick can be supplemented with other interactive elements to enable vertical control. FIG. 14 shows a screen 1400 in which a user is interacting with an altitude adjustment element 1410. As with other interactive elements, the altitude adjustment element 1410 may be implemented in the GUI as a velocity slider. In response to the user touching and sliding the element 1401 up, the motion planner 130 may cause the UAV 100 to increase in altitude, for example, as indicated by arrows 1420 along the Z axis. Similarly, in response to the user touching and sliding the element 1401 down, the motion planner 130 may cause the UAV 100 to decrease in altitude.

Figure 15:
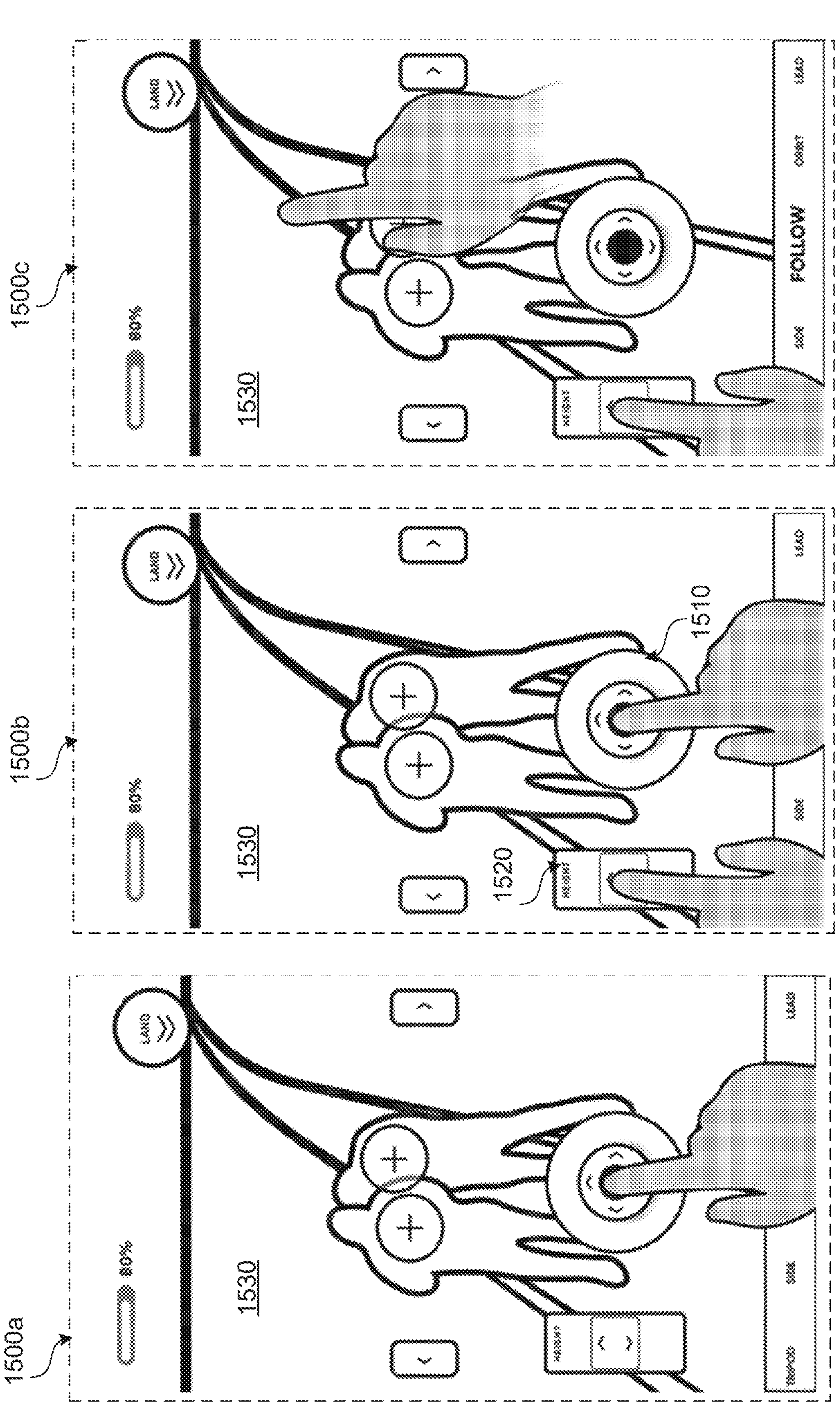

In some embodiments, the GUI may enable the user to enter multi-touch control inputs using multiple fingers. FIG. 15 shows a series of screens 1500*a-c* of the example GUI that illustrate this concept. For example, as previously discussed, each control may be operated individually, using a single finger as shown at screen 1500*a* in FIG. 15. Using two fingers, a user can interact with a virtual joystick 1510 with one finger and with an altitude adjustment element 1520 with another, for example, as shown at screen 1500*b* in FIG. 15. In another situation, the user may interact with the altitude adjustment element 1520 with one finger while controlling the pitch of a gimbaled image capture device 115 with another finger (e.g., by dragging on the view 1530), for example, as shown at screen 1500*c* in FIG. 15.

Figure 16:
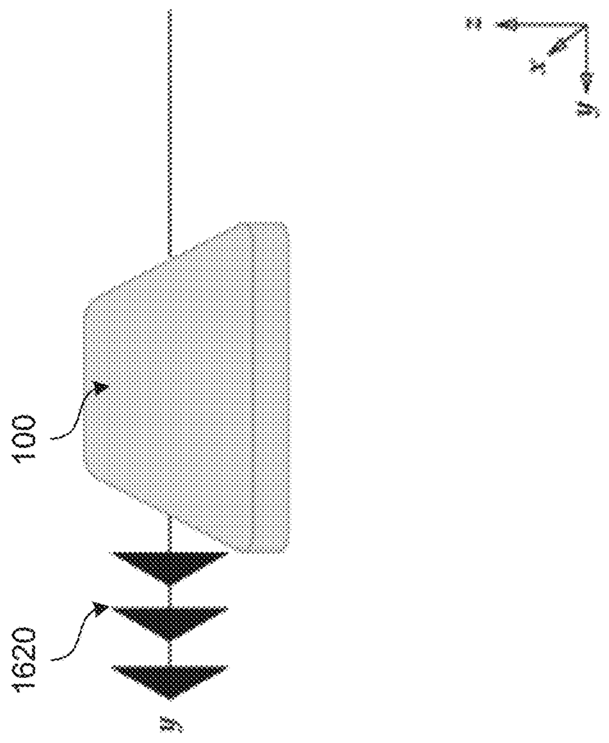
Figure 16:
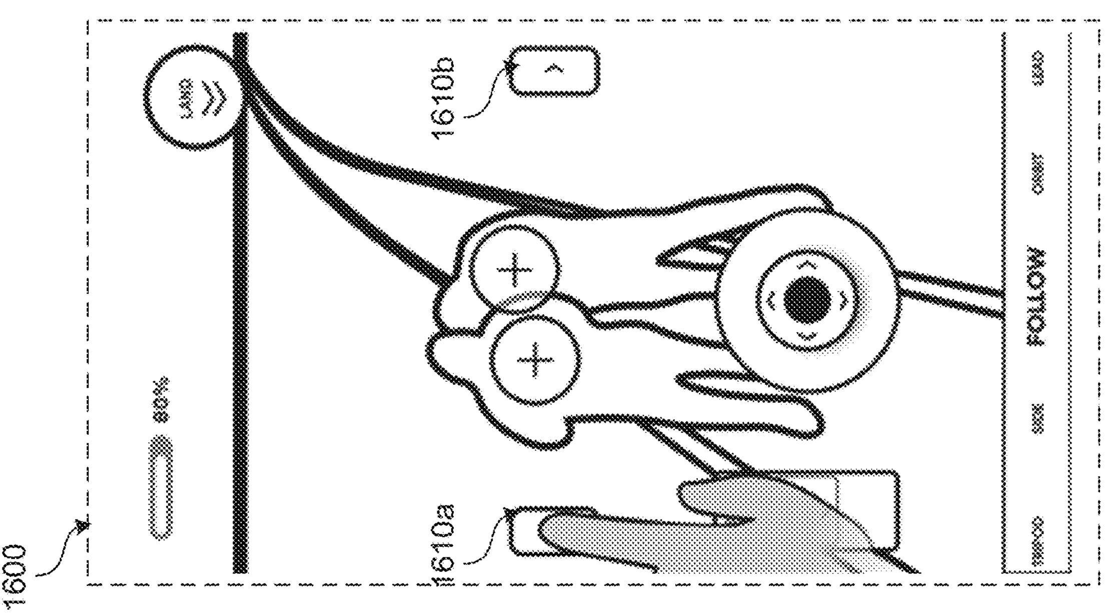

In some embodiments, the GUI may enable the user to input a strafe control input. FIG. 16 shows a screen 1600 of the example GUI in which the user is interacting with interactive elements 1610*a-b* to move the UAV 100 in a single direction to the left or right along the XY plane, for example, as indicated by trajectory 1620. The interactive elements 1610*a-b* may be provided as virtual buttons via the touch display as shown in FIG. 16. Alternatively, an interactive element for performing a strafe maneuver may be implemented as a slider bar similar to the altitude adjustment element 1410 of FIG. 14. In some embodiments, a user tapping one of the virtual buttons 1610*a-b* may cause the UAV 100 to travel a preset distance in a corresponding direction. If the button 1610*a-b* is held down by the user, the UAV 100 may continue to move in that direction at a constant or varying velocity. Again, the UAV 100 may be configured to avoid any obstacles regardless of the user's input.

In some embodiments, the user can define a point in the physical environment, for example, by selecting (e.g., through tapping or double-tapping) a visual representation of that point presented via the view (e.g., the live video feed) of the GUI. FIG. 17 shows a screen 1700 of the example GUI in which a user has double-tapped a point 1710 in the displayed view 1706 of the physical environment. In response, the motion planner 130 of the UAV 100 may identify a point of reference in the physical environment that corresponds to the point 1710 selected by the user and generate a planned trajectory that maneuvers the UAV 100 towards the selected point, for example, as indicated by trajectory 1720. In some embodiments, the motion planner 130 may generate a trajectory that causes the UAV 100 to fly to within a particular range or altitude from the point in the physical environment corresponding to the user's selection. In some embodiments, the UAV 100 may remain at a constant altitude and fly to within a particular range of that point or may increase/decrease altitude accordingly.

In addition to maneuvering the UAV 100 based on the user's selection, a gimbaled image capture device 115 may be automatically adjusted, so as to keep the selected point roughly centered in a field of view (FOV) and in focus. This feature may be referred to as touch-to-focus. In some embodiments, the motion of the UAV 100 in response to a "touch to focus" user input may be restricted to the XY plane (i.e., at constant height) assuming no obstacles. Alternatively, in some embodiments, the UAV 100 may automatically maneuver to a different height based on a location or type of object located at a point selected by the user. For example, if the user's touch input at point 1710 corresponds with the roof of a building, the motion planner 130 may automatically adjust the altitude of the UAV 100 based on a height of that roof (e.g., to maintain a minimum clearance, or to approach closer to inspect the roof).

Figure 18:
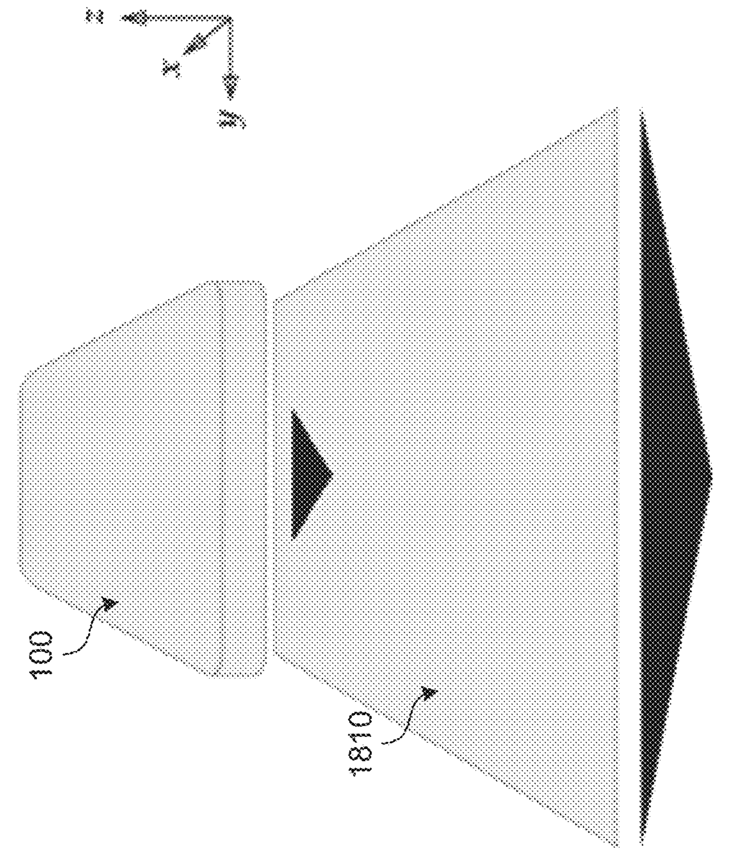
Figure 18:
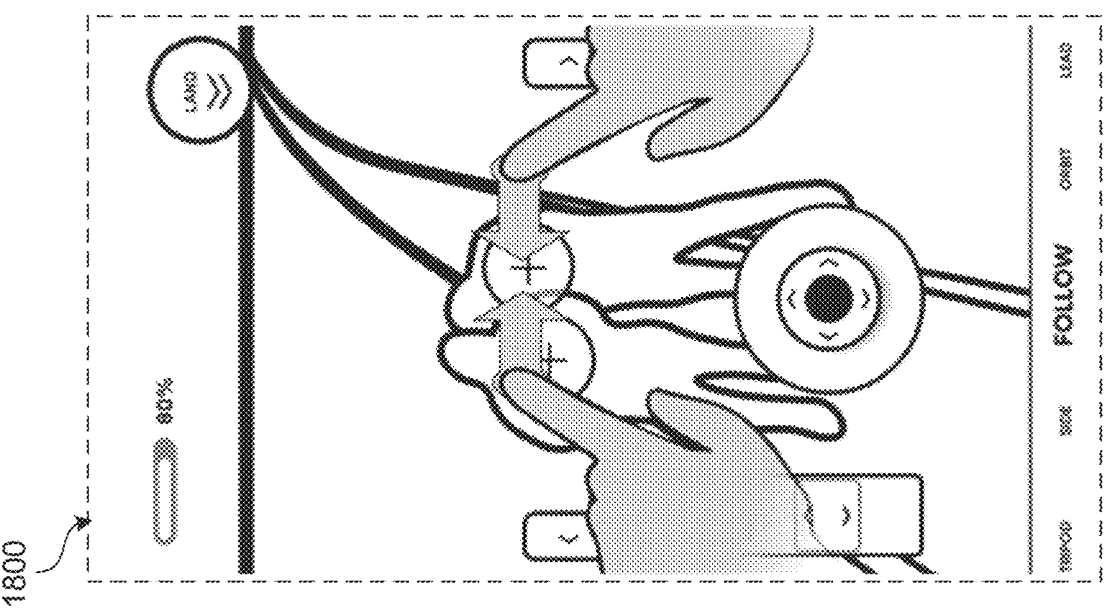

The UI can also be configured to receive multi-touch gestures such as pinch-to-zoom, two-fingered scroll, two-fingered rotate, etc. FIG. 18 shows a screen 1800 of the example GUI in which a user is applying a multi-touch pinch to zoom input. As shown at screen 1800, as the user drags two fingers together or apart (i.e., pinches), the UAV 100 may move towards or away from a point corresponding with a displayed portion of the view, for example, as indicated by trajectory 1810. Similarly, other multi-touch gestures may be applied. For example, a user may rotate two fingers about each other to cause a rotation of the UAV 100 about some axis. As another example, the user may input a two-finger scroll gesture to move the UAV 100 in the XY plane, adjust the altitude of the UAV 100, perform a strafe maneuver, etc. The UAV 100 can also be configured to respond to more complex gestures entered via the GUI including gestures with more than two fingers.

GUI Controls in Subject-Following Operation

As previously discussed, using the GUI, a user can select a subject in the physical environment to follow. In response to the selection, the controls displayed via the GUI may be defined relative to the selected subject. The controls included in the GUI at any given time may depend on the selected cinematic mode, but may include, for example, zoom 1910, height adjustment 1912, azimuth control 1914, etc., for example, as depicted in screen 1900 of FIG. 19. Some controls may be relative to the position, velocity, and/or acceleration depending on the specifications required by the current cinematic mode.

A velocity slider can be implemented for the zoom control element 1910 to control the range or distance or zoom on the subject. Sliding element 1910 up moves the UAV 100 toward the subject or makes the subject larger in the recorded image or video (e.g., through optical or digital zoom). Sliding element 1910 down moves the UAV 100 away from the subject or makes the subject smaller in the recorded image or video (e.g., through optical or digital zoom).

A velocity slider can similarly be implemented for the height control element 1912 to control the altitude of the UAV 100 relative to the selected subject. Sliding element 1912 up increases the altitude of the UAV 100. Sliding element 1912 down decreases the altitude of the UAV 100.

Figure 19:
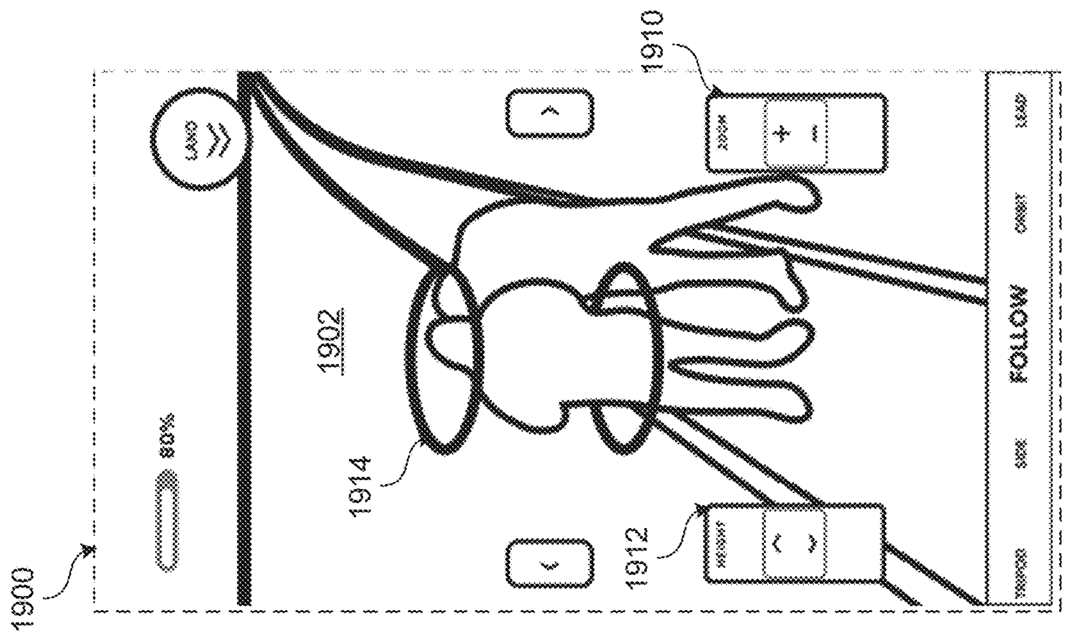

The azimuth control 1914 controls the azimuth position of the UAV 100 relative to the tracked subject. As shown in FIG. 19, this control element may be presented in the form of a circular ring velocity slider. Sliding this left may cause the UAV 100 to move in the XY plane at a constant distance to the subject while moving the azimuth or relative angle between the subject and the UAV 100 to the left. Similarly, sliding to the right moves the azimuth or relative angle of the subject to the UAV 100 to the right. In other words, interacting with element 1914 may cause the UAV 100 to fly in a circular path about a position of the tracked subject.

Figure 20:
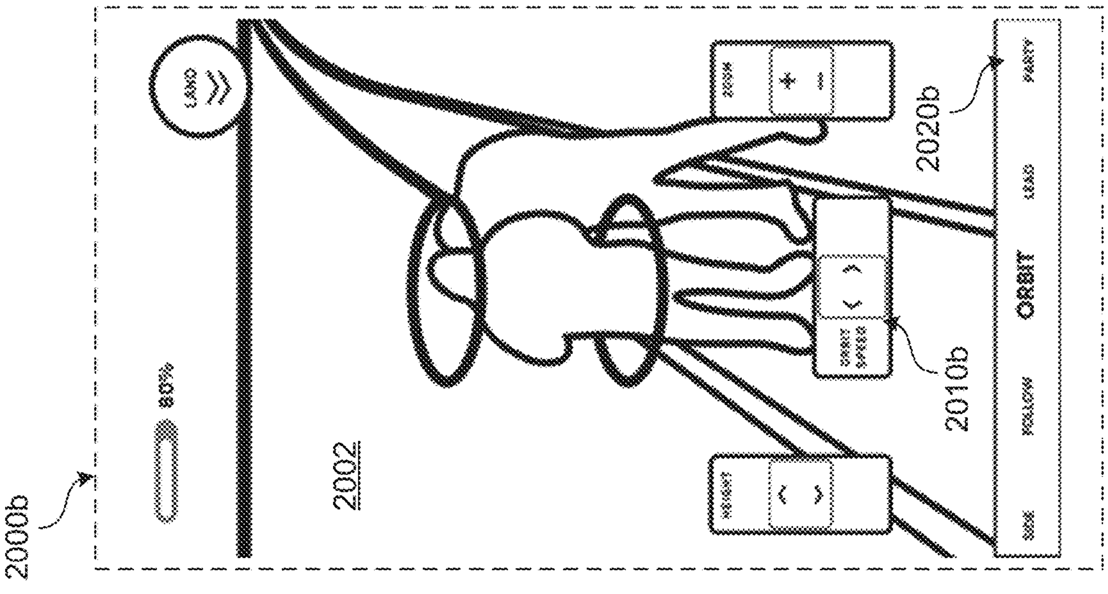
Figure 20:
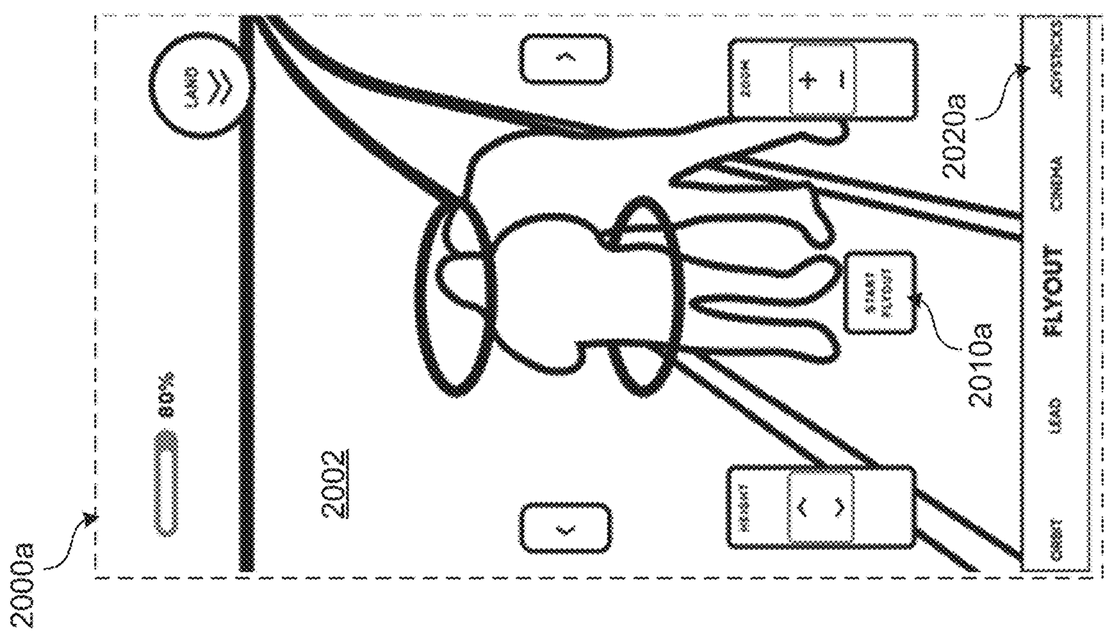

In some embodiments, certain other virtual buttons may be displayed, depending on the selected cinematic mode. For example, FIG. 20 shows a screen 2000*a* with a start/stop virtual button 2010*a* for starting, pausing, and/or stopping a preset motion pattern. In this case, the preset motion is based on a selected cinematic mode of "flyout." In response to selecting the "flyout" cinematic mode (e.g., using menu 2020*a*), the user is presented with a start/stop button 1210*a*. In response to the user selecting to start the "flyout" mode (e.g., by pressing button 2010*a*), the UAV 100 may initiate a preset flight pattern relative to the selected subject. For example, the UAV 100 may begin to pull away from the subject while adjusting an orientation of the image capture device 115 so as to keep the subject centered in the view 2002. As another example, screen 2000*b* shows an "orbit speed" velocity slider 2010*b* displayed based on a user's selection (e.g., using menu 2020*b*) of an "orbit" cinematic mode. In this example, in response to a user selecting the "orbit" cinematic mode, the UAV 100 may begin to orbit a position of the selected subject at roughly a constant distance (e.g., some preset distance or the current distance between the UAV 100 and subject). The UAV 100 will automatically adjust the center of its circular orbit as the selected subject moves through the physical environment. The user can then control the speed of the UAV's orbit about the subject by interacting with the orbit speed velocity slider 2010*b*.

Takeoff and Landing

Figure 21:
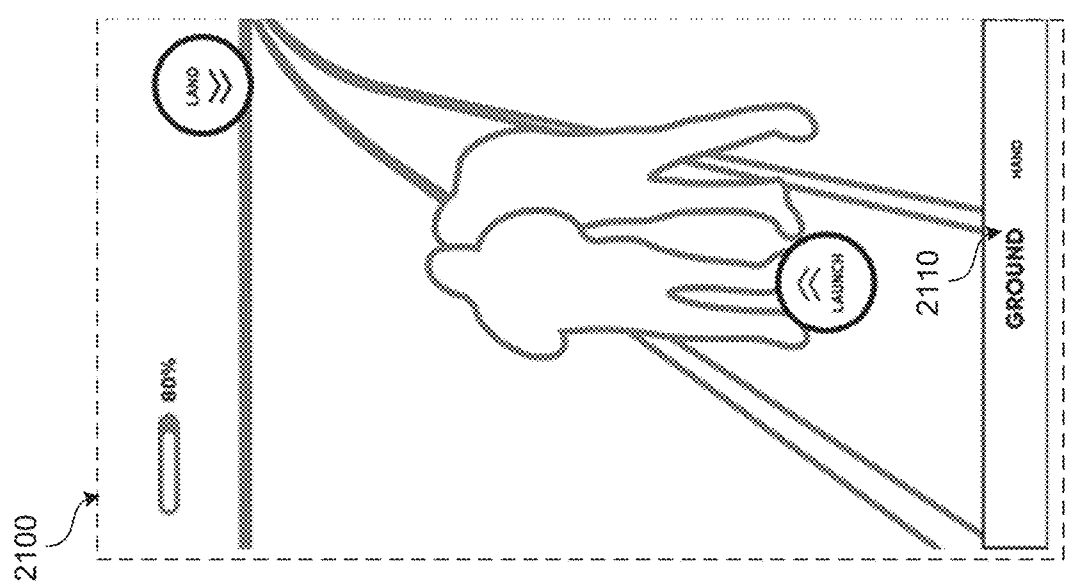

Takeoff and landing often represent the most challenging phase of any flight, even for skilled pilots. The introduced GUI features simple intuitive controls that enable a user to easily cause the UAV 100 to takeoff or land without fear of any injury to people or animals or damage to the UAV or to other property. FIG. 21 shows a screen 2100 of the example GUI in which a user can select from various different takeoff modes. For example, menu 2110 includes two selectable takeoff modes: from the ground, and from a person's hand. The selected takeoff mode will inform the navigation system 120 of a pre-takeoff state of the environment. Information regarding this pre-takeoff state may change how environmental sensing is performed using the various sensors onboard the UAV 100 and/or may change the way the motion planner 130 generates a proposed trajectory during the takeoff phase.

Figure 22:
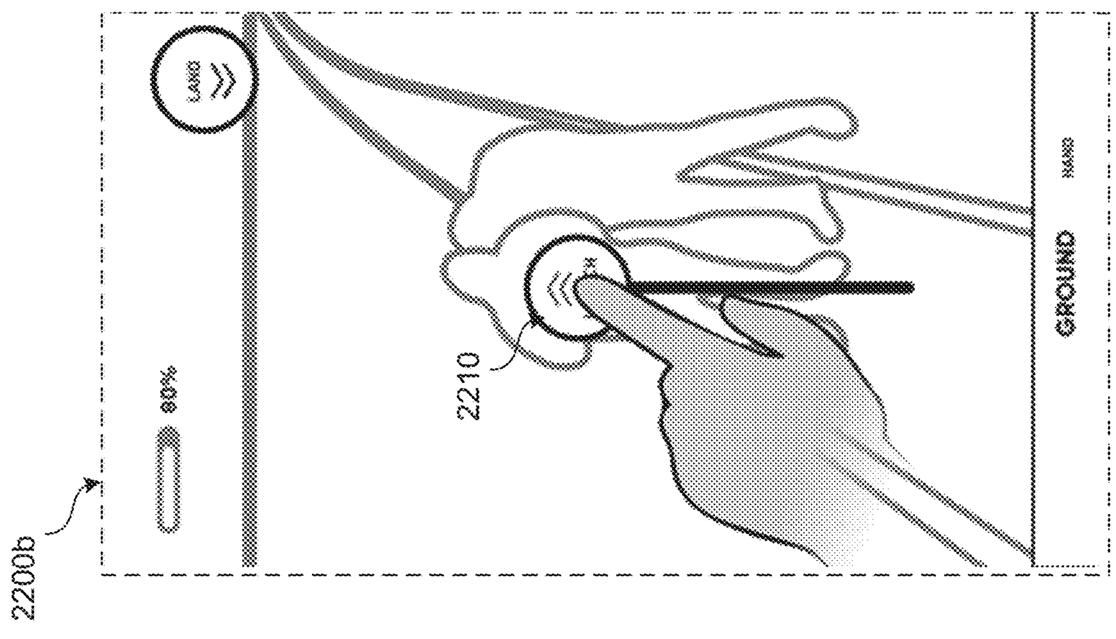
Figure 22:
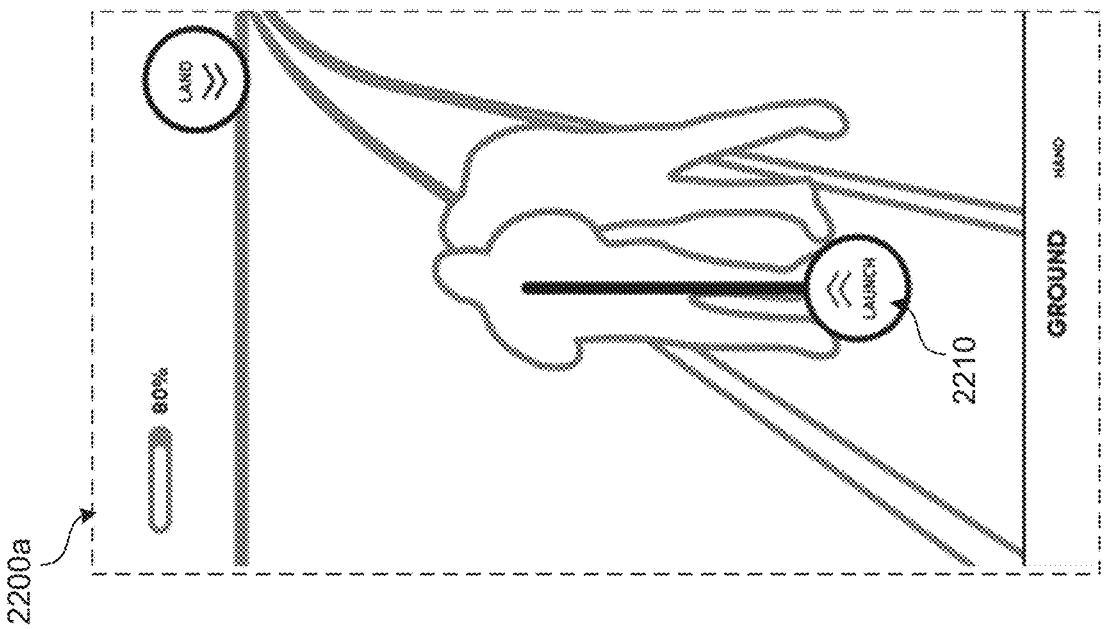

Once a takeoff mode is selected, the user can initiate takeoff by interacting with an interactive takeoff element presented via the GUI. For example, FIG. 22 shows a sequence of screens 2200*a-b* that illustrate a user interaction with a takeoff element 2210 in the form of a velocity slider. The user can cause the UAV 100 to takeoff by swiping upward from the bottom of the screen to the top of the screen using the takeoff element 2210. Similarly, any other gross gesture in the upward direction may be employed as appropriate for the input device. Notably, the UAV 100 may not just move directly up from its current position in response to the user's input. The motion planning 130 will utilize perception inputs from the various sensors to generate a safe trajectory that avoids any obstacles.

Figure 23:
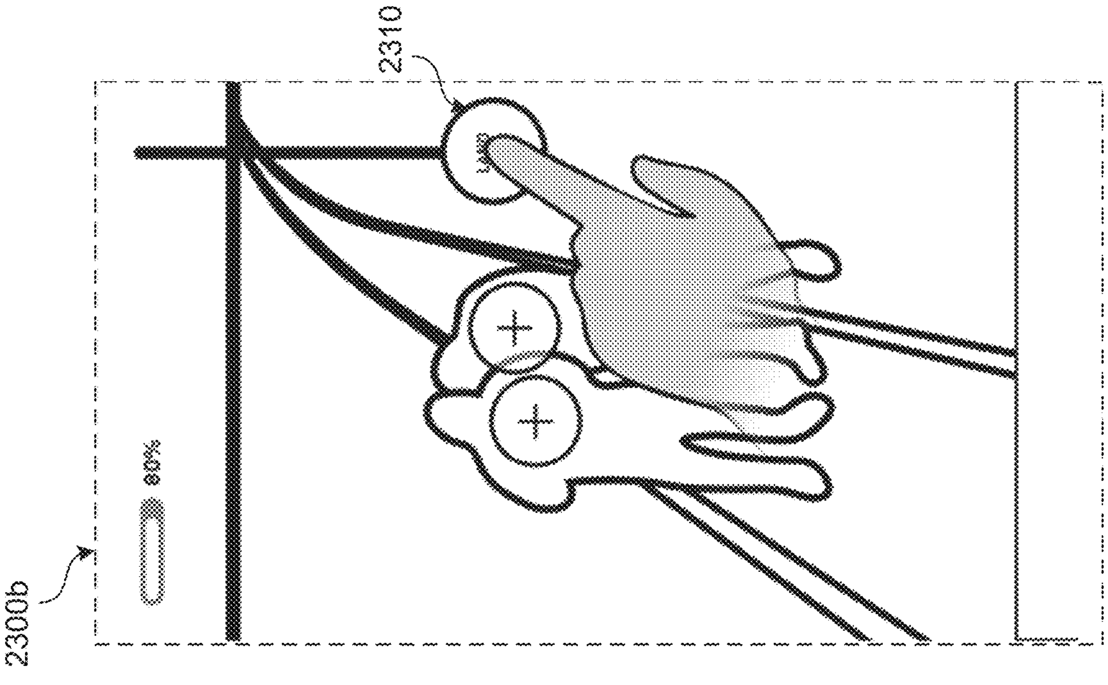
Figure 23:
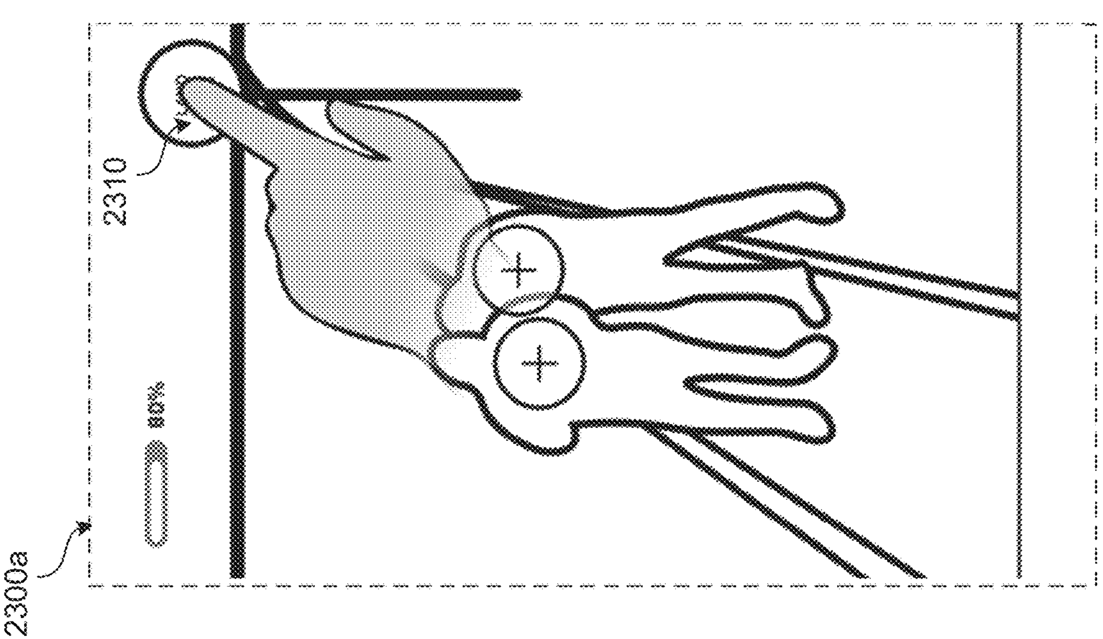

Similar user inputs may be utilized to cause the UAV 100 to land. For example, FIG. 23 shows a sequence of screens 2300*a-b* that illustrate a user interaction with a landing element 2310 in the form of a velocity slider. The user can cause the UAV 100 to land by swiping downward from the top of the screen to the bottom of the screen using the landing element 2310. Similarly, any other gross gesture in the downward direction may be employed as appropriate for the input device. Again, the UAV 100 may not just move downward in response to the user input. Instead, the motion planner 130 and/or an associated landing system may perform a process of selecting an appropriate landing area below (based on received sensor inputs) before committing to landing the UAV 100 on the ground (or in a person's hand). If a suitable landing surface is not available, or is for some reason obstructed (e.g., by person or other object), the motion planner 130 may elect to delay the landing, cancel the landing, or maneuver the UAV 100 to find an alternative landing spot, depending on the circumstances.

Interpretation of User Commands by the Navigation System

In all cases during subject-following flight and normal flight, all control commands from the user are combined with aircraft data and sensor data to determine how to move the aircraft. This process is described, for example, with respect to the objective-based motion planning in FIG. 3.

For example, in normal flight mode, a user command to move toward an obstacle detected by one or more sensors onboard the UAV 100 may be translated by the motion planner 130 into a planned trajectory to smoothly fly up and forward, over the obstacle without the need for direct user control. In other words, the user does not need to provide a control input to increase altitude to avoid the obstacle. Similarly, a user command to move down toward an obstacle will be translated by the motion planner 130 into a planned trajectory to fly to the side of the obstacle while continuing to descend.

As another example, in subject-following mode, a command to change the altitude of the UAV 100 upward in the direction of an obstacle may be translated by the motion planner 130 into a planned trajectory to move the UAV 100 closer to or further from the subject or to, in any other advantageous way, move upward while continuing to follow the subject. The motion planner 130 may store the user's request (e.g., an altitude-based) relative to the subject (e.g., as an objective) and attempt to reach it as soon and as safely as possible.

If the UAV 100 cannot move in a direction request by the user based on interaction with the GUI, a signal or combination of signals may be presented to the user (e.g., via GUI) to inform the user that the UAV 100 is deviating from the user's request or otherwise failing to adhere to it. Signals may include any combination of visual elements presented via the display of a mobile device 104 and/or audible elements presented via speakers of the mobile device 104.

In this way, the described systems and associated GUI extend far beyond traditional "fly by wire" systems of flight control where control input is mediated by the control system, preventing gross user errors. Because of the combination of environment sensing and the ability of the motion planner 130 to predict the future state of the environment and aircraft, the user's commands are interpreted as semantic instructions such as "fly to the side of me as best as possible" or "fly over to the surface of that object to look at it more closely." These semantic commands are embodied in the various controls available to the user. The aircraft's sensing, planning and control systems are responsible for achieving user objectives based on input commands in an optimized manner. Optimization in this case can include quickest, safest, smoothest, etc.

Some movements such as flying in a perfect circle around a subject or point of interest may not be achievable in all situations. Depending on the situation and the selected cinematic flight mode, the UAV 100 can make either an immediate determination on whether a desired command is feasible, or it can attempt to satisfy the command and respond dynamically to the situation, changing the UAV 100 trajectory continually to achieve the flight as best as possible. Immediate determination of whether a command is possible uses all the information available to the motion planner 130, which may be incomplete without exploration, so the UAV 100 may choose to explore the physical environment to gather sufficient data to determine if the command is feasible, then execute the movement or relay to the user that the command is not feasible and optionally offer an alternative.

Control of the GUI by Cinematic Mode

Flight cinematic modes can be used to specify flight behavior of the UAV 100. In other words, flight cinematic modes can be executed by the UAV 100 to determine how to maneuver in response to user interaction with the GUI. Flight cinematic modes take, as inputs, information about the environment, a tracked subject (if selected), aircraft performance characteristics, and user command input.

Figure 24:
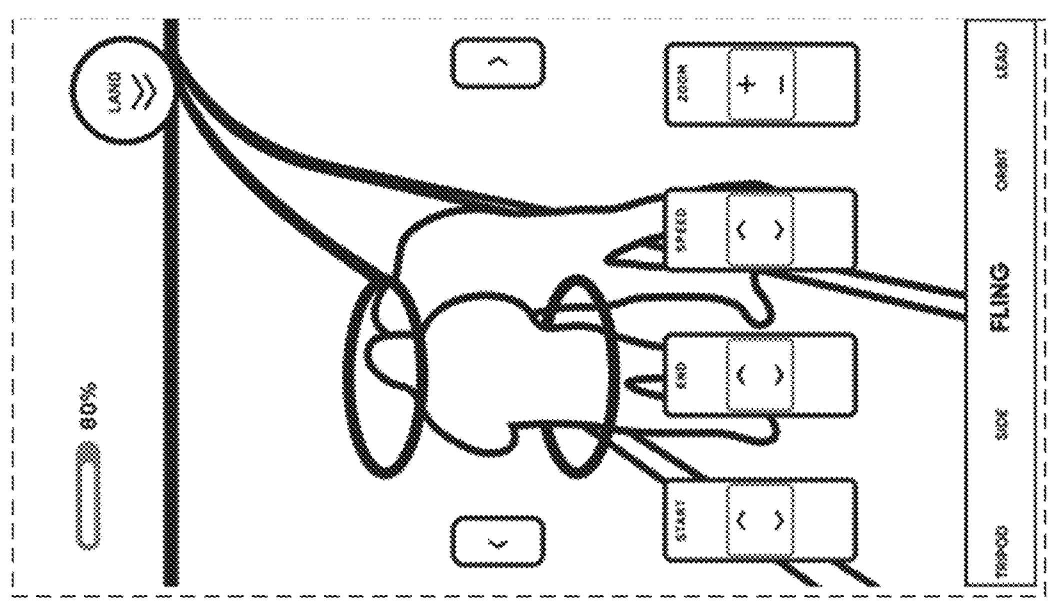

In order to receive the appropriate user command input, a cinematic mode can define how the GUI is presented to the user. For example, the cinematic mode can define certain interface elements that are visible via the UI and how such interface elements are arranged. The configuration of GUI interface elements for a particular cinematic mode can be defined using a set of one or more GUI templates which are composed together to form the user interface definition. A mobile application and/or device 104 may use this GUI definition to display to the user the correct user interface elements for a selected cinematic mode, each of which is understood by the motion planner 130 to provide some functionality appropriate to that cinematic mode. For example, one cinematic mode may need to specify four vertical velocity slider controls as shown in FIG. 24. Such interface elements may be defined by their appearance, labels, outputs, position on screen, and when they are visible.

Flight Feedback to the User

During flight, the UAV 100 can present information to the user via the GUI. Information presented to the user may include state information regarding the UAV 100, the surrounding physical environment, certain tracked objects in the physical environment, etc.

Figure 25:
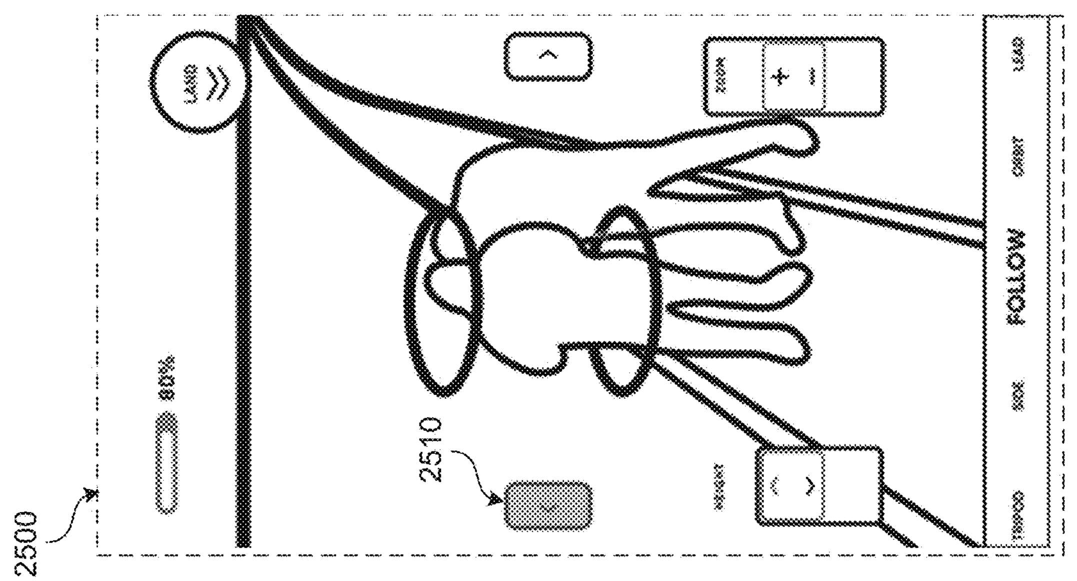

In some situations, interactive elements presented via the GUI may be unavailable to the user. An interactive element may be unavailable for a number of reasons such as configuration of a selected control mode, malfunction at one or more UAV 100 systems, and/or external environmental factors that may render a response by the UAV 100 to such a control input unsafe, impractical, or impossible. FIG. 25 shows a screen 2500 of the example GUI in which an interactive element 2510 for commanding a left strafe maneuver is unavailable for interaction by the user. The interactive element 2510 is indicated as unavailable or inactive in FIG. 25 based on shading applied to the element. Other types of indicators may be presented in other embodiments. As an illustrative example, the element 2510 for commanding a left strafe maneuver may be unavailable to the user due to an obstacle to the left of the UAV 100 that would render such a maneuver unsafe, impractical, or impossible. Alternatively, or in addition, the element 2510 may be unavailable to the user while in a "follow" cinematic mode.

Figure 26:
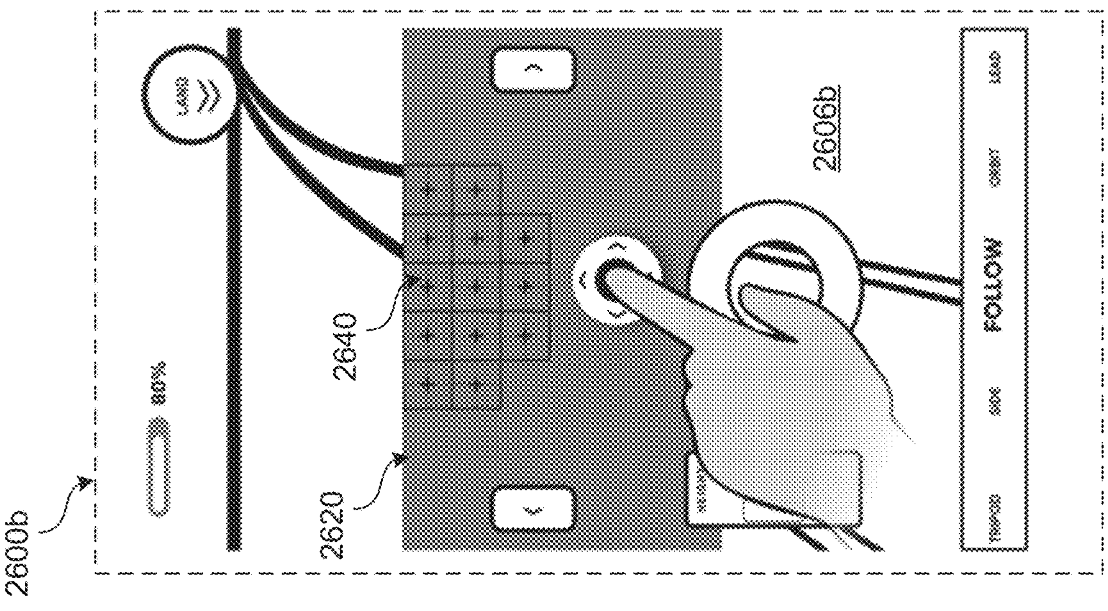
Figure 26:
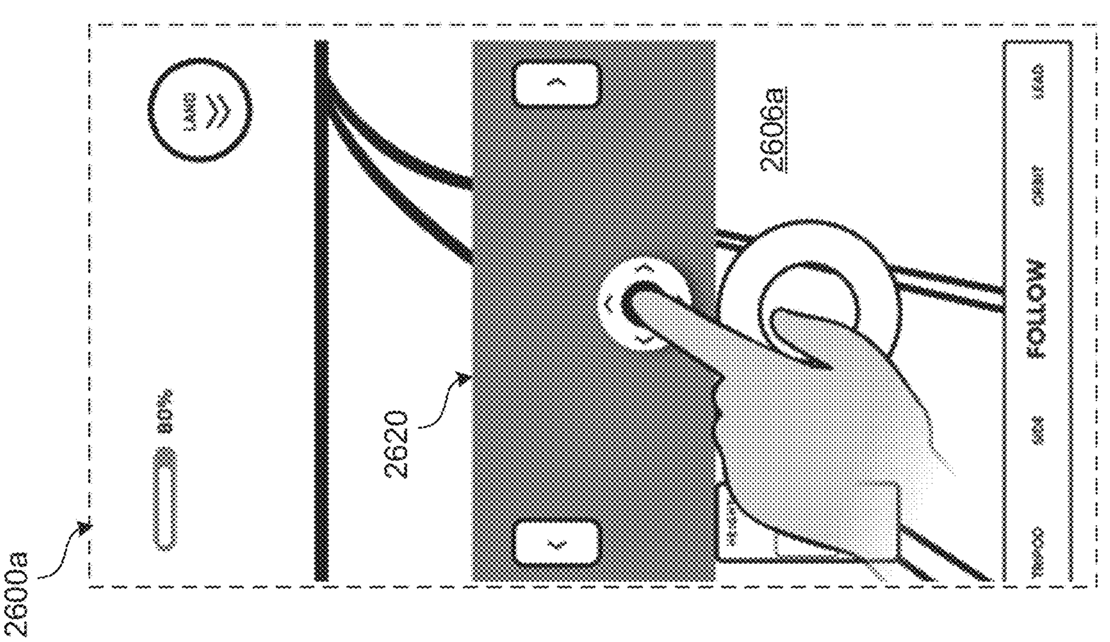

In some embodiments, the GUI can be configured to present an indication of a detected object in the physical environment by projecting icons or other graphical elements into a portion of the view (e.g., a live video feed) of the physical environment presented via the GUI. Specifically, in some embodiments, augmentations in the form of generated graphics indicative of a 3D geometry of a detected object may be overlaid on a portion of the view corresponding with the object. FIG. 26 shows a sequence of screens 2600*a* and 2600*b* that illustrate this concept. Screen 2600*a* shows a view 2606*a* of the physical environment including an object 2602 (e.g., a wall). This view may be a live video feed from an image capture device 115 onboard the UAV 100. In response to detecting the object 2602 and sensing the object's geometry, the system may cause display of an augmentation in the form of a graphical overlay 2640 via the GUI as shown in screen 2600*b*. The graphical overlay 2640 may be an icon, a generated 3D model of the detected object 2620 (or portion thereof), or any other type of element that is indicative of the detected object. In screen 2600*b*, the graphical overlay 2640 is presented as a computer-generated 3D wireframe that corresponds with the surface geometry of the detected object 2620 as the object moves in the view 2606*a-b*. In other words, the rendered 3D wireframe will dynamically change perspective as the perspective of the object 2620 changes in the view 2606*a-b* over time.

Figure 27:
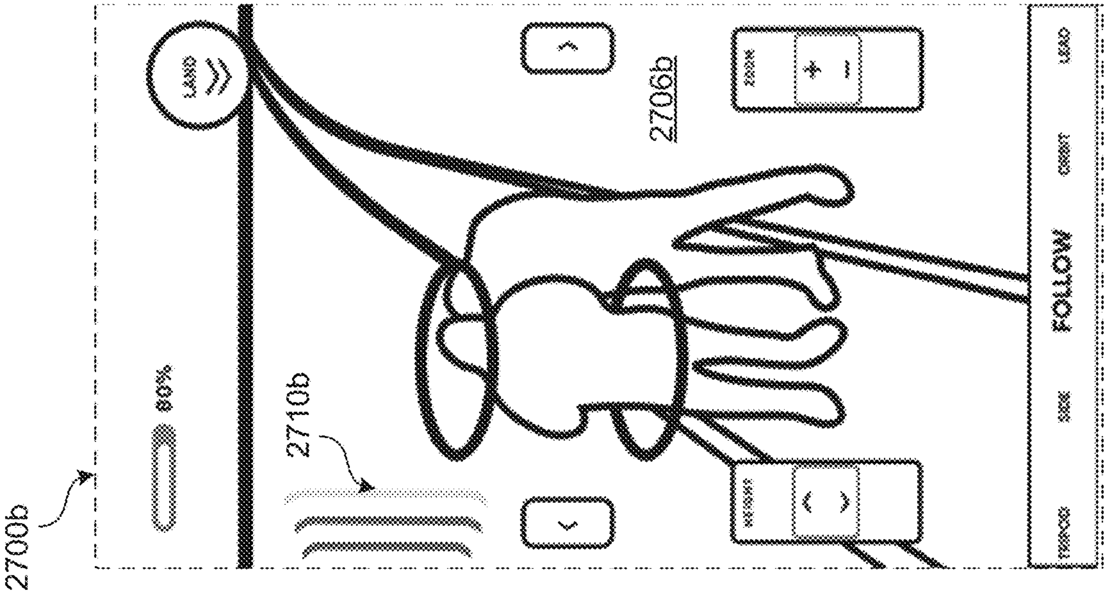
Figure 27:
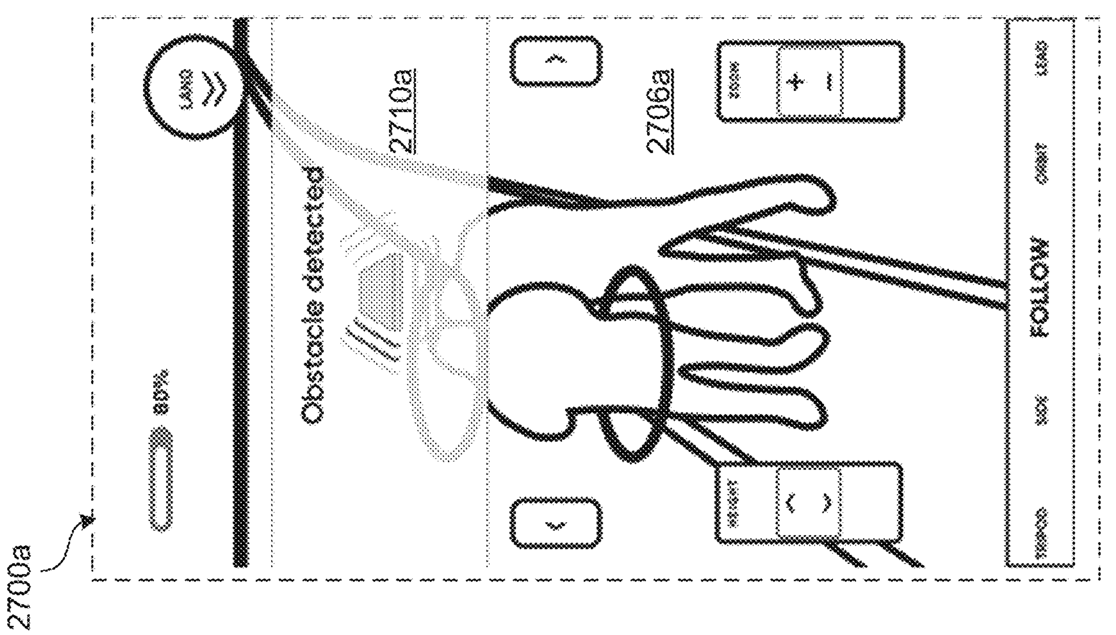

In some embodiments, the GUI may present an indication of an obstacle or potential obstacle in a direction not currently visible in a displayed view of the physical environment. FIG. 27 shows a set of screens 2700*a* and 2700*b* that illustrate this concept. Screen 2700*a* shows an example embodiment of an obstacle indicator 2710*a*. As shown in screen 2700*a*, the example obstacle indicator 2710*a* shows a graphical representation of the UAV 100 with marking on the left side indicative of an obstacle or potential obstacle to the left of the UAV 100, but not visible in the view 2706 of the physical environment presented via the GUI. Screen 2700*b* shows an alternative obstacle indicator 2710*b* that similarly indicates the presence of an obstacle or potential obstacle to the left of the UAV 100, but is slightly less intrusive of the view 2706*b*.

Figure 28:
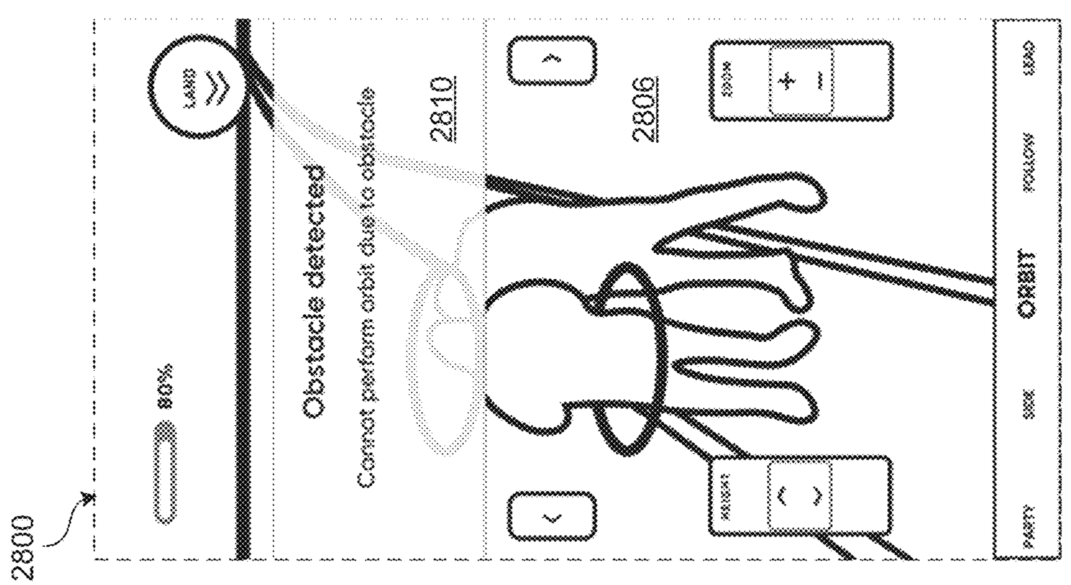

An indication that a maneuver will fail, or is failing to execute, can be presented via the GUI along with information regarding why the maneuver is failing or will fail. FIG. 28 shows a screen 2800 of the example GUI in which an indicator 2810 is presented in the view 2806. As shown in screen 2800, the example indicator 2810 conveys a message to the user that a requested maneuver (in this case an "orbit" maneuver about a selected subject) is impossible, impractical, or unsafe due to a detected obstacle or potential obstacle. Depending on the nature of the requested maneuver and/or detected obstacle, such an indication may be presented via the GUI in response to the user selecting an option to perform the maneuver, but before actual initiation of the maneuver by the UAV 100. Alternatively, or in addition, the indicator 2810 may be presented to the user via the GUI while the UAV 100 is performing the maneuver if, during performance of the maneuver, the motion planner 130 determines that the maneuver is no longer possible, practical, or safe.

Figure 29:
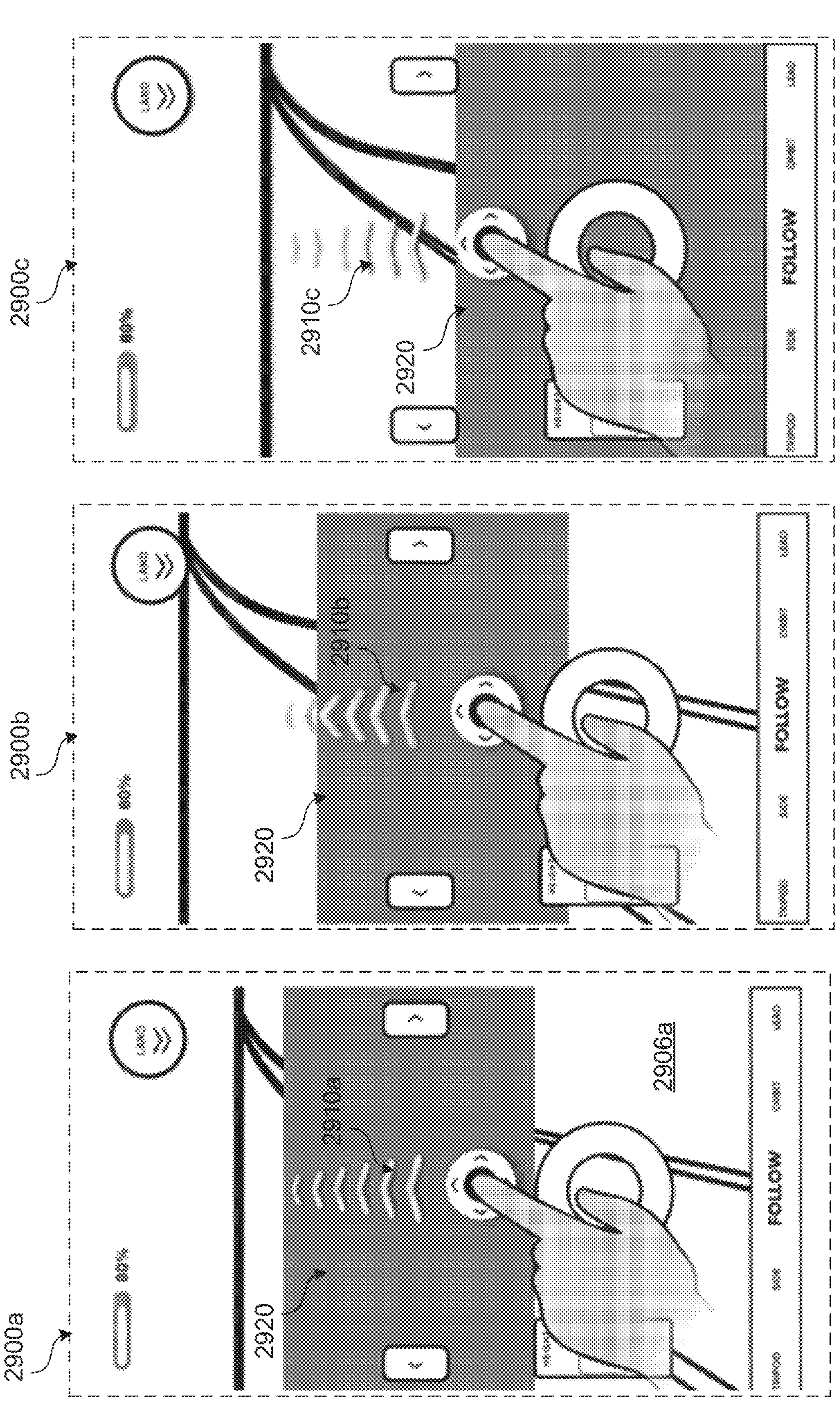

In some embodiments, indications of a planned trajectory of the UAV 100 and/or divergences from the planned trajectory are presented to the user via the GUI. FIG. 29 shows a sequence of screens 2900*a-c* that illustrate this concept. The indication of the planned trajectory of the UAV 100 can be presented via the GUI as a projection of the planned 3D trajectory generated by the motion planner 130 in a view of physical environment. For example, screen 2900*a* shows an example view 2900*a* of the physical environment that includes an indication 2910*a* in the form of a projection of the planned 3D trajectory of the UAV 100. As shown in screen 2910*a*, the indication 2910*a* may include a series of arrows that follow a path of the planned trajectory up to some horizon point in time (e.g., several seconds in the future). Alternatively, the indication 2910*a* may be depicted as a line or some other visual element configured to convey the path of the planned trajectory. By presenting the indicator 2910*a* in the view 2906*a* of the GUI, the user is provided with a sense of how certain control inputs will impact the maneuvering of the UAV 100. As the UAV 100 maneuvers through the physical environment, the planned trajectory may change (i.e., deviate from an original plan), for example, in response to user control inputs and/or detected obstacles. For example, screen 2900*b* shows a second time step in the sequence of screens as the UAV 100 travels towards an object 2920. As shown in screen 2900*b*, the indicator 2910*b* of the planned trajectory at this second time step has changed to indicate a future maneuver to gain altitude to clear the obstacle 2920. In the example screen 2900*b*, this maneuver is indicated by an upward arrow at a certain point along the indicator 2910*b*. Similarly, screen 2900*c* shows a third time step in which the UAV 100 is about to clear the obstacle 2920. In this screen 2900*c*, the indicator 2910*c* has again changed to indicate a future maneuver to decrease altitude to return to a previous flight level after clearing the obstacle 2920.

Figure 30:
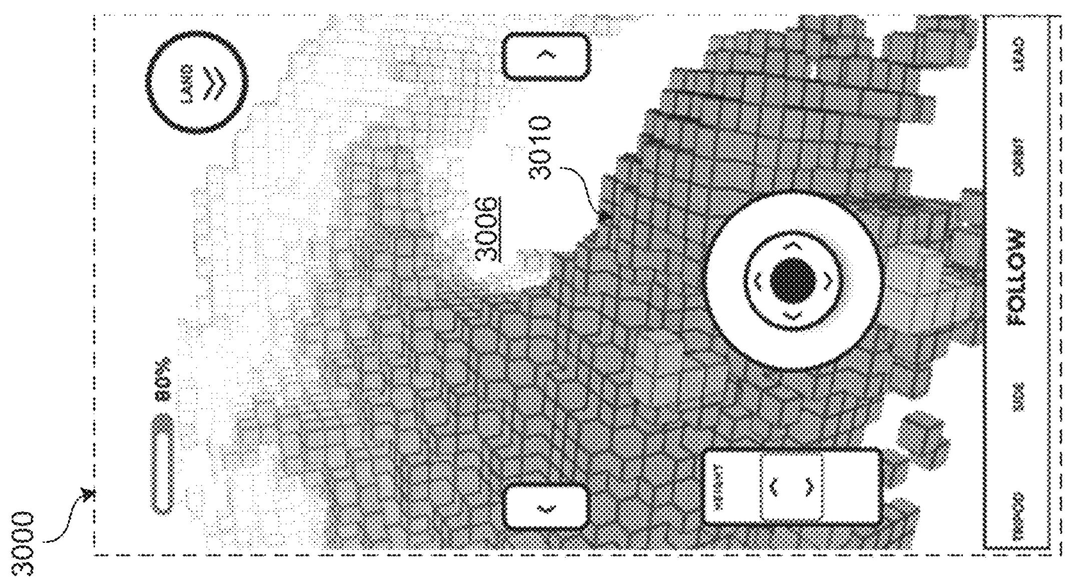

In some embodiments, the view presented via the GUI can include indications of obstacles in the physical environment in the form of a 3D occupancy map. FIG. 30 shows a screen 3000 of the example GUI in which the displayed view of the physical environment includes a rendering of a 3D occupancy map 3010 that indicates obstacles in the physical environment. Specifically, the 3D occupancy map 3010 includes multiple voxels with each voxel corresponding to a 3D volume of space in the physical environment that is at least partially occupied by a physical object. The 3D occupancy map may be continually generated and updated based on data received from one or more sensors onboard the UAV 100 as the UAV 100 flies through the physical environment. In some embodiments, the view 3006 presented via the GUI may include only the 3D occupancy map 3010, for example, as shown in FIG. 30. Alternatively, the view 3006 may include a composite of a live video feed from the image capture device 115 with a continually updated rendering of the 3D occupancy map overlaying (at least partially) the live video stream.

Figure 31:
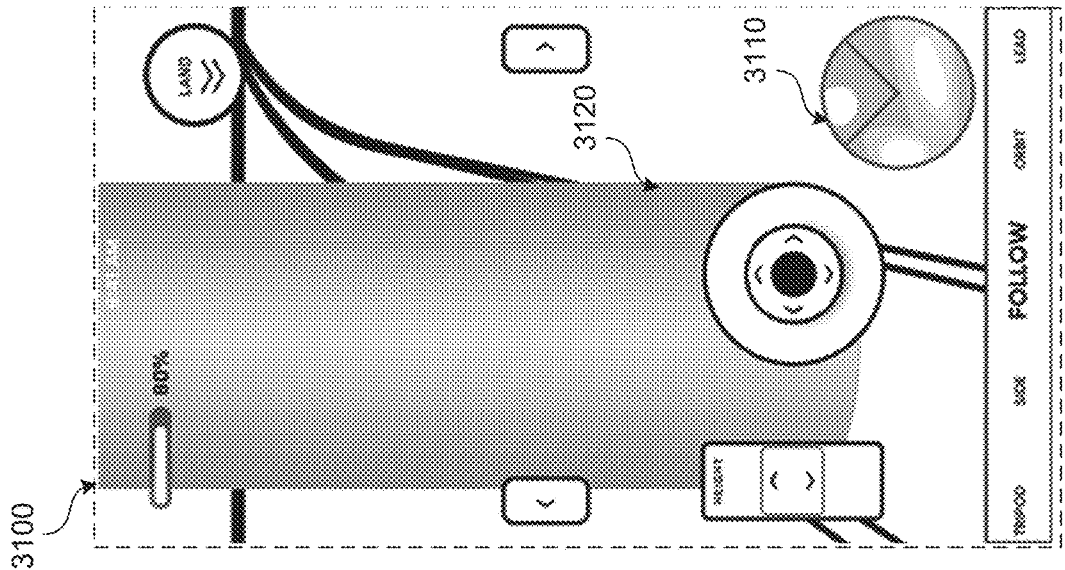

In some embodiments, the GUI can include views of the physical environment from perspectives other than that of the image capture device 115. For example, FIG. 31 shows a screen 3100 of the example GUI including a plan view or overhead map 3110 of the physical environment. In the example depicted in FIG. 31, the plan view 3110 is included as a separate view overlaying (at least partially) the main view 3106 (e.g., a live stream from the image capture device 115). A user may switch between views, for example, by touching the plan view 3110. The plan view 3110 may be generated based on sensors onboard the UAV 100 as it flies through the physical environment as well as data from other sources such as other sensing devices in the vicinity (e.g., other UAVs and/or other mobile devices) or other data sources such as a database including maps and other environmental data.

Although FIG. 31 shows a plan view perspective, other views can similarly be constructed from other perspectives. For example, a view from a user's perspective can be generated based on a continually updated 3D model of the surrounding physical environment based on data from sensors onboard the UAV 100. This might allow a user on the ground to effectively see behind objects, for example, where the view is presented as an augmentation via an AR or VR device.

Media Recording Annotation

The UAV 100 can be used for recording media such as video, audio, images, etc. from an aerial vantage point. As previously discussed, in addition to image capture devices 114 for navigation, the UAV 100 may also include an image capture device 115 specially suited for capturing images (including video) for live streaming and/or later playback. This image capture device 115 may be actuated by a gimbal mechanism to offer greater freedom of motion relative to the body of the UAV 100.

In some embodiments, the image capture device 115 records video continuously from takeoff to landing. An associated audio capture device that may or may not be integrated with the image capture device 115 similarly captures corresponding audio continuously from takeoff to landing. In some embodiments, the audio may be captured by a separate device (e.g., mobile device 104) in communication with the UAV 100. In such an embodiment, captured audio may be automatically transmitted (e.g., via a wireless communication link) to the UAV 100 where it is processed by a processing system onboard the UAV 100 to synchronize with video captured by the image capture device 115 onboard the UAV 100. In some embodiments, audio and/or video from multiple devices and UAVs can be captured simultaneously and synchronized (later or in real or near-real time) to form a distributed multi-camera view of a particular subject or the surrounding physical environment in general.

During flight, a processing system onboard the UAV 100 may automatically log relevant events that can be utilized when the captured media is later viewed and/or edited. Information in this log can include information about the flight, status of the UAV 100, environmental information, information about a tracked subject, information about the user's commands, and other information available to the UAV's sensing, motion planning, and control systems. This logged information can be synchronized to the timing of the recorded media. In other words, logged events may include a timestamp such that each event is synchronized to a particular time point in a media capture.

In some embodiments, a user can be provided an option to manually mark certain events as relevant. For example, if a user controlling the UAV 100 notices a tracked subject performing an interesting activity, the user can provide an input to, in effect, tag that portion of the captured media as relevant. Notably, the user does not need to start and stop recording of any media in order to mark the event as relevant. In some embodiments, the GUI may include an interactive tagging element. When a user interacts with the tagging element, that portion of the captured media is tagged as relevant. The tag may correspond to an instantaneous point in time or may correspond with a period of time. For example, when recording video, the user may press the interactive tagging element once to mark a beginning point of the relevant period of time and then press the interactive tagging element a second time to mark the end of the relevant period of time. This mark can annotate a still photo, the start or end of a video, or any other meaning the user wishes.

Assembling a Recommended Edit

Logged information regarding a UAV's flight can be used to generate a recommended edit of the media recorded during the flight. A recommended edit feature can be configured to select the best source media from the set of all available photos, videos, and audio captured by the UAV 100 during the flight as well as media generated based on perception inputs such as a computer-generated 3D model of the physical environment and media or other data received from other sources such as a remote server in communication with the UAV 100. Remotely sourced media may include, for example, maps, area photos, decorative composite images and effects, music and sound effects, etc. The recommended edit feature can then select segments or "clips" from the available media based on the logged information and/or user relevancy tags as well as an analysis of the aesthetic qualities of the media. The selected clips can then be composited or otherwise combined together to generate the recommended edit. Notably, while the recommended edit may rely, in some embodiments, on minimal user cues (such as the aforementioned relevancy tags), the recommended edit may otherwise be generated automatically without requiring specific editing instructions from a user. In some embodiments, the constituent clips can be removed, reordered, or otherwise altered by the user to result in the final edit. User defined alterations may include, for example, video and photo effects, changing audio, changing the start and end points of media and other alterations that will enhance the final output.

Localization

Figure 32:
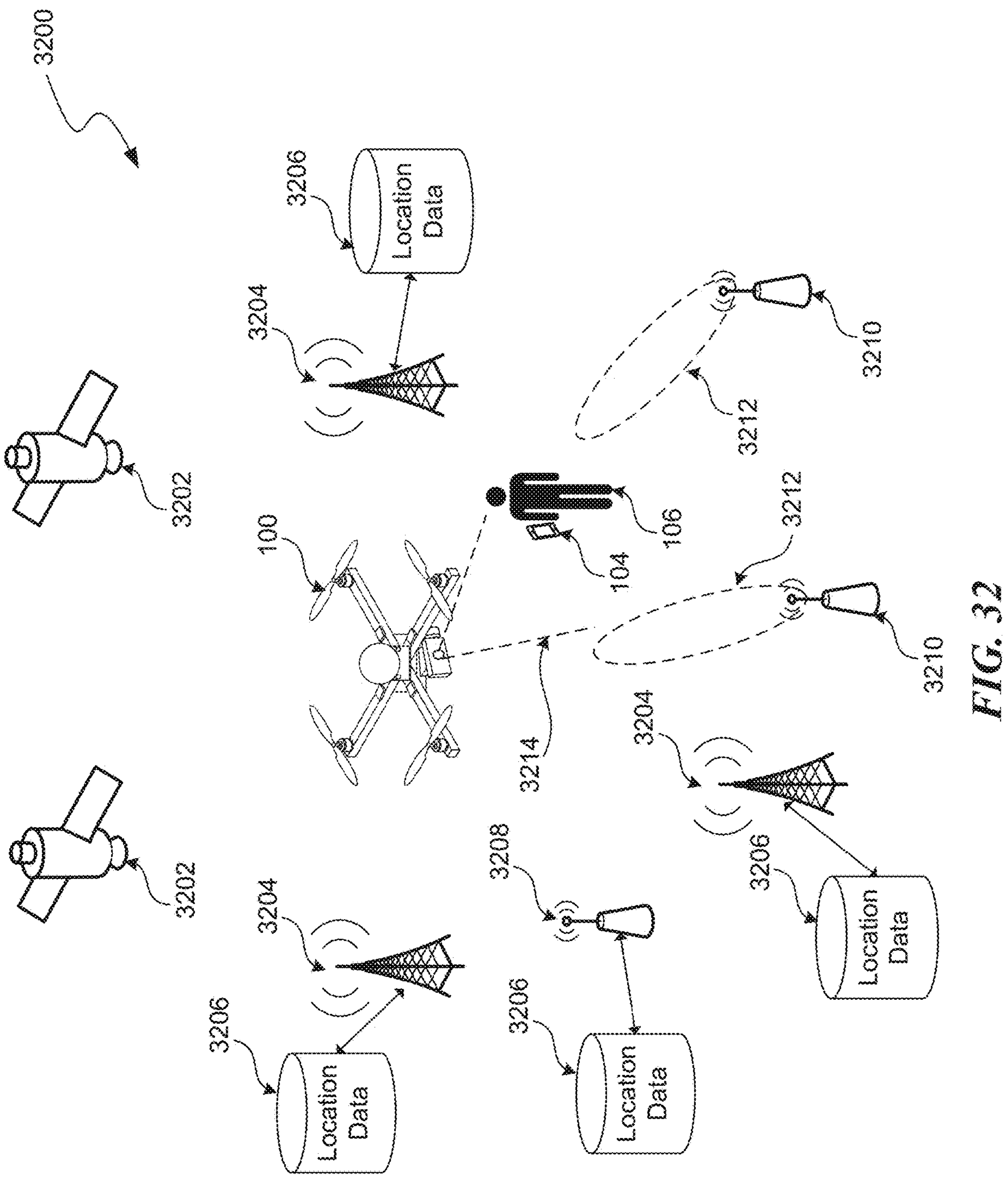
FIG. 32 is a diagram of an example localization system with which at least some operations described in this disclosure can be implemented.

A navigation system 120 of a UAV 100 may employ any number of systems and techniques for localization. FIG. 32 shows an illustration of an example localization system 3200 that may be utilized to guide autonomous navigation of a vehicle such as a UAV 100. In some embodiments, the positions and/or orientations of the UAV 100 and various other physical objects in the physical environment can be estimated using any one or more of the subsystems illustrated in FIG. 32. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 12, the example localization system 3200 may include the UAV 100, a global positioning system (GPS) comprising multiple GPS satellites 3202, a cellular system comprising multiple cellular antennae 3204 (with access to sources of localization data 3206), a Wi-Fi system comprising multiple Wi-Fi access points 3208 (with access to sources of localization data 3206), and/or a mobile device 104 operated by a user 106.

Satellite-based positioning systems such as GPS can provide effective global position estimates (within a few meters) of any device equipped with a receiver. For example, as shown in FIG. 32, signals received at a UAV 100 from satellites of a GPS system 3202 can be utilized to estimate a global position of the UAV 100. Similarly, positions relative to other devices (e.g., a mobile device 104) can be determined by communicating (e.g., over a wireless communication link 116) and comparing the global positions of the other devices.

Localization techniques can also be applied in the context of various communications systems that are configured to transmit communication signals wirelessly. For example, various localization techniques can be applied to estimate a position of UAV 100 based on signals transmitted between the UAV 100 and any of cellular antennae 3204 of a cellular system or Wi-Fi access points 3208, 3210 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 32 by dotted lines 3212 emanating from Wi-Fi routers 3210.

An inertial measurement unit (IMU) may be used to estimate position and/or orientation of a device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled), as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 33:
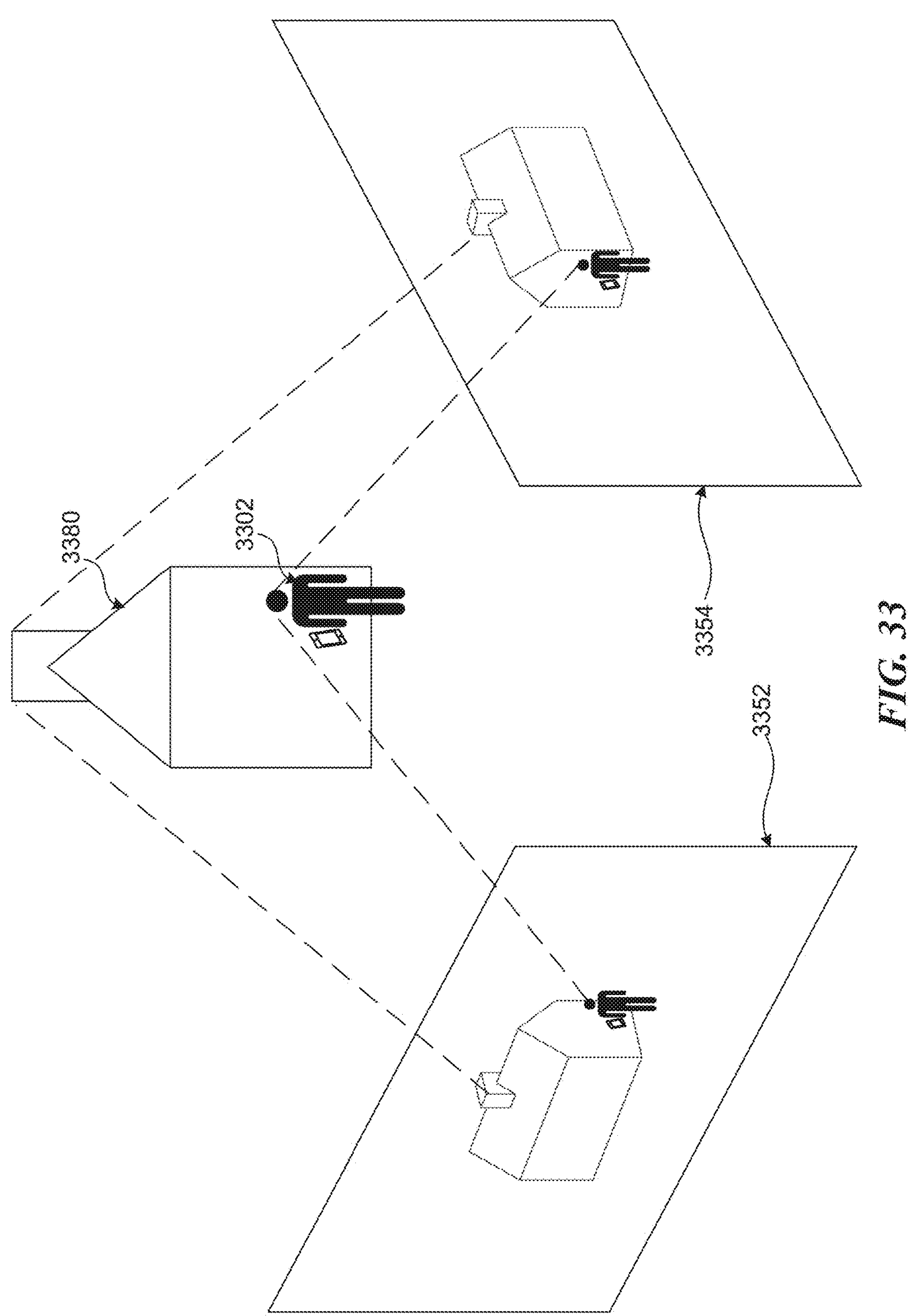
FIG. 33 is a diagram illustrating the concept of visual odometry based on captured images.

Computer vision can be applied to estimate position and/or orientation using a process referred to as "visual odometry." FIG. 33 illustrates the working concept behind visual odometry at a high level. Multiple images are captured in sequence as an image capture device moves through space. Due to the movement of the image capture device, the images captured of the surrounding physical environment change from frame to frame. In FIG. 33, this is illustrated by initial image capture FOV 3352 and a subsequent image capture FOV 3354 captured as the image capture device has moved from a first position to a second position over a period of time. In both images, the image capture device may capture real world physical objects, for example, the house 3380 and/or the person 3302.

Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in FIG. 33, features such as the head of a human subject 1302 or the corner of the chimney on the house 3380 can be identified, matched, and thereby tracked.

By incorporating sensor data from an IMU (or accelerometer(s) or gyroscope(s)) associated with the image capture device to the tracked features of the image capture, estimations may be made for the position and/or orientation of the image capture relative to the objects 3380, 1302 captured in the images. Further, these estimates can be used to calibrate various other systems, for example, through estimating differences in camera orientation and/or intrinsic parameters (e.g., lens variations) or IMU biases and/or orientation.

Visual odometry may be applied at both the UAV 100 and any other computing device, such as a mobile device 104, to estimate the position and/or orientation of the UAV 100 and/or other objects. Further, by communicating the estimates between the systems (e.g., via a wireless communication link 116) estimates may be calculated for the respective positions and/or orientations relative to each other.

Position and/or orientation estimates based in part on sensor data from an onboard IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard the UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching, can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 34:
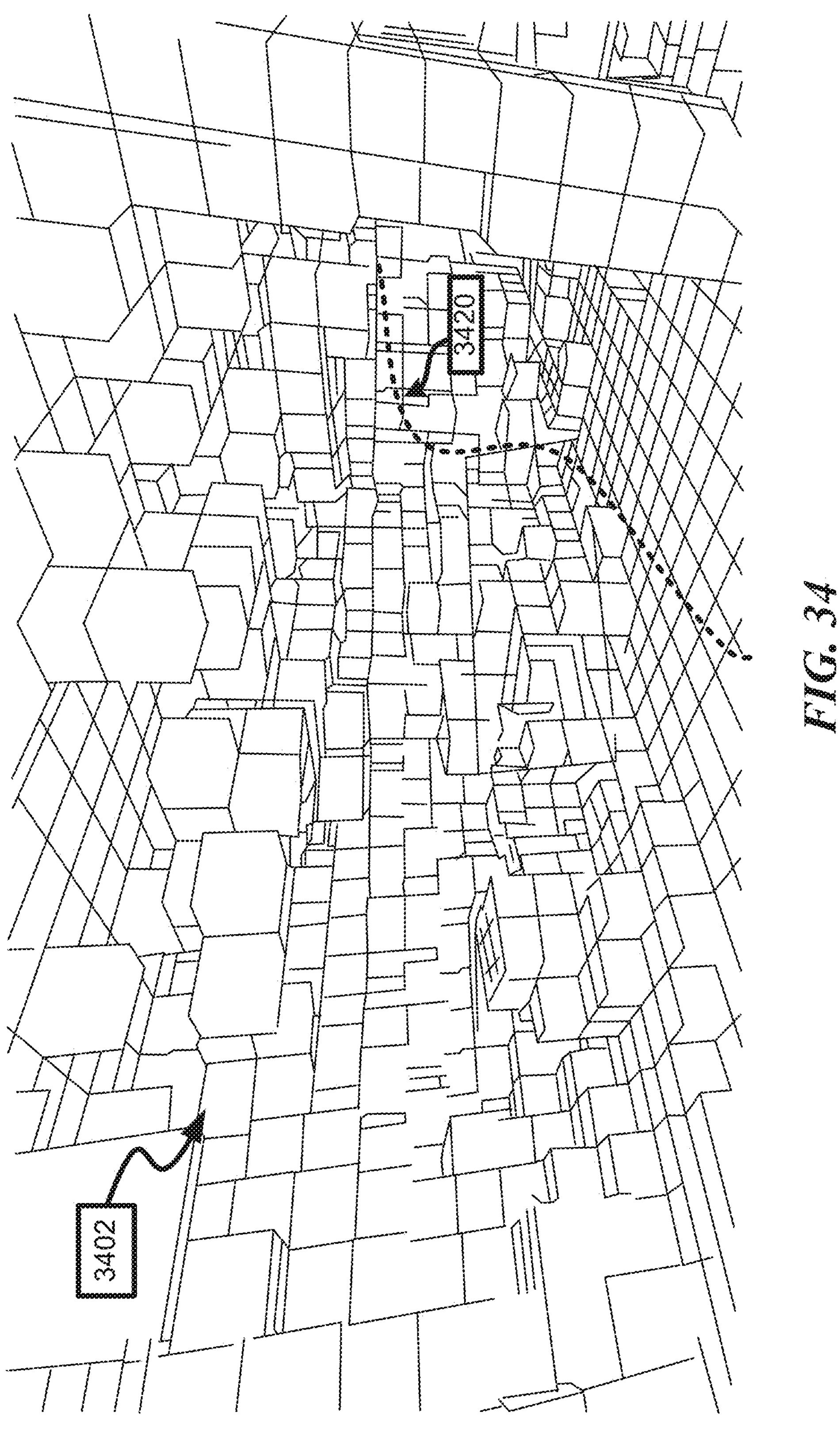
FIG. 34 is an example view of a three-dimensional (3D) occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 34 shows an example view of a 3D occupancy map 3402 of a physical environment including multiple cubical voxels. Each of the voxels in the 3D occupancy map 3402 corresponds to a space in the physical environment that is at least partially occupied by a physical object. A navigation system 120 of a UAV 100 can be configured to navigate the physical environment by planning a 3D trajectory 3420 through the 3D occupancy map 3402 that avoids the voxels. In some embodiments, this 3D trajectory 3420 plan using the 3D occupancy map 1402 can be optimized by applying an image space motion planning process. In such an embodiment, the planned 3D trajectory 3420 of the UAV 100 is projected into an image space of captured images for analysis relative to certain identified high cost regions (e.g., regions having invalid depth estimates).

Computer vision may also be applied using sensing technologies other than cameras, such as light detection and ranging (LIDAR) technology. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planner 130 of the navigation system 120 to plan paths that avoid obstacles while satisfying certain objectives (e.g., as previously described). In addition, in some embodiments, a navigation system 120 may incorporate data from proximity sensors (e.g., electromagnetic, acoustic, and/or optics-based) to estimate obstacle positions with more accuracy. Further refinement may be possible with the use of stereoscopic computer vision with multiple cameras, as described earlier.

The localization system 3200 of FIG. 32 (including all of the associated subsystems as previously described) is only one example of a system configured to estimate positions and/or orientations of a UAV 100 and other objects in the physical environment. A localization system 3200 may include more or fewer components than shown, may combine two or more components, or may have a different configuration or arrangement of the components. Some of the various components shown in FIG. 32 may be implemented in hardware, software or a combination of both hardware and software, including one or more signal processing and/or application specific integrated circuits.

Object Tracking

A UAV 100 can be configured to track one or more objects, for example, to enable intelligent autonomous flight. The term "objects" in this context can include any type of physical object occurring in the physical world. Objects can include dynamic objects such as people, animals, and other vehicles. Objects can also include static objects such as landscape features, buildings, and furniture. Further, certain descriptions herein may refer to a "subject" (e.g., human subject 102). The terms "subject" as used in this disclosure may simply refer to an object being tracked using any of the disclosed techniques. The terms "object" and "subject" may, therefore, be used interchangeably.

With reference to FIG. 2, a tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 32-40.

Figure 35:
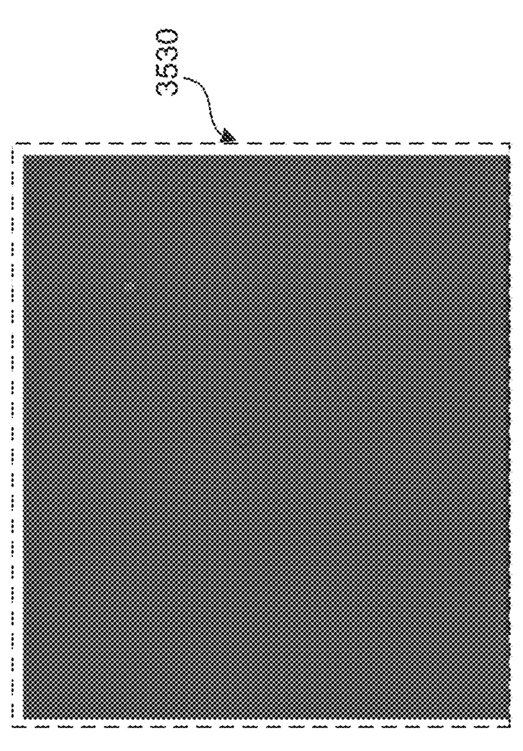
FIG. 35 is an example image captured by a UAV in flight through a physical environment with associated visualizations of data regarding tracked objects based on processing of the captured image.
Figure 35:
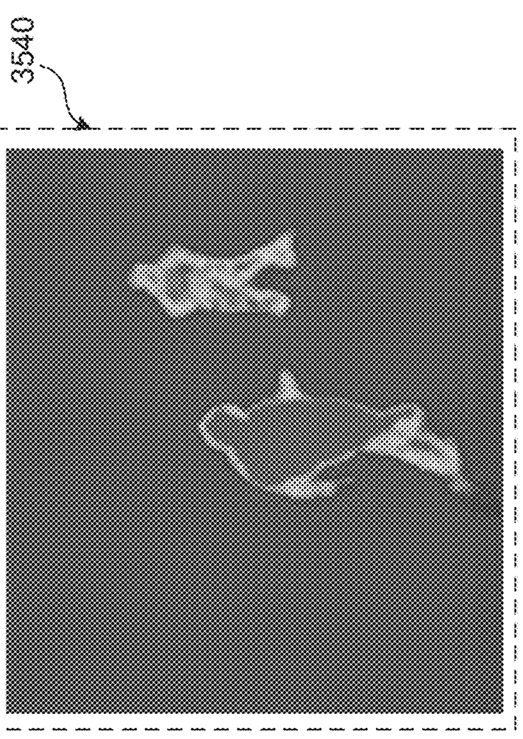
Figure 35:
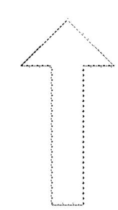
Figure 35:
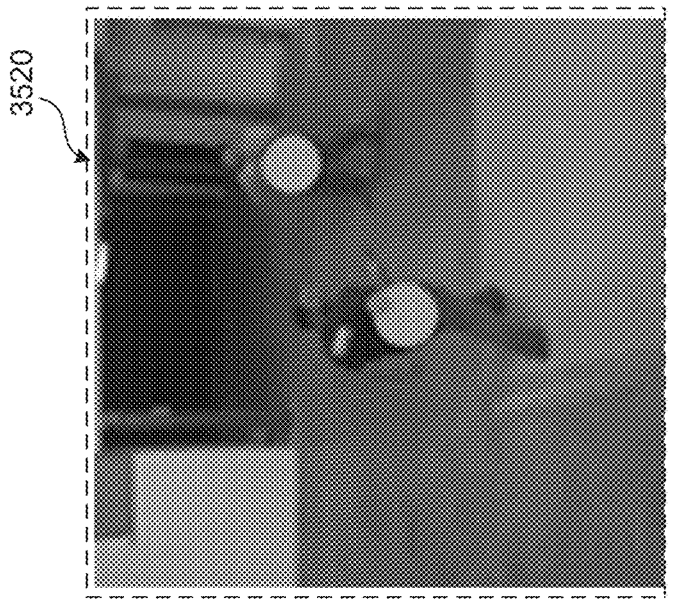

In some embodiments, a tracking system 140 can be configured to fuse information pertaining to two primary categories: semantics and 3D geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, interclass appearance, activity, and pose. In an example embodiment, the tracking system 140 may identify general locations and categories of objects based on captured images and then determine or infer additional detailed information about individual instances of objects based on further processing. Such a process may be performed as a sequence of discrete operations, a series of parallel operations, or as a single operation. For example, FIG. 35 shows an example image 3520 captured by a UAV 100 in flight through a physical environment. As shown in FIG. 35, the example image 3520 includes captures of two physical objects, specifically, two people present in the physical environment. The example image 3520 may represent a single frame in a series of frames of video captured by the UAV 100. A tracking system 140 may first identify general locations of the captured objects in the image 3520. For example, pixel map 3530 shows two dots corresponding to the general locations of the captured objects in the image. These general locations may be represented as image coordinates. The tracking system 140 may further process the captured image 3520 to determine information about the individual instances of the captured objects. For example, pixel map 3540 shows a result of additional processing of image 3520 identifying pixels corresponding to the individual object instances (i.e., people in this case). Semantic cues can be used to locate and identify objects in captured images as well as associate identified objects occurring in multiple images. For example, as previously mentioned, the captured image 3520 depicted in FIG. 35 may represent a single frame in a sequence of frames of a captured video. Using semantic cues, a tracking system 140 may associate regions of pixels captured in multiple images as corresponding to the same physical object occurring in the physical environment.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1 may include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1. Images captured from multiple views may also include images captured by an image capture device at multiple time instants as the image capture device moves through the physical environment. For example, any of the image capture devices 114 and/or 115 mounted to UAV 100 will individually capture images from multiple views as the UAV 100 moves through the physical environment.

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 36 shows a trajectory 3610 of a UAV 100 moving through a physical environment. As the UAV 100 moves along trajectory 3610, the one or more image capture devices (e.g., devices 114 and/or 115) capture images of the physical environment at multiple views 3612*a-c*. Included in the images at multiple views 3612*a-c* are captures of an object such as a human subject 102. By processing the captured images at multiple views 3612*a-c*, a trajectory 3620 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time.

While a tracking system 140 can be configured to rely exclusively on visual data from image capture devices onboard a UAV 100, data from other sensors (e.g., sensors on the object, on the UAV 100, or in the environment) can be incorporated into this framework when available. Additional sensors may include GPS, IMU, barometer, magnetometer, and cameras or other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras on a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 32-40.

Figure 37:
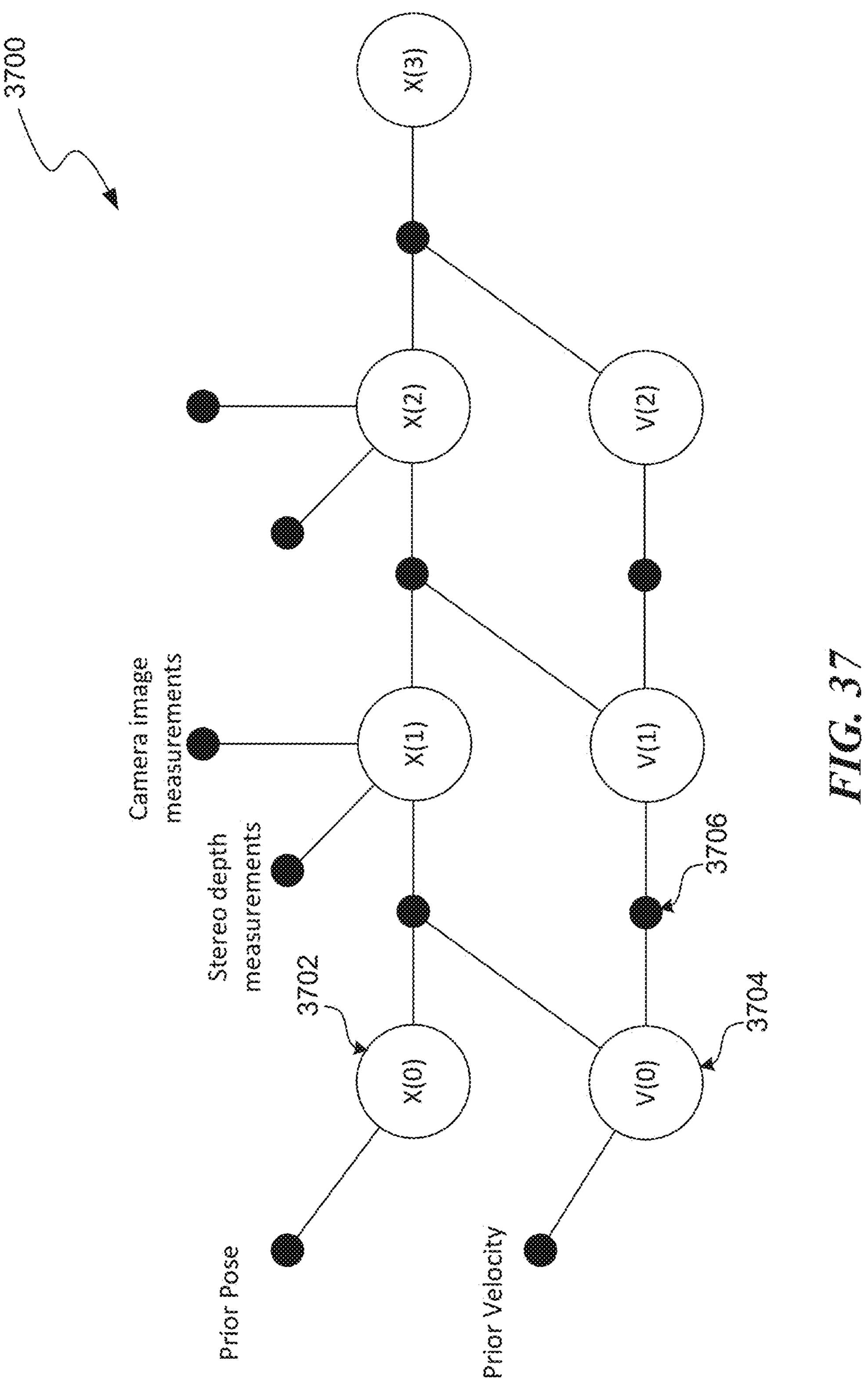
FIG. 37 is a diagrammatic representation of an example spatiotemporal factor graph.

In some embodiments, data from various sensors are input into a spatiotemporal factor graph to probabilistically minimize total measurement error using non-linear optimization. FIG. 37 shows a diagrammatic representation of an example spatiotemporal factor graph 3700 that can be used to estimate a 3D trajectory of an object (e.g., including pose and velocity over time). In the example, spatiotemporal factor graph 3700 depicted in FIG. 37, variable values such as the pose and velocity (represented as nodes (3702 and 3704 respectively)) are connected by one or more motion model processes (represented as nodes 3706 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out. In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 38:
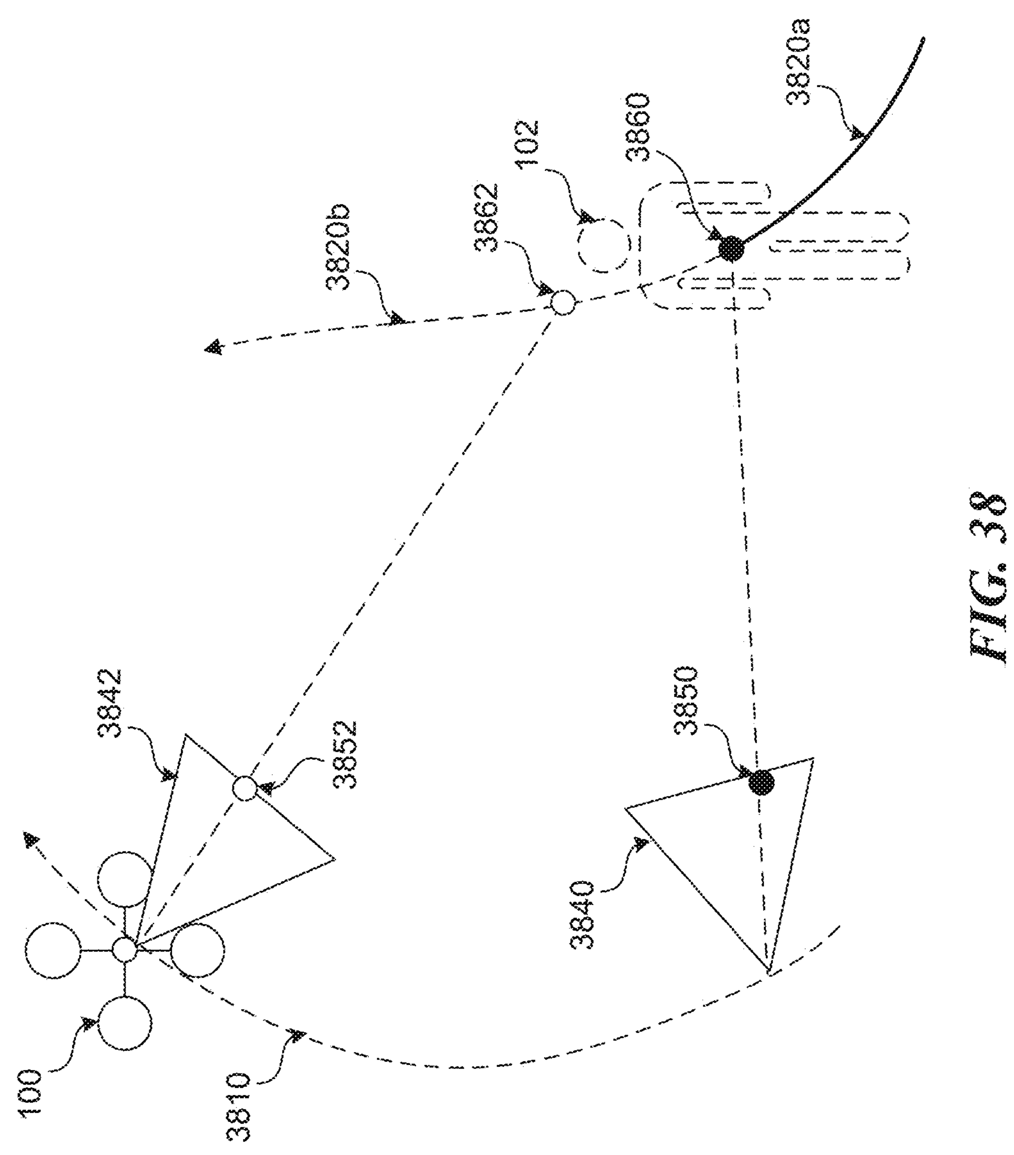
FIG. 38 is a diagram that illustrates an example process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 38 shows a diagram that illustrates this concept. As shown in FIG. 38, a UAV 100 is moving along a trajectory 3810 while capturing images of the surrounding physical environment, including of a human subject 102. As the UAV 100 moves along the trajectory 3810, multiple images (e.g., frames of video) are captured from one or more mounted image capture devices 114/115. FIG. 38 shows a first FOV of an image capture device at a first pose 3840 and a second FOV of the image capture device at a second pose 3842. In this example, the first pose 3840 may represent a previous pose of the image capture device at a time instant t(0) while the second pose 3842 may represent a current pose of the image capture device at a time instant t(1). At time instant t(0), the image capture device captures an image of the human subject 102 at a first 3D position 3860 in the physical environment. This first position 3860 may be the last known position of the human subject 102. Given the first pose 3840 of the image capture device, the human subject 102 while at the first 3D position 3860 appears at a first image position 3850 in the captured image. An initial estimate for a second (or current) image position 3852 can therefore be made based on projecting a last known 3D trajectory 3820*a* of the human subject 102 forward in time using one or more motion models associated with the object. For example, predicted trajectory 3820*b* shown in FIG. 38 represents this projection of the 3D trajectory 3820*a* forward in time. A second 3D position 3862 (at time t(1)) of the human subject 102 along this predicted trajectory 3820*b* can then be calculated based on an amount of time elapsed from t(0) to t(1). This second 3D position 3862 can then be projected into the image plane of the image capture device at the second pose 3842 to estimate the second image position 3852 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1, the UAV 100 may include image capture device 114 configured for visual navigation, as well as an image capture device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Combining information from both types of image capture devices 114 and 115 can be beneficial for object tracking purposes in a number of ways. First, the high-resolution color information from an image capture device 115 can be fused with depth information from the image capture devices 114 to create a 3D representation of a tracked object. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Figure 39:
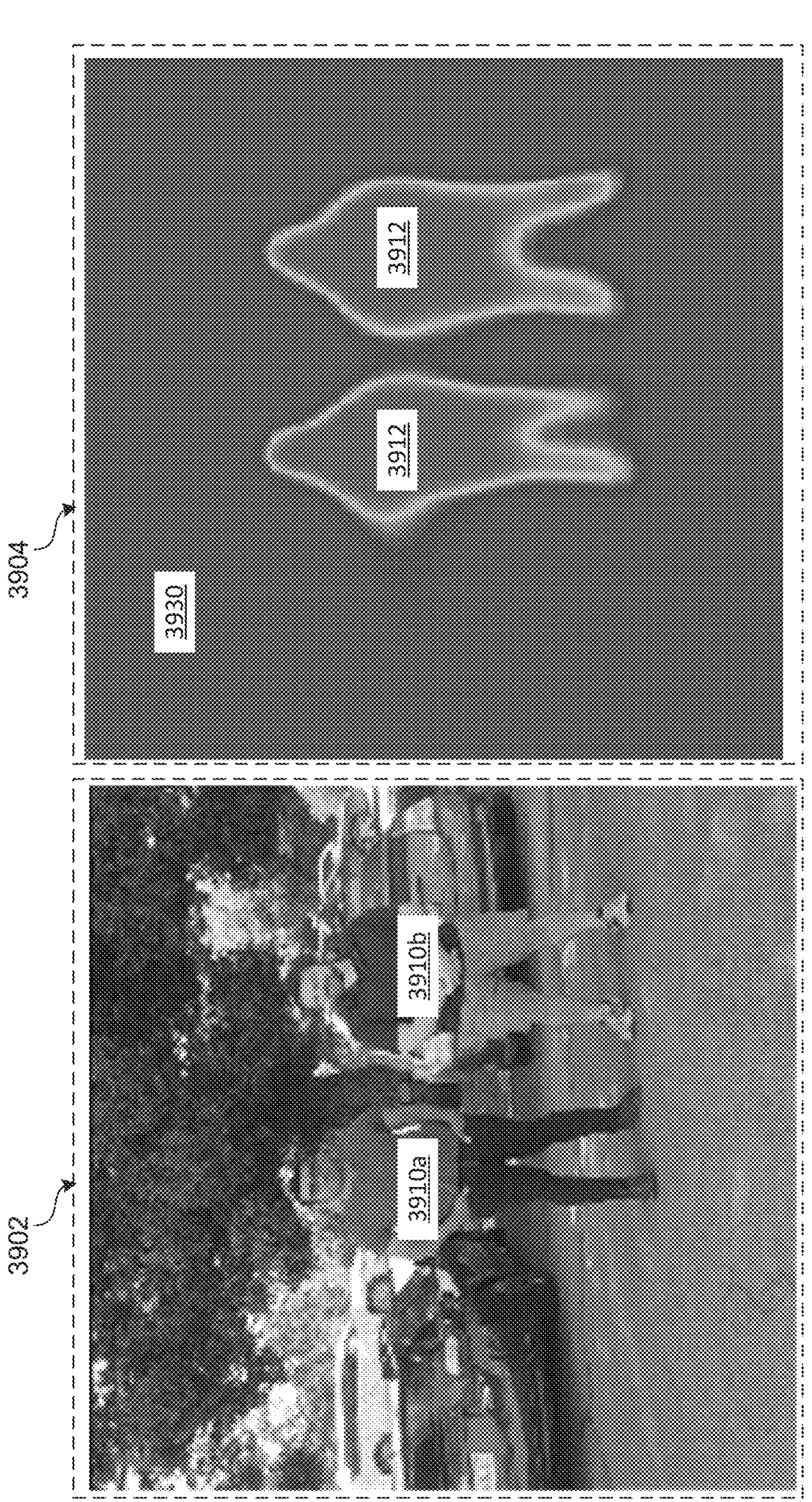
FIG. 39 shows a visualization representative of a dense per-pixel segmentation of a captured image.

A tracking system 140 may include an object detection system for detecting and tracking various objects. Given one or more classes of objects (e.g., humans, buildings, cars, animals, etc.), the object detection system may identify instances of the various classes of objects occurring in captured images of the physical environment. Outputs by the object detection system can be parameterized in a few different ways. In some embodiments, the object detection system processes received images and outputs a dense per-pixel segmentation, where each pixel is associated with a value corresponding to either an object class label (e.g., human, building, car, animal, etc.) and/or a likelihood of belonging to that object class. For example, FIG. 39 shows a visualization 3904 of a dense per-pixel segmentation of a captured image 3902 where pixels corresponding to detected objects 3910*a-b* classified as humans are set apart from all other pixels in the image 3902. Another parameterization may include resolving the image location of a detected object to a particular image coordinate (e.g., as shown at pixel map 3530 in FIG. 35), for example, based on the centroid of the representation of the object in a received image.

In some embodiments, the object detection system can utilize a deep convolutional neural network for object detection. For example, the input may be a digital image (e.g., image 3902), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 3904 shown in FIG. 39 may represent a particular slice of the aforementioned tensor where each pixel's value is proportional to the likelihood that the pixel corresponds with a human. In addition, the same deep convolutional neural network can also predict the centroid locations for each detected instance, as described in the following section.

A tracking system 140 may also include an instance segmentation system for distinguishing between individual instances of objects detected by the object detection system. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 39, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 3904 distinguishes pixels that correspond to humans (e.g., included in region 3912) from pixels that do not correspond to humans (e.g., included in region 3930). However, this segmentation process does not necessarily distinguish between individual instances of the detected objects. A human viewing the visualization 3904 may conclude that the pixels corresponding to humans in the detected image actually correspond to two separate humans; however, without further analysis, a tracking system 140 may be unable to make this distinction.

Figure 40:
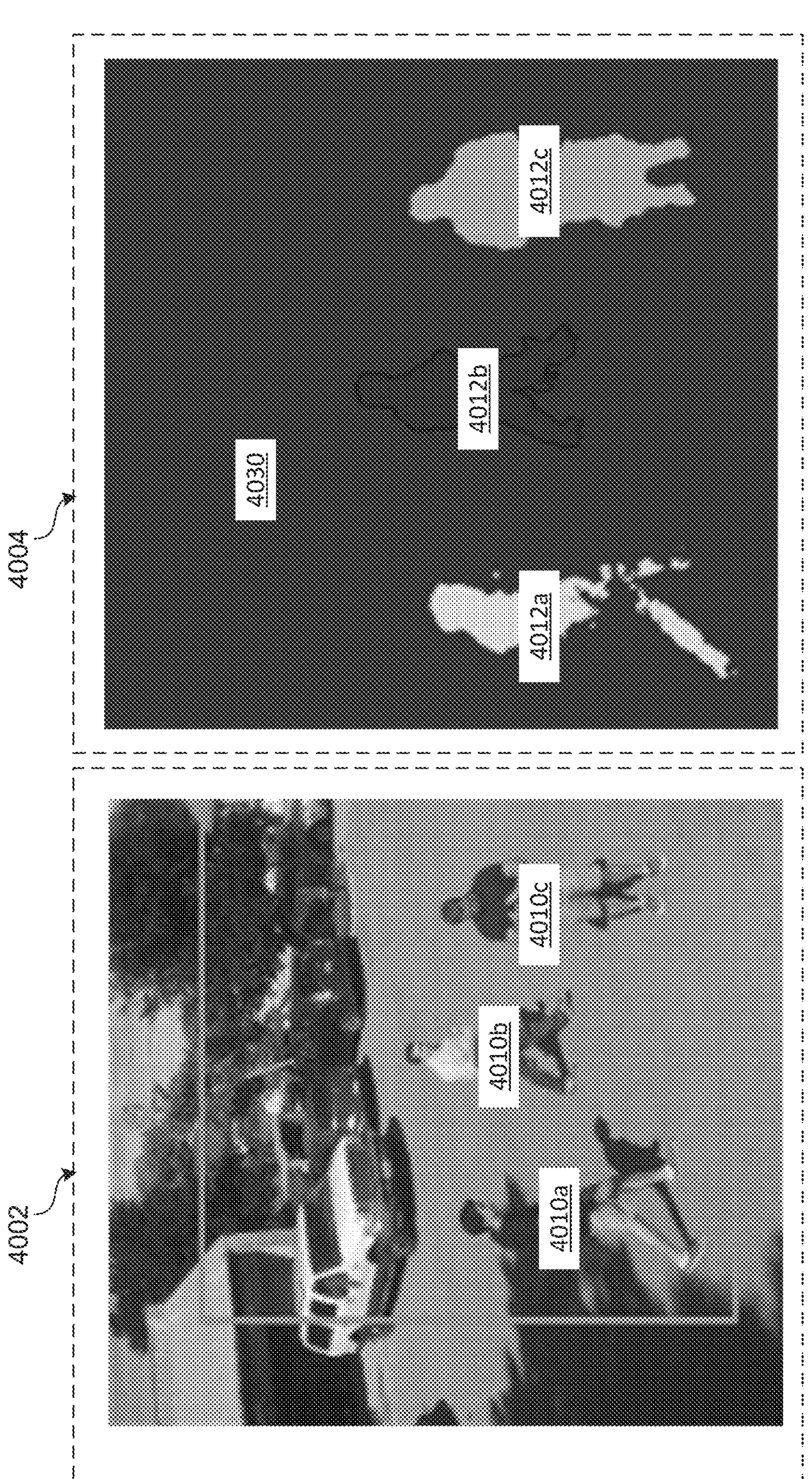
FIG. 40 shows a visualization representative of an instance segmentation of a captured image.

Effective object tracking may involve distinguishing pixels that correspond to distinct instances of detected objects. This process is known as "instance segmentation." FIG. 40 shows an example visualization 4004 of an instance segmentation output based on a captured image 4002. Similar to the dense per-pixel segmentation process described with respect to FIG. 39, the output represented by visualization 4004 distinguishes pixels (e.g., included in regions 4012*a-c*) that correspond to detected objects 4010*a-c* of a particular class of objects (in this case humans) from pixels that do not correspond to such objects (e.g., included in region 4030). Notably, the instance segmentation process goes a step further to distinguish pixels corresponding to individual instances of the detected objects from each other. For example, pixels in region 4012*a* correspond to a detected instance of a human 4010*a*, pixels in region 4012*b* correspond to a detected instance of a human 4010*b*, and pixels in region 4012*c* correspond to a detected instance of a human 4010*c*.

Distinguishing between instances of detected objects may be based on an analysis of pixels corresponding to detected objects. For example, a grouping method may be applied by the tracking system 140 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Instance segmentation may associate pixels corresponding to particular instances of objects; however, such associations may not be temporally consistent. Consider again, the example described with respect to FIG. 40. As illustrated in FIG. 40, a tracking system 140 has identified three instances of a certain class of objects (i.e., humans) by applying an instance segmentation process to a captured image 4002 of the physical environment. This example captured image 4002 may represent only one frame in a sequence of frames of captured video. When a second frame is received, the tracking system 140 may not be able to recognize newly identified object instances as corresponding to the same three people 4010*a-c* as captured in image 4002.

To address this issue, the tracking system 140 can include an identity recognition system. An identity recognition system may process received inputs (e.g., captured images) to learn the appearances of instances of certain objects (e.g., of particular people). Specifically, the identity recognition system may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g., a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

In some embodiments, a tracking system 140 may be configured to focus tracking on a specific object detected in captured images. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these shortcomings and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves or trees. Instead, unique tracks may be associated with certain classes of objects that may be of interest from a tracking standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

In some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

As previously alluded to, a tracking system 140 may be configured to estimate (i.e., predict) a future trajectory of a detected object based on past trajectory measurements and/or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects, such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from an object detection system wherein results from the frame-to-frame tracking are fused into a spatiotemporal factor graph. Alternatively, or in addition, an object detection system may perform frame-to-frame tracking if, for example, the system has sufficient available computing resources (e.g., memory). For example, an object detection system may apply frame-to-frame tracking through recurrence in a deep network and/or by passing in multiple images at a time. A frame-to-frame tracking process and object detection process can also be configured to complement each other, with one resetting the other when a failure occurs.

As previously discussed, the tracking system 140 may be configured to process images (e.g., the raw pixel data) received from one or more image capture devices 114/115 onboard a UAV 100. Alternatively, or in addition, the tracking system 140 may also be configured to operate by processing disparity images. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide the tracking system 140 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the tracking system 140. Disparity images may be used for object detection separately from the images received from the image capture devices 114/115, or they may be combined into a single network for joint inference.

In general, a tracking system 140 (e.g., including an object detection system and/or an associated instance segmentation system) may be primarily concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the tracking system 140 may be configured to imply a segmentation of an object instance in a captured image even if that object instance is occluded by other object instances. The object tracking system 140 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of image capture devices 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked object's location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors, but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will, therefore, accelerate the craft forward on a horizontal plane.

Figure 41:
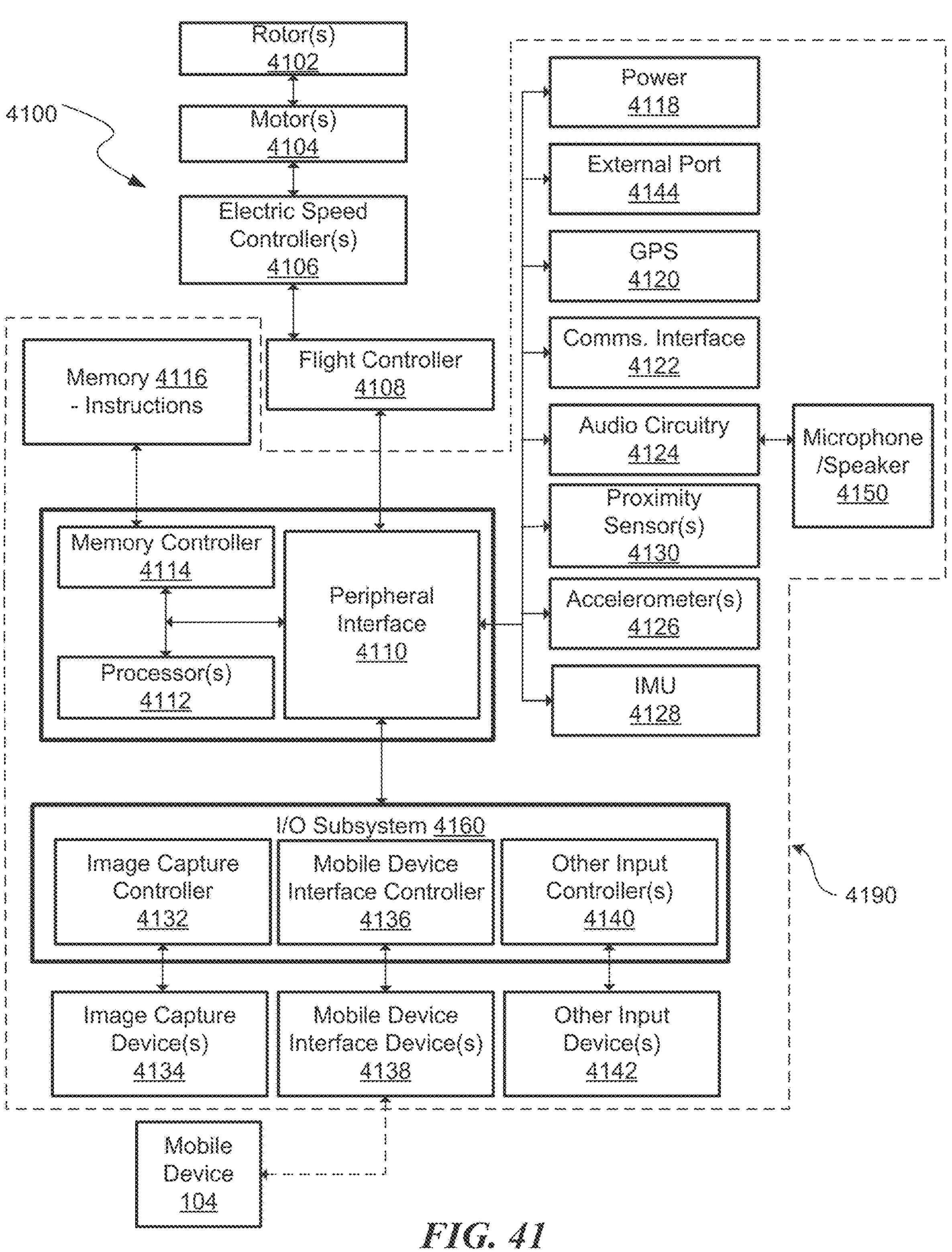
FIG. 41 is a block diagram of an example UAV system including various functional system components with which at least some operations described in this disclosure can be implemented.

FIG. 41 shows a diagram of an example UAV system 4100 including various functional system components that may be part of a UAV 100, according to some embodiments. UAV system 4100 may include one or more propulsion systems (e.g., rotors 4102 and motor(s) 4104), one or more electronic speed controllers 4106, a flight controller 4108, a peripheral interface 4110, processor(s) 4112, a memory controller 4114, a memory 4116 (which may include one or more computer-readable storage media), a power module 4118, a GPS module 4120, a communications interface 4122, audio circuitry 4124, an accelerometer 4126 (including subcomponents, such as gyroscopes), an IMU 4128, a proximity sensor 4130, an optical sensor controller 4132 and associated optical sensor(s) 4134, a mobile device interface controller 4136 with associated interface device(s) 4138, and any other input controllers 4140 and input device(s) 4142, for example, display controllers with associated display device(s). These components may communicate over one or more communication buses or signal lines as represented by the arrows in FIG. 41.

UAV system 4100 is only one example of a system that may be part of a UAV 100. A UAV 100 may include more or fewer components than shown in system 4100, may combine two or more components as functional units, or may have a different configuration or arrangement of the components. Some of the various components of system 4100 shown in FIG. 41 may be implemented in hardware, software or a combination of both hardware and software, including one or more signal processing and/or application specific integrated circuits. Also, UAV 100 may include an off-the-shelf UAV (e.g., a currently available remote-controlled quadcopter) coupled with a modular add-on device (for example, one including components within outline 4190) to perform the innovative functions described in this disclosure.

A propulsion system (e.g., comprising components 4102-4104) may comprise fixed-pitch rotors. The propulsion system may also include variable-pitch rotors (for example, using a gimbal mechanism), a variable-pitch jet engine, or any other mode of propulsion having the effect of providing force. The propulsion system may vary the applied thrust, for example, by using an electronic speed controller 4106 to vary the speed of each fixed-pitch rotor.

Flight controller 4108 may include a combination of hardware and/or software configured to receive input data (e.g., sensor data from image capture devices 4134, generated trajectories from an autonomous navigation system 120, or any other inputs), interpret the data and output control commands to the propulsion systems 4102-4106 and/or aerodynamic surfaces (e.g., fixed wing control surfaces) of the UAV 100. Alternatively, or in addition, a flight controller 4108 may be configured to receive control commands generated by another component or device (e.g., processors 4112 and/or a separate computing device), interpret those control commands and generate control signals to the propulsion systems 4102-4106 and/or aerodynamic surfaces (e.g., fixed wing control surfaces) of the UAV 100. In some embodiments, the previously mentioned navigation system 120 of the UAV 100 may comprise the flight controller 4108 and/or any one or more of the other components of system 4100. Alternatively, the flight controller 4108 shown in FIG. 41 may exist as a component separate from the navigation system 120, for example, similar to the flight controller 160 shown in FIG. 2.

Memory 4116 may include high-speed random-access memory and may also include non-volatile memory, such as one or more magnetic disk storage devices, flash memory devices, or other non-volatile solid-state memory devices. Access to memory 4116 by other components of system 4100, such as the processors 4112 and the peripherals interface 4110, may be controlled by the memory controller 4114.

The peripherals interface 4110 may couple the input and output peripherals of system 4100 to the processor(s) 4112 and memory 4116. The one or more processors 4112 run or execute various software programs and/or sets of instructions stored in memory 4116 to perform various functions for the UAV 100 and to process data. In some embodiments, processors 4112 may include general central processing units (CPUs), specialized processing units such as graphical processing units (GPUs) particularly suited to parallel processing applications, or any combination thereof. In some embodiments, the peripherals interface 4110, the processor(s) 4112, and the memory controller 4114 may be implemented on a single integrated chip. In some other embodiments, they may be implemented on separate chips.

The network communications interface 4122 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 4124, including the speaker and microphone 4150, may provide an audio interface between the surrounding environment and the UAV 100. The audio circuitry 4124 may receive audio data from the peripherals interface 4110, convert the audio data to an electrical signal, and transmit the electrical signal to the speaker 4150. The speaker 4150 may convert the electrical signal to human-audible sound waves. The audio circuitry 4124 may also receive electrical signals converted by the microphone 4150 from sound waves. The audio circuitry 4124 may convert the electrical signal to audio data and transmit the audio data to the peripherals interface 4110 for processing. Audio data may be retrieved from and/or transmitted to memory 4116 and/or the network communications interface 4122 by the peripherals interface 4110.

The I/O subsystem 4160 may couple input/output peripherals of UAV 100, such as an optical sensor system 4134, the mobile device interface 4138, and other input/control devices 4142, to the peripherals interface 4110. The I/O subsystem 4160 may include an optical sensor controller 4132, a mobile device interface controller 4136, and other input controller(s) 4140 for other input or control devices. The one or more input controllers 4140 receive/send electrical signals from/to other input or control devices 4142. The other input/control devices 4142 may include physical buttons (e.g., push buttons, rocker buttons, etc.), dials, touch screen displays, slider switches, joysticks, click wheels, and so forth.

The mobile device interface device 4138 along with mobile device interface controller 4136 may facilitate the transmission of data between a UAV 100 and other computing devices such as a mobile device 104. According to some embodiments, communications interface 4122 may facilitate the transmission of data between UAV 100 and a mobile device 104 (for example, where data is transferred over a Wi-Fi network).

UAV system 4100 also includes a power system 4118 for powering the various components. The power system 4118 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 4100 may also include one or more image capture devices 4134. Image capture devices 4134 may be the same as the image capture devices 114/115 of UAV 100 described with respect to FIG. 1. FIG. 41 shows an image capture device 4134 coupled to an image capture controller 4132 in I/O subsystem 4160. The image capture device 4134 may include one or more optical sensors. For example, image capture device 4134 may include a charge-coupled device (CCD) or complementary metal-oxide semiconductor (CMOS) phototransistors. The optical sensors of image capture devices 4134 receive light from the environment, projected through one or more lenses (the combination of an optical sensor and lens can be referred to as a "camera") and converts the light to data representing an image. In conjunction with an imaging module located in memory 4116, the image capture device 4134 may capture images (including still images and/or video). In some embodiments, an image capture device 4134 may include a single fixed camera. In other embodiments, an image capture device 4140 may include a single adjustable camera (adjustable using a gimbal mechanism with one or more axes of motion). In some embodiments, an image capture device 4134 may include a camera with a wide-angle lens providing a wider FOV. In some embodiments, an image capture device 4134 may include an array of multiple cameras providing up to a full 360 degree view in all directions. In some embodiments, an image capture device 4134 may include two or more cameras (of any type as described herein) placed next to each other in order to provide stereoscopic vision. In some embodiments, an image capture device 4134 may include multiple cameras of any combination as described above. In some embodiments, the cameras of an image capture device 4134 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 4100 may also include one or more proximity sensors 4130. FIG. 41 shows a proximity sensor 4130 coupled to the peripherals interface 4110. Alternately, the proximity sensor 4130 may be coupled to an input controller 4140 in the I/O subsystem 4160. Proximity sensors 4130 may generally include remote sensing technology for proximity detection, range measurement, target identification, etc. For example, proximity sensors 4130 may include radar, sonar, and LIDAR.

UAV system 4100 may also include one or more accelerometers 4126. FIG. 41 shows an accelerometer 4126 coupled to the peripherals interface 4110. Alternately, the accelerometer 4126 may be coupled to an input controller 4140 in the I/O subsystem 4160.

UAV system 4100 may include one or more IMU 4128. An IMU 4128 may measure and report the UAV's velocity, acceleration, orientation, and gravitational forces using a combination of gyroscopes and accelerometers (e.g., accelerometer 4126).

UAV system 4100 may include a global positioning system (GPS) receiver 4120. FIG. 41 shows a GPS receiver 4120 coupled to the peripherals interface 4110. Alternately, the GPS receiver 4120 may be coupled to an input controller 4140 in the I/O subsystem 4160. The GPS receiver 4120 may receive signals from GPS satellites in orbit around the earth, calculate a distance to each of the GPS satellites (through the use of GPS software), and thereby pinpoint a current global position of UAV 100.

In some embodiments, the software components stored in memory 4116 may include an operating system, a communication module (or set of instructions), a flight control module (or set of instructions), a localization module (or set of instructions), a computer vision module (or set of instructions), a graphics module (or set of instructions), and other applications (or sets of instructions). For clarity, one or more modules and/or applications may not be shown in FIG. 41.

An operating system (e.g., Darwin™, RTXC, Linux, Unix™, Apple™ OS X, Microsoft Windows™, or an embedded operating system such as VxWorks™) includes various software components and/or drivers for controlling and managing general system tasks (e.g., memory management, storage device control, power management, etc.) and facilitates communication between various hardware and software components.

A communications module may facilitate communication with other devices over one or more external ports 4144 and may also include various software components for handling data transmission via the network communications interface 4122. The external port 4144 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a graphics processing unit (GPU) 4112 may process in real time or near real time, graphics data captured by optical sensor(s) 4134 and/or proximity sensors 4130.

A computer vision module, which may be a component of a graphics module, provides analysis and recognition of graphics data. For example, while UAV 100 is in flight, the computer vision module along with a graphics module (if separate), GPU 4112, and image capture devices(s) 4134 and/or proximity sensors 4130 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 4108).

Image capture devices(s) 4134, in conjunction with an image capture device controller 4132 and a graphics module, may be used to capture images (including still images and video) and store them into memory 4116.

The above identified modules and applications each correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 4116 may store a subset of the modules and data structures identified above. Furthermore, memory 4116 may store additional modules and data structures not described above.

Example Computer Processing System

Figure 42:
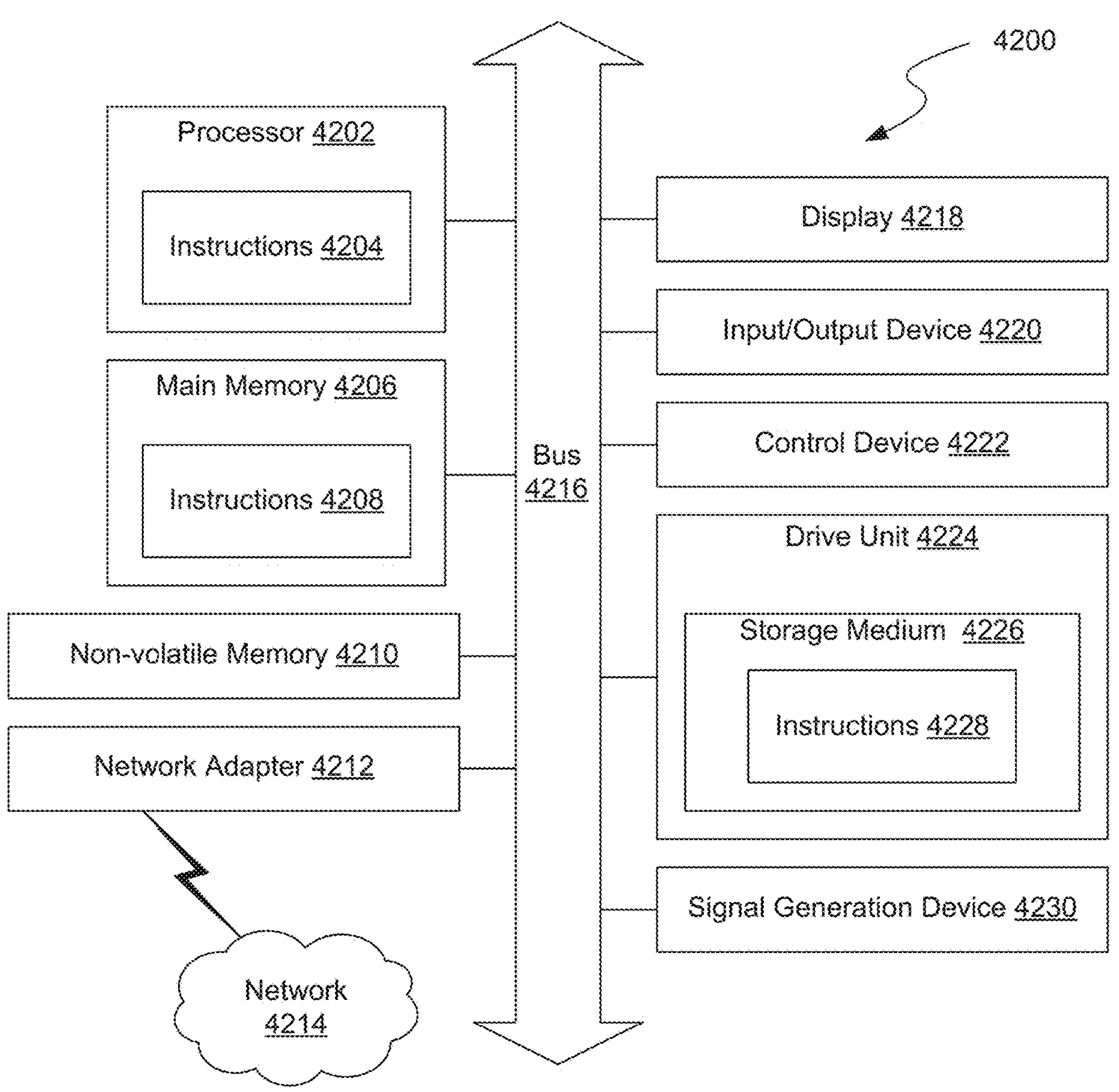
FIG. 42 is a block diagram of an example of a processing system in which at least some operations described in this disclosure can be implemented.

FIG. 42 is a block diagram illustrating an example of a computer processing system 4200 in which at least some operations described in this disclosure can be implemented. The example computer processing system 4200 may be part of any of the aforementioned devices including, but not limited to, UAV 100 and mobile device 104. The processing system 4200 may include one or more central processing units ("processors") 4202, main memory 4206, non-volatile memory 4210, network adapter 4212 (e.g., network interfaces), display 4218, input/output devices 4220, control device 4222 (e.g., keyboard and pointing devices), drive unit 4224 including a storage medium 4226, and signal generation device 4230 that are communicatively connected to a bus 4216. The bus 4216 is illustrated as an abstraction that represents any one or more separate physical buses, point-to-point connections, or both connected by appropriate bridges, adapters, or controllers. The bus 4216, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 4206, non-volatile memory 4210, and storage medium 4226 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 4228. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure may be implemented as part of an operating system or a specific application, component, program, object, module, or sequence of instructions referred to as "computer programs." The computer programs typically comprise one or more instructions (e.g., instructions 4204, 4208, 4228) set at various times in various memory and storage devices in a computer, and that, when read and executed by one or more processing units or processors 4202, cause the processing system 4200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 4210, floppy and other removable disks, hard disk drives, optical discs (e.g., Compact Disk Read-Only Memory (CD-ROMS), Digital Versatile Disks (DVDs)), and transmission type media such as digital and analog communication links.

The network adapter 4212 enables the computer processing system 4200 to mediate data in a network 4214 with an entity that is external to the computer processing system 4200, such as a network appliance, through any known and/or convenient communications protocol supported by the computer processing system 4200 and the external entity. The network adapter 4212 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 4212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for controlling an aircraft, the method comprising:

receiving, by a computer system, a selection of a control mode of a plurality of available control modes;

presenting, by the computer system, a graphical user interface (GUI) at a user computing device, wherein the graphical user interface includes a display of a view of the physical environment from a perspective of the aircraft and an arrangement of one or more interactive elements, the view generated based on sensor data from a sensor device onboard the aircraft, and the arrangement of the one or more interactive elements determined based on the selected control mode;

detecting, by the computer system, a user interaction with the GUI;

responsive to detecting the user interaction with the GUI, identifying, by the computer system, the selected control mode of the plurality of available control modes, wherein the manner in which the aircraft responds to the user interaction is dependent on the selected control mode;

interpreting, by the computer system, the user interaction as indicative of a particular input, command or intention associated with the selected control mode, wherein the user interaction is interpreted differently based on each of the plurality of available control modes;

translating, by the computer system, the interpreted user interaction into a behavioral objective that includes one or more parameter values including a target, a deadzone region, and a weighting factor;

generating, by a motion planner of a navigation system of the aircraft, a planned trajectory through the three-dimensional space based on the behavioral objective;

generating, by the computer system, control commands for causing the aircraft to fly along the planned trajectory;

displaying, by the computer system, in the GUI, a graphical representation of the planned trajectory overlaid on the view of the physical environment, wherein the arrangement of the interactive elements dynamically changes based on the selected control mode, and user interaction with the interactive elements is interpreted differently across different control modes; and continually updating the planned trajectory based on perception inputs including object-tracking data for a tracked subject, such that movement of the aircraft dynamically follows movement of the tracked subject.

2. The method of claim 1, wherein based on the selected control mode, the user interaction is interpreted as a user selection of a physical object in the physical environment that is represented in the displayed view of the physical environment in the GUI.

3. The method of claim 1, further comprising:
detecting, by the computer system, an obstacle in the physical environment;
determining, by the computer system, based on the behavioral objective that the planned trajectory will cause the aircraft to collide with the obstacle;
adjusting, by the computer system, the planned trajectory so as to avoid collision with the obstacle; and
displaying, by the computer system, in the GUI, an indication of the detected obstacle.

4. The method of claim 1, further comprising:
changing, by the computer system, an arrangement of one or more interactive elements in the GUI based on the selected control mode.

5. The method of claim 1, wherein the user interaction is detected as a touch gesture via a touch screen display of the user computing device.

6. The method of claim 1, wherein the user computing device is any of a smart phone, a tablet device, an augmented reality device, or a virtual reality device.

7. The method of claim 1, wherein the aircraft is an unmanned aerial vehicle (UAV).

8. The method of claim 1, wherein the sensor is an image capture device and wherein the view of the physical environment includes a rendering of a three-dimensional (3D) model of the physical environment, the 3D model generated based on images captured by the image capture device.

9. A system for controlling an unmanned aerial vehicle (UAV), the system comprising:
an interactive display device;
an interactive menu that enables a user to select from a plurality of different control modes;
a processor; and
a memory having instructions stored thereon, which when executed by the processor, cause the system to:
display, using the interactive display device, a graphical user interface comprising:
a view of the physical environment based on sensor data from a sensor device onboard the UAV; and
a plurality of interactive elements that enable the user to interact with the GUI to control the UAV;
wherein an arrangement of the interactive elements dynamically changes based on a selected control mode of the plurality of different control modes;
detect a user interaction with the GUI;
responsive to the user interaction, identify the selected control mode, wherein the manner in which the aircraft responds to the user interaction is dependent on the selected control mode;
interpret the detected user interaction as indicative of a particular input, command or intention associated with the selected control mode,
wherein the arrangement of interactive elements dynamically changes based on the selected control mode and the interpretation of user interactions differs across control modes;
translate the interpreted user interaction into a behavioral objective comprising parameter values including a target, a dead-zone region, and a weighting factor; and
input the behavioral objective into a motion planner configured to generate a planned trajectory through three-dimensional space and to continually update the planned trajectory based on perception inputs including object-tracking data for a tracked subject;
wherein an interactive element of the plurality of interactive elements dynamically changes from active to inactive in response to a determination that a maneuver by the UAV will cause a collision with an obstacle.

10. The system of claim 9, wherein the interactive elements include one or more of a virtual button, a virtual joystick, a slider bar, or an interactive graphical overlay.

11. The system of claim 10, wherein the interactive graphical overlay is displayed over a portion of the view of the physical environment at a location corresponding to a representation of a detected physical object in the physical environment that is captured in the view.

12. The system of claim 9, wherein the view of the physical environment includes any of:
a live video feed from an image capture device onboard the UAV; or
a rendering of a three-dimensional (3D) model of the physical environment from a perspective corresponding to a position of the UAV in the physical environment, the 3D model generated based on the sensor data.

13. The system of claim 9, wherein the plurality of different user-selectable control modes includes a plurality of user-selectable modes of operation and a plurality of user-selectable cinematic modes.

14. The system of claim 13, wherein the selected control mode represents a combination of a selected mode of operation and a selected cinematic mode.

15. The system of claim 9, wherein the interactive display device includes a touch-sensitive display.

16. The system of claim 9, wherein an interactive element of the plurality of interactive elements dynamically changes from active to inactive in response to a determination that a maneuver by the UAV based on user interaction with the interactive element will cause a collision with an obstacle.

17. The system of claim 9, wherein the GUI further comprises:
a graphical representation of the planned trajectory overlaid on the view of the physical environment.

18. The system of claim 9, wherein an interactive element of the plurality of interactive elements is overlaid on the view of the physical environment.

19. An aircraft flight control system comprising:
a navigation system for:
continually generating and updating a planned trajectory through three-dimensional space based on perception inputs, one or more behavioral objectives comprising parameter values including at least one of a target, a dead-zone region, and a weighting factor, and a tracked motion of a physical object; and
controlling one or more control actuators onboard the aircraft to cause the aircraft to autonomously fly through a physical environment along the planned trajectory; and
a graphical user interface (GUI) coupled to the navigation system to enable a user to define behavioral objectives for processing by the navigation system, the GUI comprising:
a view of the physical environment based on the perception inputs;
a representation of the planned trajectory overlaid on the view of the physical environment; and
an interactive element that dynamically changes based on a selected control mode of a plurality of different user-selectable control modes;
wherein user interaction with the interactive element is interpreted differently based on the selected control mode and is translated into the behavioral objective for processing by a motion planner of the navigation system to control the aircraft.

20. The aircraft flight control system of claim 19, wherein the GUI further comprises:

an interactive menu that enables the user to select from the plurality of different control modes.

21. The aircraft flight control system of claim 20, wherein the interactive element includes any of a virtual button, a virtual joystick, a slider bar, or an interactive graphical overlay.

22. The aircraft flight control system of claim 19, wherein the view of the physical environment includes any of:

a live video feed from an image capture device onboard the aircraft; or a rendering of a three-dimensional (3D) model of the physical environment from a perspective corresponding to a position of the aircraft in the physical environment, the 3D model generated based on sensor data from sensors onboard the aircraft.

23. The aircraft flight control system of claim 19, wherein the plurality of different user-selectable control modes includes a plurality of different user-selectable modes of operation and a plurality of different user-selectable cinematic modes.

24. The aircraft flight control system of claim 23, wherein the selected control mode represents a combination of a selected mode of operation from the plurality of different user-selectable modes of operation and a selected cinematic mode from the plurality of different user-selectable cinematic modes.

25. The aircraft flight control system of claim 19, wherein the GUI is presented to the user via an interactive display device.

26. The aircraft flight control system of claim 25, wherein the interactive display device is integrated into a mobile device in wireless communication with the aircraft.

27. The aircraft flight control system of claim 19, wherein the GUI further comprises:

a graphical representation of the planned trajectory generated by the navigation system overlaid on the view of the physical environment.

28. The aircraft flight control system of claim 19, wherein the interactive element is overlaid on the view of the physical environment.

29. The aircraft flight control system of claim 19, wherein the planned trajectory is generated by the navigation system to avoid obstacles regardless of any user interaction with the GUI.

30. The aircraft flight control system of claim 19, wherein the interactive element includes a virtual joystick, and wherein user interaction with the virtual joystick causes the navigation system to update the planned trajectory to cause the aircraft to fly in a direction corresponding to the user interaction with the virtual joystick at a constant altitude.

31. The aircraft flight control system of claim 19, wherein the interactive element includes a subject selection element overlaid on a portion of the view corresponding with a representation of a detected physical object in the physical environment, and wherein user interaction with the subject selection element causes the navigation system to track the detected physical object and update the planned trajectory to cause the aircraft to follow the detected object.

32. The aircraft flight control system of claim 19, wherein the displayed view of the physical environment is interactive and wherein user interaction with the displayed view causes the navigation system to update the planned trajectory and/or control an orientation of a gimbaled image capture device onboard the aircraft.

33. The aircraft flight control system of claim 32, wherein user interaction with the displayed view is interpreted as a selection of a particular point in the physical environment that is represented in the displayed view, and wherein the planned trajectory is updated to cause the aircraft to maneuver towards a position of the particular point in the physical environment, and wherein orientation of the gimbaled image capture device is adjusted to keep the particular point in the physical environment within the displayed view as the aircraft maneuvers along the planned trajectory.

34. The aircraft flight control system of claim 19, wherein the GUI further comprises:

an indication of an obstacle that is displayed in response to the navigation system detecting the obstacle based on the perception inputs.

35. The aircraft flight control system of claim 19, wherein the GUI further comprises:

a graphical representation of the planned trajectory overlaid on the view of the physical environment.

36. The aircraft flight control system of claim 19, wherein the GUI further comprises:

a computer-generated 3D occupancy map overlaid on the view of the physical environment.

37. The method of claim 3, further comprising:

displaying, by the computer system, in the GUI, an indication of a divergence from the planned trajectory to avoid collision with the obstacle.

38. The method of claim 3, further comprising:

displaying, by the computer system, in the GUI, an indication that the behavioral objective based on the user interaction cannot be satisfied due to the detected obstacle.

* * * * *